US012258979B2

(12) United States Patent
Hofstad et al.

(10) Patent No.: US 12,258,979 B2
(45) Date of Patent: Mar. 25, 2025

(54) METHOD OF PREVENTING DAMAGE TO A PUMP

(71) Applicant: AKER SOLUTIONS AS, Lysaker (NO)

(72) Inventors: Age Hofstad, Mjoendalen (NO); Randhir Mohite, Drammen (NO); Sergio Walsh Goldvag, Dilling (NO); Pal Erik Tysvaer Soerensen, Drammen (NO); Tarje Olderheim, Billingstad (NO); Dag Elvebakken, Heggedal (NO); Bastiaen Van Der Rest, Gullaug (NO); Einar Marius Haaverstad, Slependen (NO); Rune Pettersen, Slependen (NO)

(73) Assignee: AKER SOLUTIONS AS, Lysaker (NO)

( * ) Notice: Subject to any disclaimer, the term of this patent is extended or adjusted under 35 U.S.C. 154(b) by 0 days.

(21) Appl. No.: 18/401,844

(22) Filed: Jan. 2, 2024

(65) Prior Publication Data

US 2024/0133392 A1 Apr. 25, 2024
US 2024/0229811 A9 Jul. 11, 2024

Related U.S. Application Data

(62) Division of application No. 18/030,504, filed as application No. PCT/NO2021/050209 on Oct. 8, 2021.

(30) Foreign Application Priority Data

Oct. 9, 2020 (GB) .................................... 2016035
Oct. 9, 2020 (GB) .................................... 2016038
(Continued)

(51) Int. Cl.
*F04D 7/02* (2006.01)
*F04D 1/06* (2006.01)
(Continued)

(52) U.S. Cl.
CPC ................ *F04D 7/02* (2013.01); *F04D 1/06* (2013.01); *F04D 13/086* (2013.01);
(Continued)

(58) Field of Classification Search
CPC ............ F04D 27/0207; F04D 27/0215; F04D 27/0238; F04D 29/5806; F04D 29/0416
See application file for complete search history.

(56) References Cited

U.S. PATENT DOCUMENTS 2,480,095 A 8/1949 Büchi
3,074,688 A 1/1963 Muth et al.
(Continued)

FOREIGN PATENT DOCUMENTS

CN 107620729 A 1/2018
CN 110608187 A 12/2019
(Continued)

*Primary Examiner* — Eldon T Brockman
(74) *Attorney, Agent, or Firm* — Norman B. Thot

(57) ABSTRACT

A multiphase pump includes a housing having a flow inlet and a flow outlet which are fluidly connected to each other via a flowpath, a rotor arranged in the flow path which propels a fluid from the flow inlet to the flow outlet via the flow path, the rotor has a longitudinal axis which extends for a length of the rotor and a multiphase impeller arrangement, at least one leak path which permits a reverse flow of the fluid from the flow outlet to the flow inlet, and at least one channel which is arranged within the housing, the at least one channel directs a liquid from a liquid source to one of the at least one leak path in the multiphase pump.

20 Claims, 20 Drawing Sheets

(30) Foreign Application Priority Data

Oct. 9, 2020 (GB) ...................................... 2016039
Oct. 9, 2020 (GB) ...................................... 2016040

(51) Int. Cl.
*F04D 13/08* (2006.01)
*F04D 27/00* (2006.01)
*F04D 27/02* (2006.01)

(52) U.S. Cl.
CPC ....... *F04D 27/001* (2013.01); *F04D 27/0223* (2013.01); *F05B 2210/13* (2013.01)

(56) References Cited

U.S. PATENT DOCUMENTS

| | | | |
|---|---|---|---|
| 3,267,868 | A | 8/1966 | Page |
| 4,926,970 | A | 5/1990 | Kimberlin |
| 5,351,705 | A | 10/1994 | Reinders et al. |
| 5,746,062 | A | 5/1998 | Beaverson et al. |
| 6,092,029 | A | 7/2000 | Bently |
| 11,415,143 | B2 * | 8/2022 | Bourne ................... F04D 1/006 |
| 2007/0256507 | A1 | 11/2007 | Morgan |
| 2010/0296914 | A1 | 11/2010 | Staroselsky et al. |
| 2011/0008186 | A1 | 1/2011 | Palomba et al. |
| 2013/0309060 | A1 | 11/2013 | Johnsen |
| 2015/0300841 | A1 | 10/2015 | Campbell et al. |
| 2017/0097006 | A1 | 4/2017 | Hossain et al. |
| 2019/0326906 | A1 | 10/2019 | Camacho Cardenas et al. |
| 2020/0263680 | A1 * | 8/2020 | Bourne ................... F04D 13/06 |
| 2020/0340479 | A1 * | 10/2020 | Felix ................... F04D 29/0416 |

FOREIGN PATENT DOCUMENTS

| | | | |
|---|---|---|---|
| EP | 1 681 470 | A1 | 7/2006 |
| GB | 2 417 564 | A | 3/2006 |
| WO | WO 97/38270 | A1 | 10/1997 |
| WO | WO 2015/158734 | A1 | 10/2015 |
| WO | WO 2017/059211 | A1 | 4/2017 |
| WO | WO 2018/004577 | A1 | 1/2018 |
| WO | WO 2020/046138 | A1 | 3/2020 |

* cited by examiner

METHOD OF PREVENTING DAMAGE TO A PUMP

CROSS REFERENCE TO PRIOR APPLICATIONS

This application is a divisional of U.S. application Ser. No. 18/030,504, filed on Apr. 6, 2023. U.S. application Ser. No. 18/030,504 is a U.S National Phase application under 35 U.S.C. § 371 of International Application No. PCT/NO2021/050209, filed on Oct. 8, 2021, which claims benefit to Great Britain Patent Application No. 2016035.4, filed Oct. 9, 2020, to Great Britain Patent Application No. 2016038.8, filed Oct. 9, 2020, to Great Britain Patent Application No. 2016039.6, filed Oct. 9, 2020, and to Great Britain Patent Application No. 2016040.4, filed Oct. 9, 2020. The International Application was published in English on Apr. 14, 2022 as WO 2022/075856 A1 under PCT Article 21(2).

FIELD

The present disclosure relates to a method for preventing damage to a multiphase pump and a piping installation associated therewith, as well as a multiphase pump and a method for pumping a multiphase fluid. The present disclosure also relates to a subsea pump and a method for determining motion of a rotor in a subsea pump, and a cooling and lubrication system for a subsea pump and a method for providing cooling and lubrication in a subsea pump. Some examples also relate to a method for providing a visual indication of the state of operation of a subsea pump.

BACKGROUND

In the oil and gas industry, the process of recovering hydrocarbon reserves can be complex. In particular, as easily accessible hydrocarbon reserves are depleted, more complicated methods of extraction are required to access harder-to-reach reserves. Often, the method of extraction, and the equipment used, has to be selected based on the individual requirements of the hydrocarbon reserves. For example, access to one reserve of hydrocarbons may require chemical treatment of recoverable hydrocarbons, while access to another hydrocarbon reserve may not.

To complicate matters further, the pressure inside the hydrocarbon well may change over time, as may the gas/liquid fractions of the recovered hydrocarbons. In order to maintain consistent production of hydrocarbons, the use of subsea pumps may be necessary when additional fluid pressure is required to bring the hydrocarbons to the surface of the well. Additional pressure may be achieved by the use of a subsea fluid pump to increase the pressure of a production fluid, thereby allowing it to reach the surface of the well more easily.

In the case of pumps pumping a compressible fluid, but also of pumps pumping a mixture of solids and fluids, there may be excessive wear during operation, particularly in unfavourable pump conditions. Further complications may arise due to difficulties pumping multiphase fluids. Pumps or other rotary machines may also be located in harsh or difficult to access environments like on the seafloor, which may be difficult to access and in some cases may prevent routine inspection. Therefore, it may be necessary to remotely monitor such pump, or other equipment, such that the acceptable operation thereof can be ensured, without having to repeatedly physically access the equipment.

SUMMARY

It is an object of the present disclosure to mitigate, alleviate or eliminate one or more of the above-identified deficiencies and disadvantages in the prior art and solve at least the above mentioned problem. According to a first aspect there is provided a method for preventing damage to a multiphase pump, comprising:

- measuring at least one of:
  - the differential pressure of a fluid across a multiphase pump over a time period;
  - and the axial position of a rotor of the multiphase pump over a time period;
- calculating at least one of:
  - a pressure fluctuation by measuring the difference between a maximum value of the measured differential pressure and a minimum value of the measured differential pressure over the time period;
  - a dynamic axial position by measuring the difference between a maximum value of the axial position of the rotor and a minimum value of the axial position of the rotor over the time period;
- comparing the calculated pressure fluctuation of the pump with an expected pressure fluctuation value, and comparing the calculated dynamic axial position of the rotor with an expected dynamic axial position value;
- identifying an operating condition of the pump based on at least one of the comparison between the calculated pressure fluctuation and the expected pressure fluctuation value, and the comparison of the calculated dynamic axial position and the expected axial position value.

According to a second aspect, there is providing a piping installation comprising:

- a pump; and
- means for measuring the differential pressure between pump inlet and pump outlet; and
- means for measuring the axial position of a rotor of the multiphase pump; wherein the pump system is configured to prevent damage to the pump in accordance with the method of the first aspect.

The detailed description, claims and appended drawings outline various further embodiments and features.

BRIEF DESCRIPTION OF THE DRAWINGS

These and other characteristics will become clear from the following description of illustrative embodiments, given as non-restrictive examples, with reference to the attached drawings, in which.

DETAILED DESCRIPTION

Figure 1:
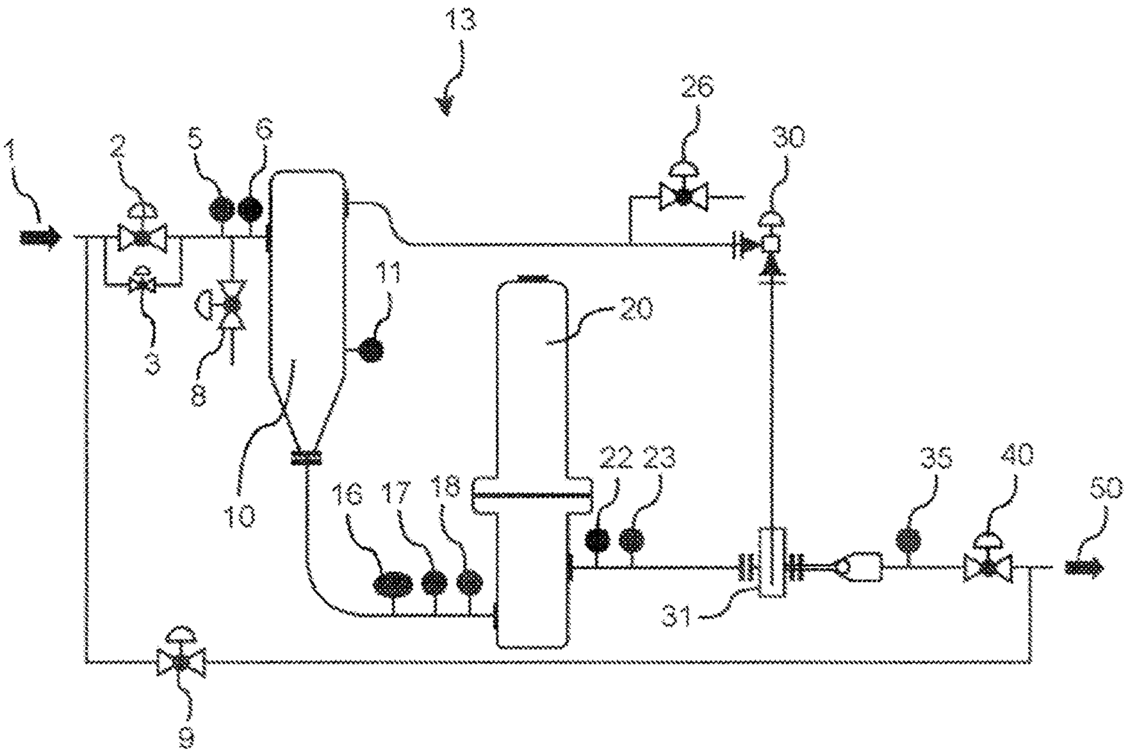
FIG. 1 illustrates a schematic illustration of a piping system showing a multiphase pump.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

The use of pumps is common across various applications, ranging from the drilling of wells to the supply of water. Depending on the intended use for a pump, it may be required to have different capabilities. For example, pumps must be able to produce sufficient head to deliver a required volume of fluid per unit of time to a desired location, and may additionally be required to be used with a range of fluids, from incompressible to compressible, and even multiphase fluids. Particularly when considering pumps pumping a compressible and multiphase fluids, excessive wear or damage may be experienced. This may be due, at least in part, to operation in unfavourable pump conditions. As such, recognition of such unfavourable pump conditions may be beneficial.

It can be difficult to identify unfavourable pump conditions by measuring the fluid flow and/or the composition of the fluid flow alone. This is especially true for multiphase pumps. This disclosure will provide a system for recognition of unfavourable pump operating conditions. In particular, this disclosure relates to the monitoring of pump operation to identify irregularities in fluid flow, which may be more conveniently measured and may provide a clearer indication of the pump operation condition.

Examples of two unfavourable pump operation conditions of pumps are "surge" and "choke". "Surge" is well known from rotating compressors and typically occurs at low flow rates. In this case, the pump impellers are suddenly not able to maintain the differential pressure they had established, the pressure drops and the pump flow is drastically reduced. In a short time period, e.g. a second or more, the differential pressure is re-established and then the cycle is repeated. This cycling may build up to very high levels and may prove to be detrimental to the motor and the pump.

The "choke" flow condition may appear at high flow rates, wherein the flow out of the pump impellers is "choked". This effect limits the differential pressure produced from each pump impeller and may be a source of instability of the rotor. "Choke" may be a source of increased local pressure fluctuations and rotor axial vibration, which may cause damage and/or excessive wear to the rotor, or associated pump.

Typically, the range of safe pump operation is defined by performing test runs to monitor the performance of a pump under different operating conditions. The acceptable range is then implemented into a control system in order to facilitate pump operation within safe margins. In addition, such testing may be used to identify acceptable parameter limits, and ranges of values for parameters that may be used to identify the "surge" and "choke" operating conditions. Previously, control systems may have been largely or completely dependent on the measurement of the pump operation by measuring fluid flow and/or fluid composition. This disclosure provides an alternative to traditional monitoring, facilitating and/or improving the accuracy of the detection of such unfavourable pump operation conditions.

FIG. 1 is a schematically illustrated piping system, showing a multiphase pump installation 13 for pumping fluid comprising an inlet 1 for the inflow of fluid and an outlet 50 for the outflow fluid, as well as a multiphase pump 20. The outlet 50 of the pump is in fluid communication with a fluid sink, via a sink conduit, which may be considered to be the desired location to which the pump 20 is pumping a fluid. The pump 20 in this example is a multiphase pump, which is suited for pumping a multiphase fluid (i.e. a fluid comprising both a liquid and a gaseous fraction); however, other types of pumps for various fluids may be applicable for this disclosure. The pump 20 comprises a rotor (which may comprise a plurality of multiphase impellers) and means for tracking the axial movement of said rotor (not shown in the Figure) relative to at least one other component of the pump 20, for example the housing of the pump, and/or the stator of the pump 20. The means for tracking the axial movement of the rotor may be e.g. a proximity sensor arrangement which may comprise one or a plurality of proximity sensors, configured to detect movement of an indicator on the rotor and thereby track the axial movement of said rotor. For example, the proximity sensors, or a proximity sensor, may be configured to detect or measure the axial position of the rotor as the rotor rotates. The axial position of the rotor may be determined by using the proximity sensor arrangement to measure the distance between the known position of the proximity sensor arrangement and a component of the drive shaft—for example a rotating disc on the drive shaft. The rotating disc may be preferably centralised on the shaft, and may have a flat and perpendicular surface. In other examples, the proximity sensor arrangement may measure a mark, protrusion or fin on the drive shaft, or and end of the drive shaft. The means for tracking the axial movement of the rotor (e.g. the proximity sensor arrangement) may be in the form of, or comprise, an optical sensor or sensors, and/or and eddy current sensor or sensors.

Additionally, the axial movement of the rotor may cause a vibration of the pump housing and/or stator. At least one accelerometer (e.g. one, two, three or more) may be coupled to any of the pump 20, its housing or its stator to measure the vibration of the pump 20. Measurements of the vibration of the pump and the axial movement of the rotor may be compared, analysed separately and/or any of these two may be measured and analysed solely, which may give a user an indication of the functioning of the pump. In some examples, such axial movement and/or vibration may provide an indication of the operation of the pump in unfavourable operating conditions.

The pump 20 may also be configured to measure the dynamic motor current and the dynamic shaft torque to identify irregularities in the pump operation.

Advantageously, the installation 13 comprises a buffer tank 10 for smoothing out gas slugs which may be present in a fluid as it enters the installation 13 at the inlet 1. The tank 10 may be considered a fluid source for the pump 20 with which it may be considered to be in fluid communication via a source conduit. A multiphase fluid comprising a liquid and a gas fraction may be flowed through the inlet 1 and into the buffer tank 10. Once in the tank 10, a degree of mixing of the multiphase fluid may occur. The mixing may at least in part be as a result of the constant inflow of fluid into the buffer tank 10. In this way the inflow to the pump may be a more stable mixture of liquid and gas than in a scenario without a buffer tank 10. This may allow more suitable operating conditions for the pump 20. In this example, there is a fluid connection via a fluid conduit from the inlet to the buffer tank 10, and on to the pump 20, which then extends to the outlet 50.

The installation 13 also comprises a bypass valve 9, which directly connects the inlet 1 and outlet 50 to enable a fluid bypass of the pump 20, for example in the case where fluid enters the installation 13 and does not require pumping, or if there is a requirement to pass fluid from the inlet 1 to the outlet 50 such that it may flow to a further component or piping installation (not shown) while the pump 20 is out of operation, for example.

The installation 13 further comprises a recirculation valve 30, advantageously in combination with a liquid extraction unit (LEU) 31. The recirculation valve 30 is connected to a recirculation pipeline, which provides a fluid connection between the outlet of the pump 20 and the buffer tank 10. The recirculation valve may be used to control fluid flow within the recirculation pipeline, by permitting a user to selectively permit fluid flow therethrough. The LEU 31 may be used to separate the liquid fraction from a multiphase fluid being pumped (e.g. a working fluid) after it has passed through the pump 20 and the recirculation valve 30 may reinject the separated liquid back into the buffer tank 10. This may be useful in cases where it is anticipated that liquid with a high gas fraction will enter the buffer tank 10. As such, the recirculation valve 30 may facilitate balancing of the liquid and gaseous fractions of a multiphase fluid entering the pump 20, which may assist to reduce wear on the pump 20 by example providing a flow of multiphase fluid to the pump 20 having a preferable ratio of gas to liquid fractions. The recirculation valve may be selectively operated by a user, only when required, in cases where a fluid at the inlet experiences a large and/or many slugs of gas contained therein. Alternatively, if it is known that a fluid with a particularly high gaseous fraction is flowing through the inlet 1 over a period of time, then the recirculation valve may be used to continuously control the ratio of gas to liquid fractions in the multiphase fluid.

Additionally or alternatively, the recirculation valve may be used in cases where the pressure at the outlet of the pump 20 is particularly high, which may cause an unsustainable differential pressure to act across the pump 20. In these cases, the pump 20 may be used to reduce the pressure at the outlet of the pump 20, by permitting fluid to flow from the outlet of the pump 20 and back into the buffer tank.

The installation 13 comprises a discharge isolation valve 40 in this example. Alternatively, a choke valve may be used as discharge isolation valve 40, even although an isolation valve 40 is used in this example. Here the discharge isolation valve 40 may be used to limit the flow rate of a fluid from the pump 20 by throttling or restricting the flow of fluid therethrough, thereby limiting the fluid outlet towards the outlet 50. This may have the effect of increasing the pressure at the outlet of the pump 20, which may be useful in cases where the pressure differential across the pump 20 is too low, or for other reasons that may cause the pressure at the outlet of the pump to be too low, or where an increase in the pressure at the outlet of the pump may be advantageous.

The installation 13 may comprise a suction isolation valve 2, advantageously with a suction isolation equalisation valve 3. These may control the suction of pumping fluid from the inlet 1 into the buffer tank 10, thereby allowing the flow of fluid into the buffer tank 10 to be increased or limited as required.

Between the inlet 1 and the buffer tank 10 and at the recirculation path to the buffer tank 10, there may be injection means 8,26. The injection means 8, 26 may be useful for injecting an additional substance into the fluid flow. The injection means 8,26 may for example inject methanol into the pumping fluid. The injection of methanol may be useful when a period of standstill is required, and may be used for displacing or flushing hydrocarbons from the installation 13 prior to a standstill period, and may additionally or alternatively be useful for repairs or retrieval of the pump 20.

The installation 13 of this example comprises pressure transmitters 5,18,22,35, which are designed to measure the pressure of the pumping fluid at various locations and may transmit the measured pressures to a computational unit to analyse the measured pressures. As explained above, knowing the pressure of a fluid at the outlet of the pump 20 may be useful, as may knowing the pressure of a fluid at the inlet of a pump 20, for example for calculating the pressure differential across the pump 20.

The installation 13 of this example also comprises temperature transmitters 6,17,23, which measure the temperature of the pumping fluid and may transmit the measured temperatures to a computational unit to analyse the measured temperatures.

The installation 13 as illustrated comprises a multiphase flow meter 16, which may be used to monitor properties of the pumping fluid, for example the flow rate, density or viscosity.

Here, the installation 13 comprises a level transmitter 11, which measures the filling level of the buffer tank 10 and transmits the filling level to a computational unit. This may be important to ensure that the installation 13 is receiving a desirable volume of fluid.

Figure 2:
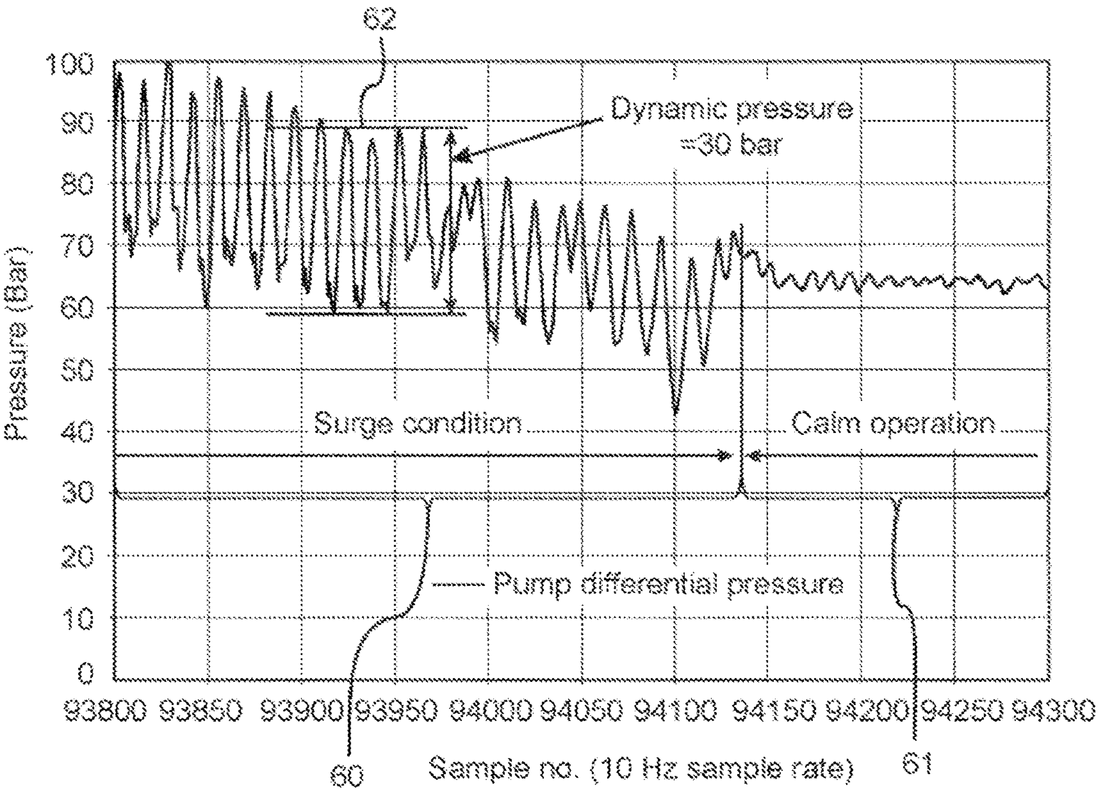
FIG. 2 illustrates a graph of differential pressure acting across a multiphase pump against time of operation of the multiphase pump.

FIG. 2 shows an example of a graph illustrating an example of a measurement of the pressure difference of the measurements of pressure transmitters positioned before and after the pump (e.g. at or adjacent the inlet and the outlet of the pump 20), in FIG. 1 the pressure transmitters are labelled with the numbers 22 and 18. Plotted is the change in differential pressure in bar acting across the pump over time, illustrated as a sampling rate of 10 Hz. Alternatively, the output pressure of the pump 20 may be measured instead of the differential pressure acting across the pump, which may be plotted in a similar manner to that shown in FIG. 2. A sampling rate of 10 Hz is selected in this example to ensure that measurements are taken quickly enough to gain an accurate appreciation of the change in differential, or output pressure of the pump 20, thereby facilitating the identification of the condition of the pump (e.g. whether the pump is operating normally, or in the surge/choke condition). Any appropriate sampling rate that permits a sufficient frequency of measurement to provide accurate results may be used, and it should be noted that there is no absolute requirement to use 10 Hz as indicated in this example. In this example, the rate of change of differential pressure changes significantly over time, as can be seen in FIG. 2.

As all the measured properties of the installation 13 change with time as they are being measured (e.g. oscillating), some properties in this application may be analysed based on the change of that property (e.g. the analysis of pressure may focus on the change or fluctuation of pressure within a certain, relatively short, time scale). An important value may therefore be the fluctuation in pressure, rather than the pressure reading itself. The pressure fluctuation may be equal to the local peak-to-peak difference 62 (i.e. the difference between the peak and trough of the pressure reading), which may be equal to twice the local oscillation amplitude. The term pressure fluctuation in this disclosure is to be understood as the local peak-to-peak difference of the respectively linked physical property of the installation 13. For example, the pressure fluctuation in FIG. 2 has a local mean value ranging from roughly sixty-five bar to eighty-five bar on the left operational range 60 of FIG. 2 and a mean value of roughly sixty-five on the right operational range 61 of FIG. 2. The pressure fluctuation, however, is at most five on the right operational range 61 of FIG. 2 and goes up to roughly forty on the left operational range 60 of FIG. 2. In effect, the pressure fluctuation reading on the left operational range 60 is much larger than the pressure fluctuation reading on the right operational range 61, as illustrated. The transition between a high pressure fluctuation reading and a lower may occur very rapidly, and as such a relatively high sampling rate (such as a sampling rate of 10 Hz) may be required in order to accurately identify the transition which, as will be described, may point to a change in the operating condition of the pump 20.

The left operational range 60 of FIG. 2 shows that the pump 20 being monitored is operating with a higher than desirable fluctuations of differential pressure, which can be contrasted against the fluctuations in differential pressure in the operational range indicated by reference numeral 61. In the operational range 60 shown in FIG. 2, the differential pressure fluctuates over time between a high pressure of 100 bar and a low pressure of approximately 43 bar (i.e. a fluctuation of between 55 and 60 bar—approximately 57 bar). In contrast, in the operational range 61 on the right of FIG. 2, the fluctuation in differential pressure is much smaller in comparison, approximately in the range of 5 bar. In the operational range 60 on the left of FIG. 2, where the fluctuation in differential pressure is much higher, in this example the fluctuations cause the differential pressure to fluctuate between a high pressure that is higher than a desirable operating pressure, and a low pressure that is lower than a desirable operating pressure. In the context of this disclosure, high pressure fluctuations may be an indication of a phenomenon known as "surge", which may be identifiable on the illustrated graph by at least one of a heavily oscillating differential pressure as described before, and therefore a high reading of pressure fluctuation (which may be termed dynamic pressure) and a high reading of dynamic axial position of the rotor (e.g. larger than expected, or desired, changes in the axial position of the rotor). When the pump 20 is operating under surge conditions, damage may be caused to the rotor and/or impellors of the pump. In some examples, the highly oscillating pressure reading may indicate that there is a high differential pressure acting across the pump 20, which the pump 20 is not able to contain. As such, this may cause pressure to be lost from the pump 20, and result in rapid pressure fluctuation thereacross, which may result in damage to the pump 20 itself. Damage produced by this phenomenon may be mitigated by increasing the volume of fluid flow to the pump, thereby reducing the differential pressure acting across the pump 20. As previously described, this may be achieved by use of the recirculation valve 30, which may permit a reduction in pressure at the outlet of the pump 20, thereby making operation in the surge condition less likely, and allowing a reduction in damage caused to the pump 20 during operation.

On the right operational range 61, however, the pump is operating in a stable condition and the differential pressure shows a calm operation, which may be considered to be a normal or desirable state of operation. Here, the reading of pressure fluctuation can be observed to be much lower than on the left operational range 60. As illustrated, the monitoring of the difference in pressure fluctuation may be an alternative to monitoring other parameters such as the flow rate, frequency or the like, and may alleviate certain drawbacks associated with monitoring flow rate, such as having to measure and/or calculate the density or directly measure the flow rate of a multiphase fluid, or having to perform a complex frequency analysis in order to ascertain the operating condition of the pump (e.g. whether the pump is operating in a stable condition, surge condition or choke condition).

One solution for transitioning from having a reading similar to that of the left operational range 60, which may be a harmful operation condition for the pump, to a reading similar to that of the right operational range 61 may be to increase the pump flow rate by increasing pump speed. Increasing the pump speed may have the effect of increasing the fluid flow through the pump 20, thereby reducing the pressure at the output of the pump 20, and moving away from the surge operating condition. As can be seen, the graph of FIG. 2 shows the pump operation transitioning from surge to normal operating conditions, which may be due to effective use of an increase in speed of the pump 20 to move away from the surge condition.

Figure 3:
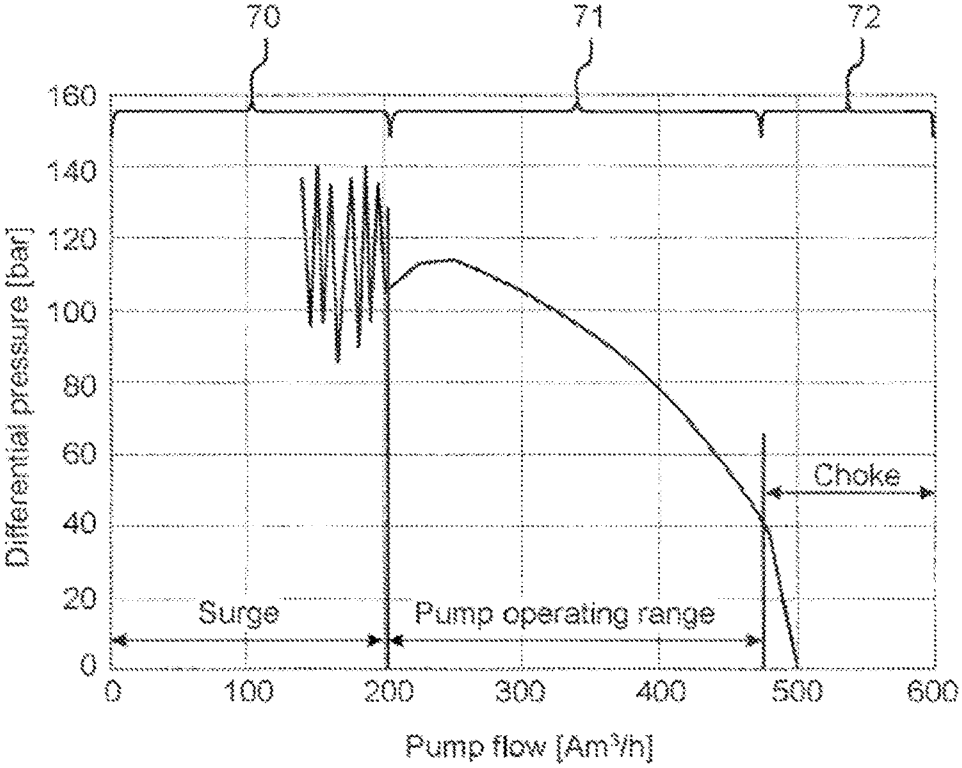
FIG. 3 illustrates a graph of differential pressure acting across a multiphase pump against flow rate through the multiphase pump.

FIG. 3 shows an example of a graph illustrating the pressure difference of the measurements of pressure transmitters positioned before and after the pump, in FIG. 1 these are labelled with the numbers 22 and 18. Plotted is the pump differential pressure in bar over the pump flow rate. In this example, the left operational range 70 illustrates a reading that may be displayed on such a graph during a surge condition, and corresponds to the operational range 60 from the graph of FIG. 2. The middle operational range 71 shows the pump in an ordinary operation state, similar to operational range 61 from FIG. 2, which may correspond to a normal (e.g. a desirable) operating condition. The right operational range 72 illustrates a reading that may be present during the choke operating condition, wherein the differential pressure drops above a critical flow rate. To detect whether the pump 20 is functioning in the choke operating condition, further information in addition to the monitoring of the differential pressure fluctuation or differential pressure may be helpful to assist in the identification of the choke operating condition. Therefore, the axial position of the rotor of the pump may be measured to provide additional information to a user on the operating conditions of the pump 20.

The choke operating condition may result in an unstable behaviour of the rotor position, similar to the surge operating condition creating an unstable reading of the differential pressure as shown in FIG. 2. As the rotor begins to operate in the choke operating condition, shown as operational range 72 in FIG. 3, and the rotor will start to "jump". This jumping of the rotor may result in sudden oscillations in the axial direction thereof, and therefore this information may be used to monitor whether or not the pump is operating according to the choke operating condition. The axial position (e.g. the change in axial position) of the rotor therefore is an indicator of the choke operating condition, which as described is damaging to the pump.

Figure 4:
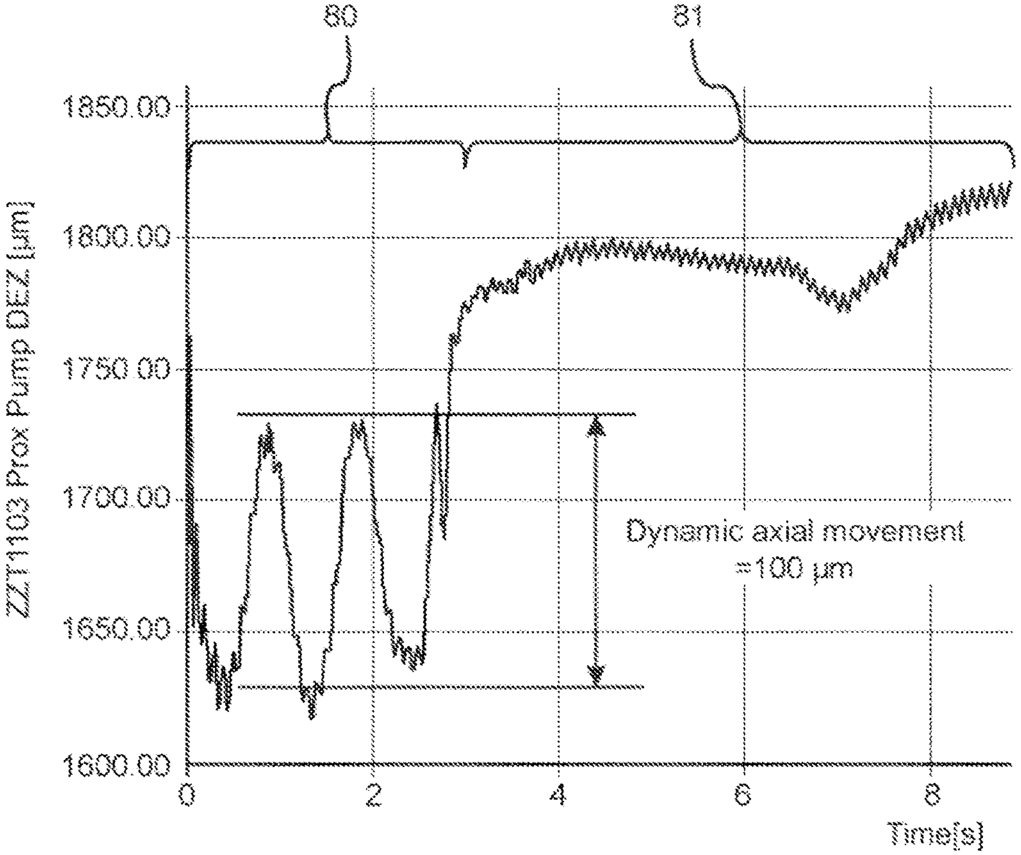
FIG. 4 illustrates a graph of the axial position of the rotor of a pump against time as a multiphase pump functions.

FIG. 4 is a graph illustrating the axial position of the rotor in one dimension parallel to the longitudinal axis of the rotor plotted over the time in seconds from the start-up of the pump. As can be seen, the pump rotor starts to "jump" at a start-up operation range 80 (e.g. alternate rapidly between multiple axial locations), before reaching a stable operation range 81 in which axial movement of the pump rotor may still be measured, but occurs is a smoother, less erratic, and less extreme way as compared to the pump operational range 80. The same effect may occur when ramping-up or ramping-down the pump. A similar reading showing oscillation of the rotor of the pump 20 may be shown if the pump enters the choke operating condition. Therefore, the method of preventing damage to a multiphase pump may comprise measuring the axial position of the rotor of the pump over a time period. In measuring the axial position of the rotor over time, the change in axial position may be observed, which may assist to identify whether the pump has entered a particular operating condition e.g. the choke operating condition. As illustrated in FIG. 4 the position of the rotor of the pump is measured relative to some reference point, and oscillates between a "minimum" value and a "maximum" value. The reference point may be, for example, the position of the rotor at the startup of operation, the position of the rotor during initial operation, or an arbitrarily designated position that is assigned for the purpose of measuring axial movement of the rotor of the pump. The "minimum" value of the axial position of the rotor may correspond to the most extreme position of the rotor in a first direction (e.g. a first direction parallel to the longitudinal axis of the rotor of the pump), while the "maximum" value of the axial position of the rotor may correspond to the most extreme position of the rotor in a second direction (e.g. a second direction parallel to the longitudinal axis of the rotor of the pump). Here, the "most extreme position" refers to the most extreme position of the rotor during a single oscillation, such that for each oscillation, a different "most extreme" position may be observed. The first direction may be directly opposite the second direction. As such, relative to the graph of FIG. 4, the "minimum" value of the axial position of the rotor of the pump may correspond to a trough (see, for example, the troughs in the operation range 80 in FIG. 4), while the "maximum" value of the axial position of the rotor may correspond to a peak (see, for example, the peaks in the operation range 80 in FIG. 4).

In light of the above, the graphs of FIGS. 3 and 4 may be used to identify whether the pump has entered the choke operating condition, and allow the user to take action to prevent excessive damage to the pump 20. Again, this may be beneficial to the user, because it allows the user to ascertain the operating condition of a pump simply by viewing the peak-to-peak, or peak-to-trough difference on a graph. In contrast, other known techniques may involve the measurement of other parameters that require complex calculations (e.g. complex frequency calculations) in order to ascertain the operating condition of a pump. Not only may such methods be more prone to error because of their complexity, but may also be more time consuming and costly to perform.

One action that a user may take to mitigate against operating in the choke operating condition is to limit the flow of a fluid through the pump 20. Limiting of the fluid flow through the pump may have the effect of increasing the differential pressure across the pump 20, which may bring the pump out of the choke operating condition and into the normal operating condition. In the example illustrated in FIG. 1, this may be achieved by restricting flow through a valve downstream of the pump 20. As illustrated, the discharge isolation valve 40 is located downstream of the pump 20 in FIG. 1. Therefore closing, or partially closing, the discharge isolation valve 40 may have the effect of increasing the differential pressure across the pump as desired.

In some examples, there may be a control system in place which may be configured to recognise the choke and surge conditions, and which may then be able to take appropriate action (e.g. by closing, or partially closing the discharge isolation valve 40 via an actuator, by reducing the pump speed, or the like) without direct intervention being required by a user.

The monitoring of the pump conditions may feature means to circumvent raising of alarms at during normal pump operation conditions or planned events that may otherwise trigger an alarm to signal choke and/or surge operating conditions (e.g. such as during startup of the pump, intentional ramping up or ramping down of the rotor rotational speed, or periods of pump inactivity. These means may for example be the analysis of limited time windows, e.g. three to five seconds, a band-pass filter with a range of e.g. one half to five Hertz or a signal from the pump control to get a notification of planned events resulting in changes in the monitored pressure or axial rotor position, e.g. ramping up or down of the rotor speed as already described.

The person skilled in the art realises that the disclosure of FIGS. 1 to 4 is not limited to the preferred embodiments described in relation to those Figures. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

A Multiphase Pump and a Method of Pumping a Multiphase Fluid

Now referring to FIGS. 5 to 8B, there is provided an improved multiphase pump and method of pumping multiphase fluid. According to an example embodiment there is provided a multiphase pump, comprising: a housing comprising a flow inlet and a flow outlet fluidly connected by a flowpath; a rotor located in the flow path of the housing, configured to propel a fluid from the flow inlet to the flow outlet via the flow path, the rotor comprising a longitudinal axis extending the length of the rotor and a multiphase impeller; at least one leak path located in the multiphase pump, permitting reverse flow of a fluid from the flow outlet to the flow inlet; at least one channel defined within the housing, and configured to direct a liquid from a liquid source to one of the at least one leak paths in the multiphase pump.

The multiphase pump may be used to transfer a multiphase fluid from one location to another. The multiphase fluid may be, for example, a hydrocarbon fluid, or may be an injection fluid, such as a surfactant. The pump may be used in a subsea location (e.g. a wellbore or subsea structure), or may be used on an offshore platform, or onshore hydrocarbon recovery plant. Having a channel defined in the housing to direct a liquid from a liquid source to a leak path may have the effect of greatly improving the efficiency of the multiphase pump. In some cases, there may be a leak path in the pump that is prone to permitting leakage of a fluid therethrough, for example leakage of a gas therethrough, from a high pressure region within the pump, to a lower pressure region in the pump. In cases where the leak path permits leakage of a gas, the flow rate of the gas leakage may be very high, which may be due to the gas having a low density. As a fluid leaks within the multiphase fluid, there will be a reduction in pressure of the leaked fluid, meaning that the multiphase pump will once again have to perform work on the fluid in order to increase its pressure for expulsion from the pump. As such fluid leakage may greatly reduce the efficiency of the pump, particularly when the leakage occurs at high flow rates, as is the case with gas leakage. One way to mitigate against this problem is to provide a supply of liquid to the leak path, thereby at least partially displacing the leaked gas, and reducing the flow rate of leakage fluid. In turn, this has the effect of improving the overall efficiency of the multiphase pump.

Figure 5:
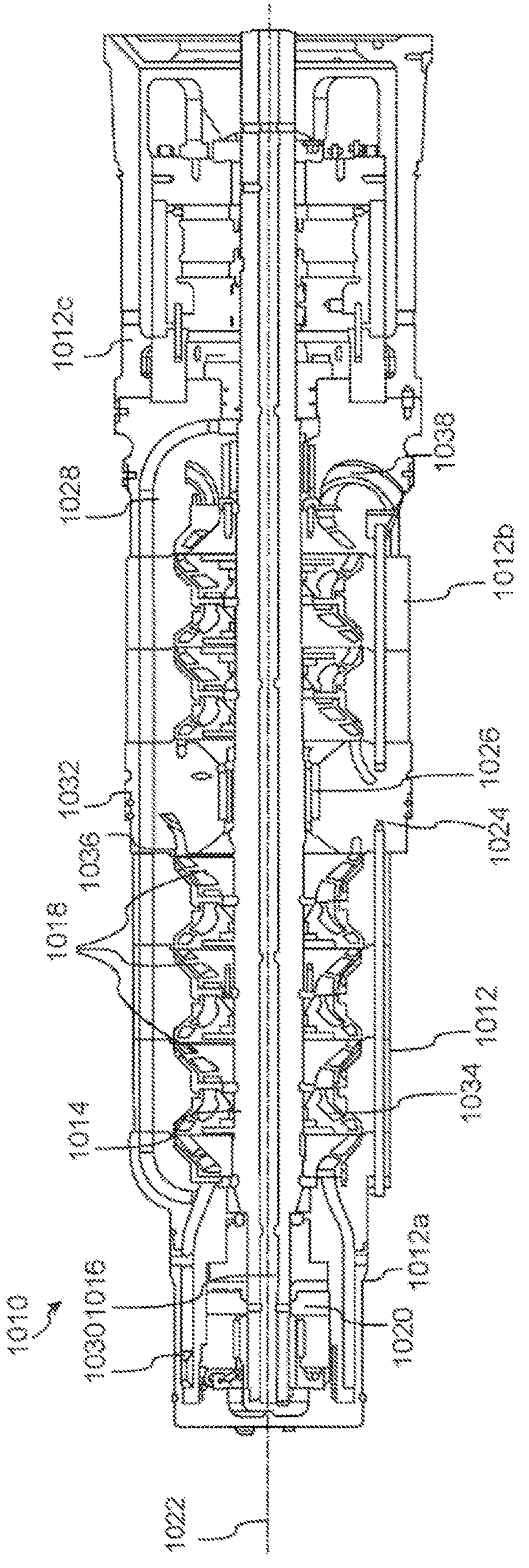
FIG. 5 shows a cross sectional view of a multiphase pump.

To provide context to the described aspects and examples, FIG. 5 illustrates an example of a multiphase pump 1010. The multiphase pump 1010 comprises a housing 1012, which in this case comprises multiple parts. In particular, in this example, the housing comprises a first support housing 1012*a* and a second support housing 1012*c*, located at either axial end of the housing 1012. The first and second support housings 1012*a*, 1012*c* support a rotor 1014, which itself comprises a drive shaft 1016 and a plurality of impellers 1018. At least one of the first support housing 1012*a* and the second support housing 1012*c* may comprise a bearing arrangement 1020 which supports an axial end of the drive shaft 1016 within the housing 1012, and permits rotation of the drive shaft about its longitudinal axis 1022. In some cases, both the first support housing 1012*a* and the second support housing 1012*c* may comprise a bearing of the bearing arrangement 1020, and may additionally comprise a drive arrangement for rotation of the drive shaft 1016. The drive arrangement may be a motor, for example. The bearing arrangement 1020 may provide both axial and radial support to the drive shaft 1016, and in this example the bearing arrangement comprises a thrust bearing.

As can be seen in FIG. 5, the housing 1012 additionally comprises an impeller housing 1012*b*, which houses the mid-section of the drive shaft 1016, as well as the plurality of impellers 1018. In this example, the impeller housing 1012*b* is modular and is comprised of a plurality of parts, although the skilled person will appreciate that having an impeller housing 1012*b* comprising one single part is also possible. As illustrated, several of the plurality of parts of the impeller housing 1012*b* are substantially similar, which may facilitate manufacture of the impeller housing 1012*b*. As will be described in more detail in the following paragraphs, the impeller housing 1012*b* may comprise a part or parts that are unique in their geometry. For example, here the impeller housing 1012*b* comprises a central support part 1024 that engages the drive shaft 1016, and may provide support (e.g. radial support) to the drive shaft 1016 while facilitating rotation thereof. To permit the central support part 1024 to radially support the drive shaft 1016, while enable rotation of the drive shaft 1016, a bushing 1026 is located between the drive shaft 1016 and the central support part 1024. The bushing 1026 may also provide a degree of sealing between the central support part 1024 and the drive shaft 1016, to assist to prevent fluid leakage between the central support part 1024 and the drive shaft 1016. In addition, the impeller housing 1012*b* comprises a connection part 1028 for connection of the impeller housing 1012*b* to the second support housing 1012*c*, which may comprise a motor, as described. As will be explained in further detail, the connection part 1028 may additionally assist to direct fluid flow from an inlet of the multiphase pump 1030, and towards an outlet of the multiphase pump 1032. In some examples, the central support part 1024 may be required to provide more support than in other examples. Where the drive shaft 1016 is thicker, then less radial support may be required than in cases where the drive shaft is thinner. In the illustrated example, the drive shaft is relatively thick, and therefore support of the rotor by the busing 1026 may not be strictly necessary. In addition, having a thicker drive shaft (e.g. one that requires no support from the bushing 1026) may also assist the pump 1010 to operate in dry conditions (e.g. conditions where there is no, or very little, liquid flow in the pump), as the shaft may rely less, or not at all, on radial support provided by a liquid being pumped. The relative thickness of the drive shaft 1016 may be a function of the length of the drive shaft 1016.

In this case, having a modular impeller housing 1012*b* comprised of a plurality of parts may provide the user flexibility to have a varying number of impellers on the shaft, depending on the head required by the multiphase pump. Additionally, this feature may provide a multiphase pump 1010 that is more easily manufactured than if the housing were to be provided in a single part.

As previously described, the rotor 1014 comprises both a drive shaft 1016 and a plurality of impellers 1018, which may be considered to be an impeller arrangement. In this example, the impeller arrangement may comprise a combination of multiphase impellers (i.e. impellers that are suitable for use in pumping a multiphase fluid, for example one containing both a liquid and a gas fraction) and single-phase impellers may be present. As such, this multiphase pump 1010 may be considered to be a hybrid multiphase pump. The impellers 1018 may be arranged such that the multiphase impellers are positioned towards the inlet, while single-phase impellers are positioned towards the outlet, such that multiphase impellers are used to pump (e.g. increase the pressure of) a fluid initially upon entry via the inlet, while single-phase impellers are used to increase the pressure of a fluid thereafter as the fluid flows towards the outlet. In some other examples, the use of a multiphase pump 1010 having only multiphase impellers may be possible. Having a hybrid multiphase pump may permit a fluid to be pumped with improved differential pressure generation, and improved efficiency. A hybrid multiphase pump may be used in cases where a fluid to be pumped has a lower gas fraction (e.g. from 10 to 50 percent Gas Volume Fraction (GVF)). As the fluid is compressed by the multiphase impellers, the GVF may decrease, such that as the fluid reaches the single-phase impellers, the GVF may be in the range 5-15%. In this range of GVF, a single-phase impeller may be able to effectively pump a multiphase fluid.

According to this disclosure, each of the multiphase impellers and each of the optional single-phase impellers may have substantially the same geometry, with each of the multiphase impellers having a generally frustoconical shape. As can be seen in this example, the impellers are oriented such that the central axis of each of the impellers 1018 is aligned with the axis 1022 of the drive shaft 1018. The impellers are designed such that a fluid flows from the smaller diameter end of the each impeller 1018 and towards the larger diameter end. In this example, each impeller 1018 comprises a solid frustum-cone shape with at least one channel therein, extending in both an axial and radial direction through the impeller 1018. The skilled person will also appreciate that there may be some examples in which there is no diametrical difference in the impellers, such that the diameter of the side of fluid entry to the impeller 1018 is the same as the diameter of the side of fluid exit from the impeller 1018.

Upon exit from each impeller 1018, the multiphase fluid may have both an axial and a radial component of velocity. The axial component of velocity, or a majority of the axial component of velocity, may be considered to be acting in a direction that is tangential to the blades of each impeller 1018. Additionally, the axial component of the velocity may be the important component of velocity for driving a fluid through the multiphase pump 1010, and generating the head of the multiphase pump 1010. To assist in passing the multiphase fluid through the multiphase pump 1010, the multiphase pump 1010 may comprise a fluid diffuser 1034 located axially adjacent at least one impeller 1018. For example the multiphase pump 1010 may comprise a fluid diffuser 1034 located axially between every two impellers 1018 on the drive shaft 1016. The fluid diffuser 1034 may assist to direct fluid from the outlet of a one impeller 1018 to the inlet of the following impeller 1018. Between each fluid diffuser 1034 and the drive shaft may be a seal or arrangement of seals, and/or a bushing to assist in permitting rotation of the drive shaft 1016 relative to each fluid diffuser 1034.

In the example shown, the impellers 1018 may be coupled to the drive shaft 1016, or they may be integrally formed with the drive shaft 1016. Either side of the central support part 1024 are located a plurality of impellers 1018 according to this example. On one side of the drive shaft 1016, which may be the proximal side of the drive shaft 1018 to the inlet 1030 and/or the first support housing 1012*a*, the impellers 1018 may be configured such that each of the impellers 1018 faces a first direction, while on the opposite side of the drive shaft, which may be the distal side of the drive shaft to the inlet 1030 and/or the second support housing 1012*c*, the impellers 1018 may be configured such that each of the impellers 1018 faces a second direction, which may be opposite to the first direction. The impellers 1018 facing the first direction may be considered to be a first impeller arrangement, while the impellers 1018 facing the second direction may be considered to be a second impeller arrangement. In this example, each of the impeller arrangements are configured to move a multiphase fluid being pumped towards the central support part 1024. As will be described in further detail herein, the housing 1012 comprises a conduit, which may be defined by the housing 1012 itself, to transfer a multiphase fluid from an outlet 1036 of the first impeller arrangement to an inlet 1038 of the second impeller arrangement. The conduit may extend through the central support part 1032 and through the impeller housing 1012*b* towards the connection part 1028. The inlet 1038 of the second impeller arrangement may be located in the connection part 1028, where the multiphase fluid may be delivered form the outlet 1036 of the first impeller arrangement.

In this example, the first impeller arrangement is configured to receive fluid from the inlet 1030 at an inlet pressure, and pressurise the fluid to a mid-pressure as it is moved from the inlet towards the central support part 1024 and the outlet 1036 of the first impeller arrangement. Once the fluid reaches the outlet 1036 of the first impeller arrangement, the conduit (which in this case is defined by the housing) carries the mid-pressure multiphase fluid from the outlet 1036 of the first impeller arrangement to the inlet 1038 of the second impeller arrangement. The second impeller arrangement is then configured to move the multiphase fluid in a direction towards the central support part 1024 and towards the outlet 1032. Once the multiphase fluid reaches the outlet 1032, the multiphase fluid will be at the outlet pressure, which is the pressure of the multiphase fluid that is desired by a user. As such, a flow path may exist within the multiphase pump 1010 from the inlet 1030 to the outlet 1032 via the first impeller arrangement and the second impeller arrangement.

Having a drive shaft 1016 with a first and second arrangement of impellers 1018 having opposite orientations may assist to balance forces (e.g. thrust forces) acting on the drive shaft 1016 as a result of the rotation of the impellers 1018 providing oppositely directed forces on either side of the bushing 1026. As such, this arrangement may assist to minimise forces acting on, for example, a thrust bearing or bearings of the bearing arrangement 1020 which may improve operation, and prolong the lift, of the thrust bearings of the bearing arrangement 1020. Such an arrangement may be known as a back-to-back impeller arrangement.

Due to the nature of the back-to-back impeller arrangement, there may be a high pressure differential acting across the central support part 1032, between the outlet 1036 of the first impeller arrangement and the outlet of the second impeller arrangement, leading to the outlet 1032 of the multiphase pump 1010. In particular, the pressure acting across the central support part 1032 may be equal to the difference between the multiphase fluid at mid-pressure and at outlet pressure, which may be significant. As such, the bushing 1026 may provide significant sealing capacity in order to restrict fluid leakage through the central support part 1032—in particular at the interface between the drive shaft 1016 and the central support part 1032. Other techniques may be additionally employed to restrict fluid leakage, as will be described in the following paragraphs.

As is illustrated, the housing 1012 comprises a cavity which has a shape corresponding to the rotor 1014, so as to house the rotor therein. In particular, the cavity inside the housing may have a diameter that changes with the axial position along the housing, so as to accommodate each of the impellers 1018 and flow diffusers 1034, while maintaining a low clearance between the rotor 1014 and the housing 1012 itself. Due to this low clearance, it may be necessary to include a wear ring between each impeller 1018 and the surrounding housing 1012, to reduce wear on both the housing 1012 and impeller 1018. The wear ring may be provided at least between the housing and the smaller diameter end of each frustoconical impeller 1018. In some examples, the wear ring may additionally provide a degree of sealing between the relevant impeller 1018 and the surrounding housing 1012. In this way, the wear ring may assist to prevent backflow of the multiphase fluid through the multiphase pump 1010.

As the rotor 1014 rotates within the housing, a centrifugal force may act upon the multiphase fluid as it flows through the flow path which may be defined the housing 1012. Due to the multiphase fluid being comprised of fractions having differing densities, the centrifugal force may have the effect of at least partially separating the multiphase fluid into a liquid and a gas fraction, with the liquid fraction being located in a radially outer zone of the flow path, while the gas fraction may be located in a radially inner zone of the flow path, for example the zone surrounding the drive shaft 1016.

Figure 6A:
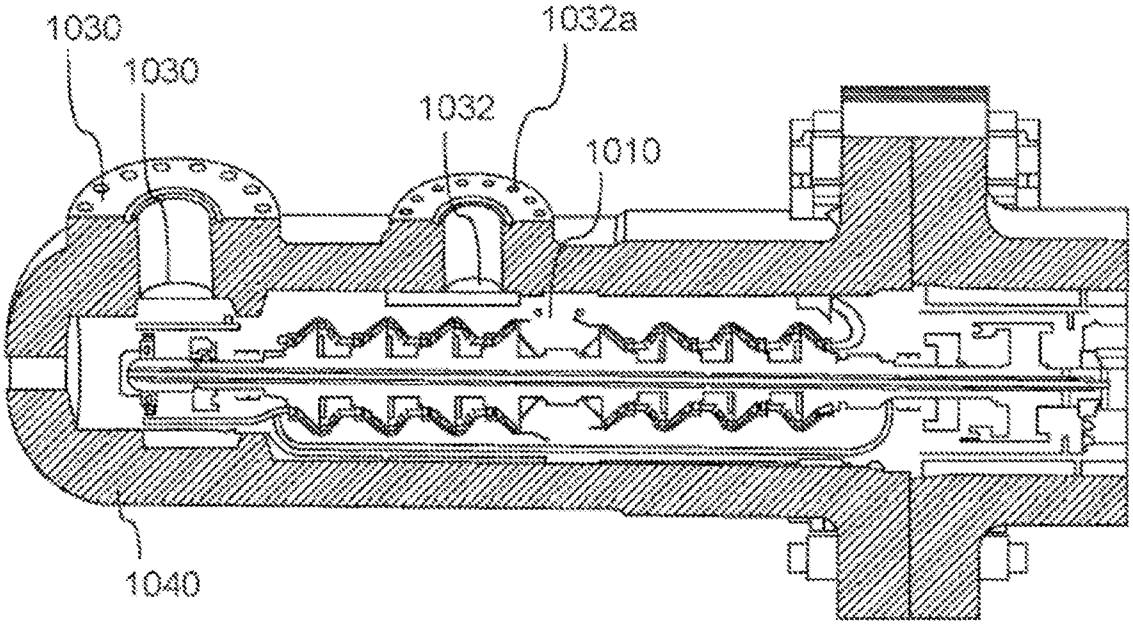
FIGS. 6A and 6B show a further example of a multiphase pump, with further detail of an exemplary rotor and positioning in use.

FIG. 6A illustrates the multiphase pump 1010 as previously described contained within an external pressure housing 1040. The positioning of the inlet 1030 and the outlet 1032 can be more clearly viewed in FIG. 6A as compared to FIG. 5. As can be seen, each of the inlet 1030 and the outlet 1032 have a corresponding attachment mechanism 1030*a*, 1032*a* for attachment of a conduit or device thereto. In this case, the attachment mechanisms 1030*a*, 1032*a* are suitable for bolting a flange thereto, although the skilled reader will appreciate that other attachment mechanisms may be possible. In order to prevent fluid leakage from the outlet 1032 to the inlet 1030 in the annulus between the pressure housing 1040 and the multiphase pump 1010, the multiphase pump may engage the pressure housing 1040 at at least one location axially between the inlet 1030 and the outlet 1032, and a seal or arrangement of seals may be located between the multiphase pump 1010 and the pressure housing 1040.

Figure 6B:
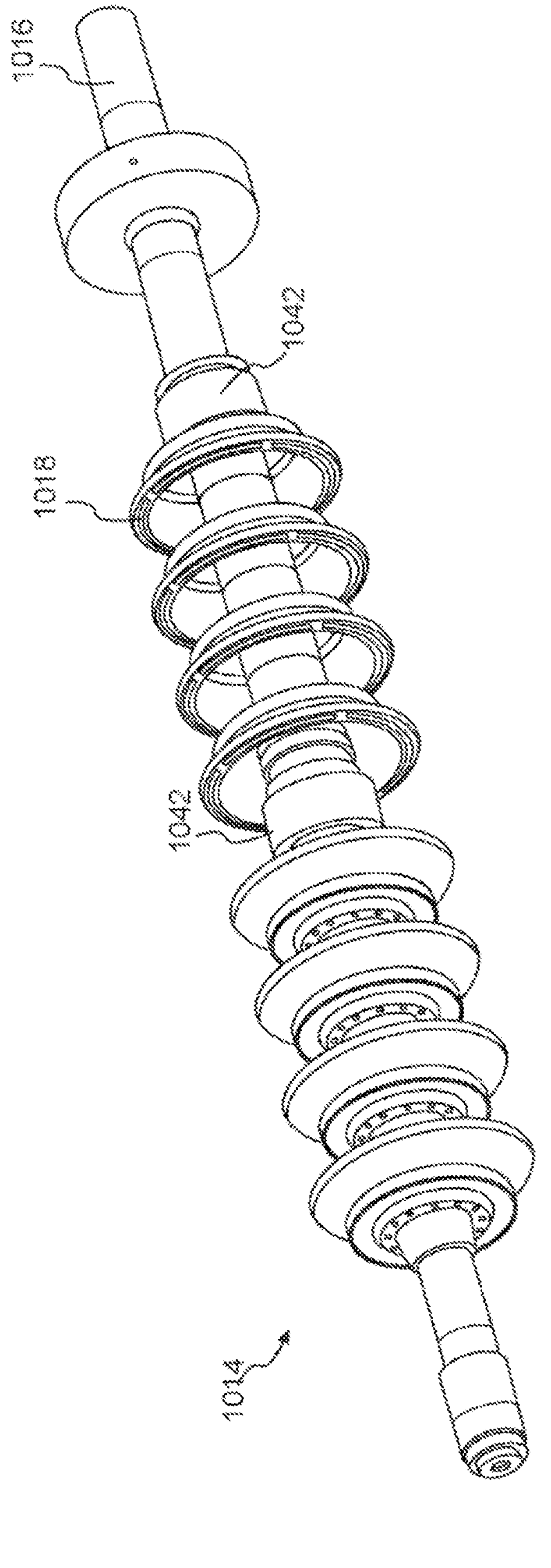

In FIG. 6B, there is illustrated the rotor 1014 of FIG. 5. As can be seen, the rotor 1014 comprises eight impellers 1018 coupled to the drive shaft 1016. In other examples, the impellers 1018 may be integrally formed with the drive shaft 1016, and there may be more or fewer than eight. As previously described, the impellers 1018 are divided into a first and a second impeller arrangement. According to this example, each of the first and second impeller arrangements comprise an equal number of impellers 1018, which here is four. The drive shaft 1016 additionally comprises sections of increased diameter 1042, which may be treated or polished to minimise interference with the housing 1012 when the driveshaft rotates. For example, these sections 1042 may have a more polished surface to assist in sealing and to reduce wear between the drive shaft 1016 and the housing 1012, and/or may comprise a different material to the rest of the drive shaft, which may be a harder material, to reduce the effect of wear on these parts of the drive shaft 1016.

Figure 7B:
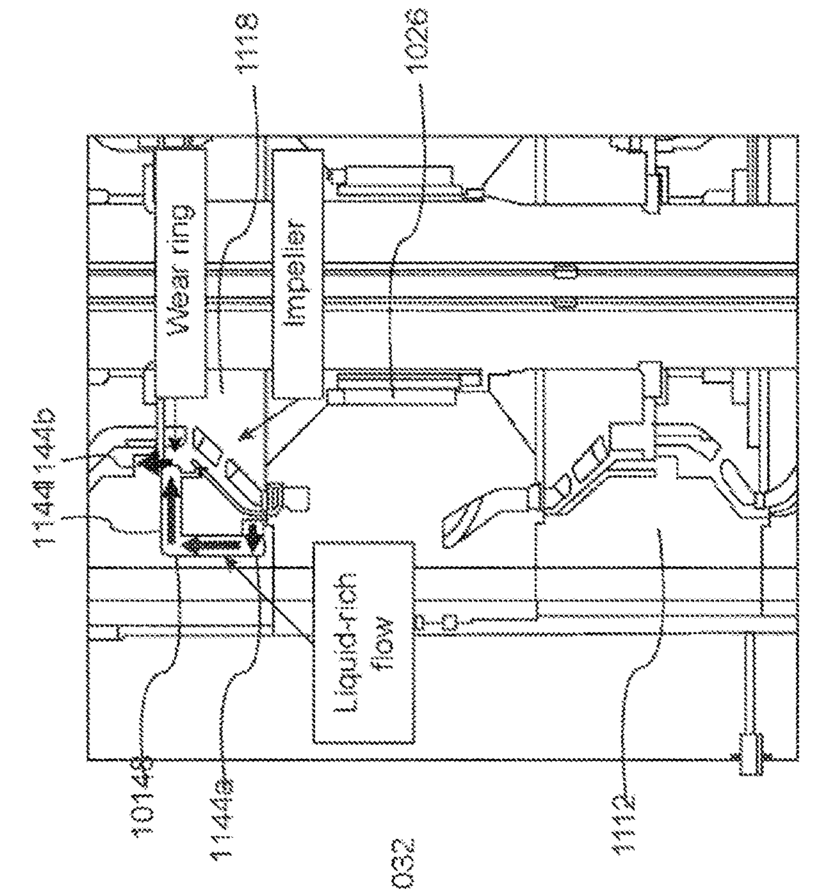
FIGS. 7A and 7B illustrate examples of a channel and a leak path in a multiphase pump.
Figure 7A:
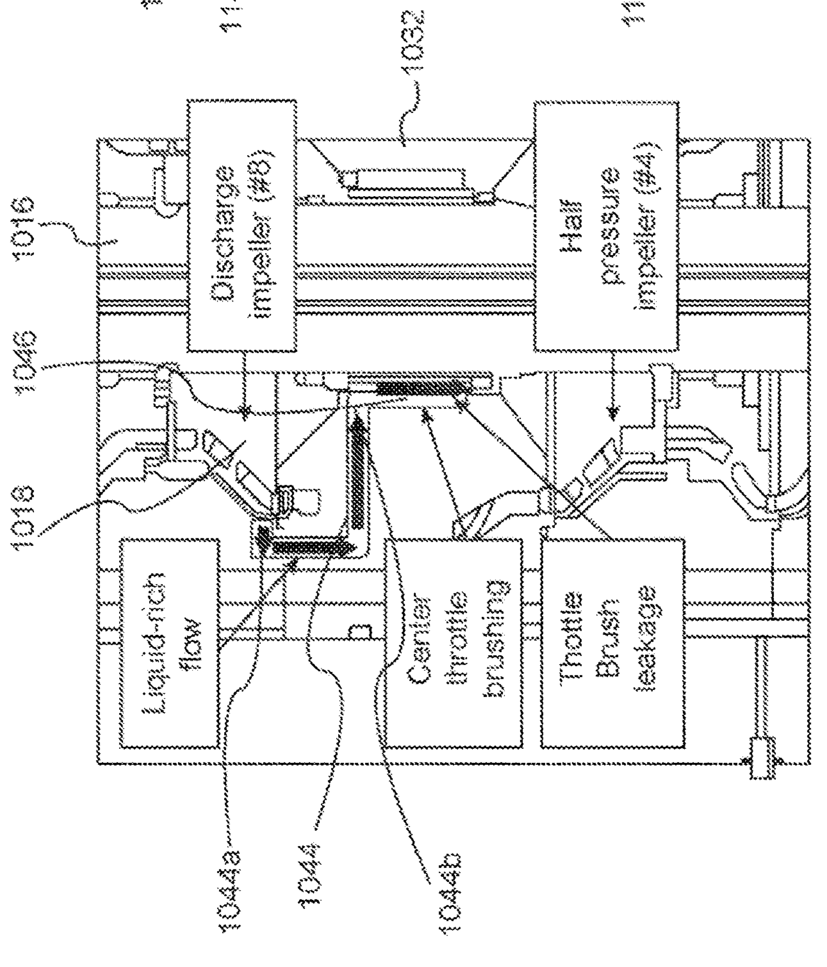

FIGS. 7A and 7B illustrated cross-sectional views of sections of the multiphase pump 1010, showing a channel 1044 for directing a liquid from a liquid source to a leak path 1046 in the multiphase pump 1010. In the case of FIG. 7A, the leak path 1046 is located in the central support part 1032 adjacent the bushing 1026, and in the direction from the outlet of the second impeller arrangement to the outlet of the first impeller arrangement, between which there may be a significant pressure difference. While the bushing 1026 may assist to provide a degree of sealing, due to the high pressure differential that may act across the bushing 1026, some degree of leakage may be present.

As the bushing 1026 surrounds the drive shaft 1016, as the rotor 1014 (see FIG. 5) rotates, then the bushing 1026 may be located in a radially inner zone of the flow path. As previously described, the radially inner zone of the flow path may comprise a higher proportion of the gas fraction of the multiphase fluid, and therefore the leakage through the central support part 1032 may be mainly leakage of gas. This type of leakage (e.g. gas leakage) may be particularly problematic, as it may occur at high flow rates compared to leakage of a liquid. Further, any fluid leaking from the outlet of the second impeller arrangement to the outlet of the first impeller arrangement will experience a pressure drop from the outlet pressure to the mid-pressure at the outlet of the first impeller arrangement. This leaked fluid will require to be pressurised again, thereby reducing the efficiency of the pump.

In order to reduce the flow rate of leaked fluid, the channel 1044 may be used to direct fluid flow from a zone of high-density flow (which may be liquid-rich flow) within the flow path. As previously described, due to the centrifugal force acting on the multiphase fluid, the fluid flow may form a higher-density zone at a radially outer region in the flow path, and a lower-density zone at a radially inner region of the flow path. As such there may be likely to be a higher proportion of the liquid fraction of the multiphase fluid at radially outer zones in the flow path. Therefore, in this example, the channel 1044 comprises an inlet 1044*a* located in a radially outer region of the flow path. In particular, here the inlet is located at the outlet of the second impeller arrangement, at the region of the flowpath and the final impeller 1018 of the second impeller arrangement where the diameter is widest. The channel 1044 also comprises an outlet 1044*b* located adjacent the bushing 1026, at the side of the busing axially proximate the outlet of the second impeller arrangement. In this example, the channel 1044 is defined by the housing, in particular the impeller housing 1012*b*. However, in some examples, the channel may be entirely defined by a conduit which may be contained within the housing.

Having a channel 1044 as defined in FIG. 7A may assist to provide a source of liquid to the bushing 1026. The liquid may displace any gas that was leaking through a leak path at the bushing 1026. As the liquid fraction is of a greater density (and a greater viscosity) than the gas fraction, then the volume flow rate of the leaked liquid will be less than that of the leaked gas, meaning that there will be a smaller volume of fluid requiring to be repressurised as a result of the leak path. As such, having the channel 1044 may have the effect of increasing the efficiency of the multiphase pump 1010. In addition, the provision of a liquid at the bushing 1026 may improve lubrication of the bushing 1026, and may in some cases increase the dissipation of heat from the bushing as a result of friction from the rotating drive shaft 1016—for example where some contact with the rotating drive shaft 1016 occurs as a result of general wear within the multiphase pump 1010.

Illustrated in FIG. 7B is an example of a multiphase pump 1010, having a channel 1144 different to that as previously illustrated. As in the previous example, this channel is also defined by the impeller housing 1012*b*, and the inlet 1144*a* of the channel is located at a radially outer region of the flow path. As before, in particular the inlet 1144*a* of the channel is located at the outlet of the second impeller arrangement, at the region of the flowpath and the final impeller 1018 of the second impeller arrangement where the diameter of the frustoconical impeller 1018 is the widest. In contrast, in this example the outlet of the channel 1144*b* is located adjacent the smaller diameter end of the final impeller of the second impeller arrangement, which is located in a radially inner region compared to the channel inlet 1144*a*. As previously described, the smaller diameter end of the final impeller may comprise a wear ring 1048 located radially adjacent thereto to reduce wear between the housing 1112 and the impeller 1118, and which may also provide some degree of sealing between the impeller 1118 and the housing 1112 to prevent backflow of a fluid therethrough. However, the wear ring 1148 may also be the source of a leak path, which may be significant given that the wear ring may be located at a radially inner region of the flow path. As such, the presence of channel 1144 may assist to reduce the volume of leaked fluid, by displacing the leakage of gas with the leakage of liquid, as described in relation to FIG. 7A. Similarly, the fluid may have a lubricating effect on the wear ring 1148. As before, the channel 1144 is defined by the housing 1112. However, it may be possible to define the channel 1144 by a conduit located in the housing, or by other means.

While the channel 1144 is shown in respect of only one impeller 1118 in the multiphase pump 1010, such a channel may be repeated for each impeller of the multiphase pump, thereby further improving the efficiency of the multiphase pump.

Figure 8A:
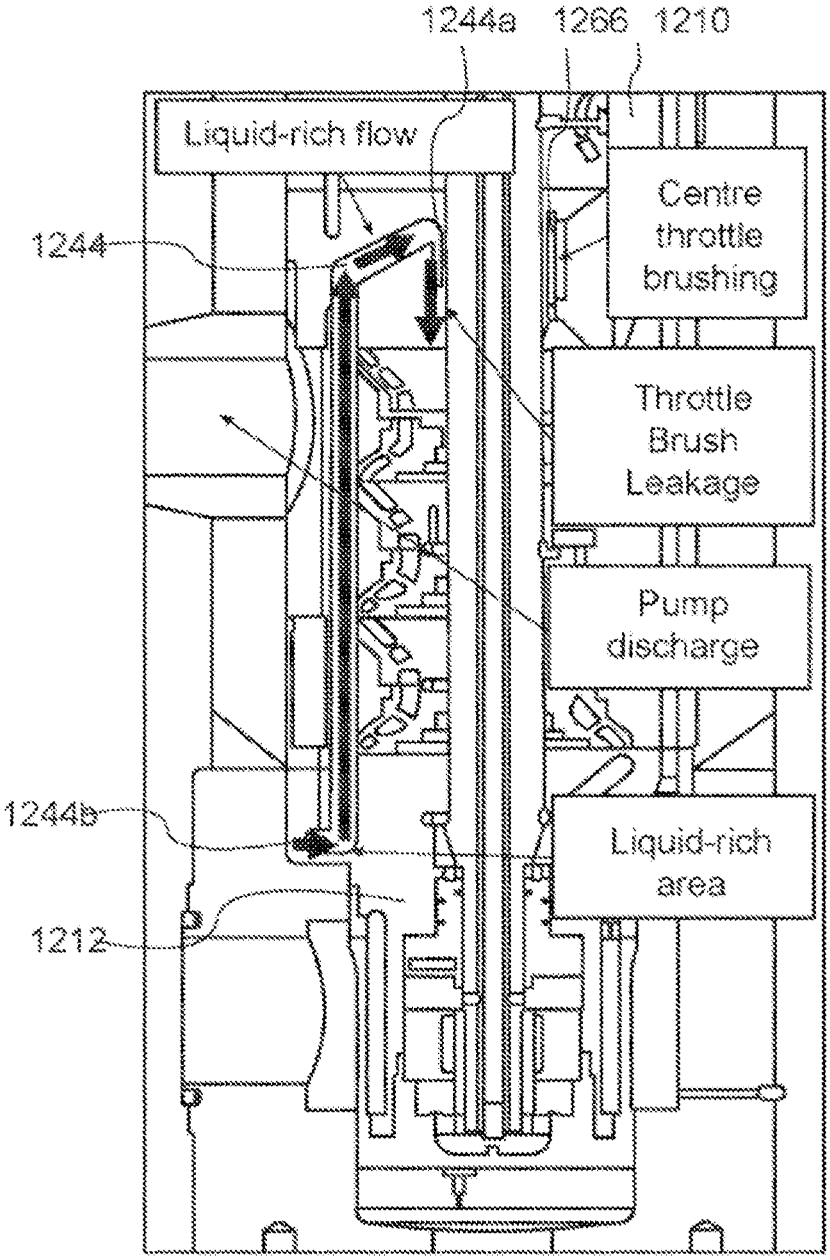
FIGS. 8A and 8B illustrate further examples of a channel and a leak path in a multiphase pump, with an external fluid source.
Figure 8B:
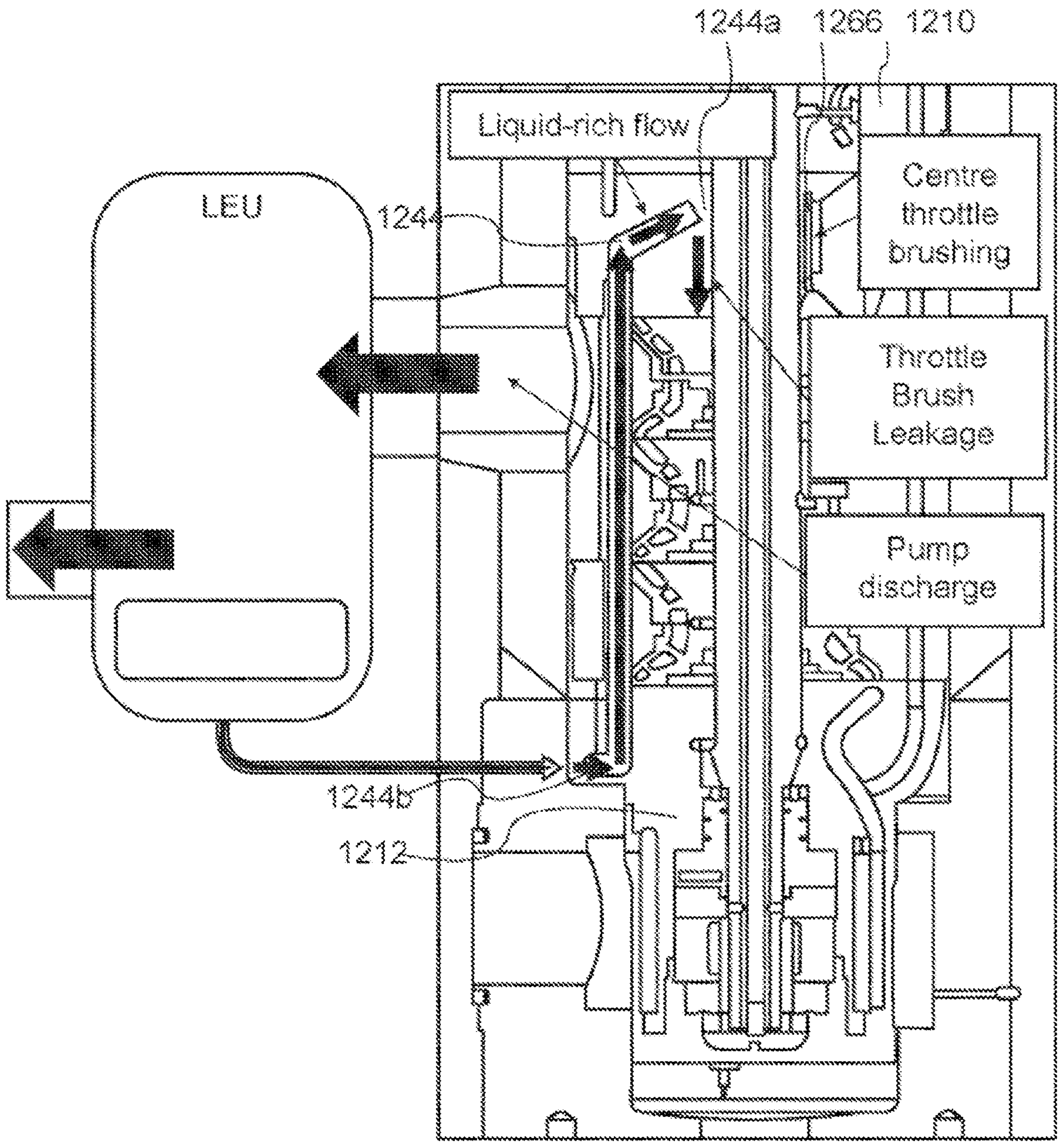

Illustrated in FIGS. 8A and 8B show examples of a multiphase pump 1210 having a channel 1244 defined therein, that may be supplied by a liquid provided from a source external to the housing 1212 of the multiphase pump 1010. In both cases, the outlet 1244*b* of the channel 1244 is located adjacent bushing 1226, similar to the example of FIG. 7A. However, the channel inlet 1244*a* is located on an external surface of the housing 1212. In the case of FIG. 8A the inlet 1244*a* is provided by a fluid source located between the housing 1212 and the pressure housing 1240, while in the case of FIG. 8B, the fluid inlet 1244*a* is provided with a source of fluid from a liquid tank. In this case, the liquid tank is a receptacle for the fluid exiting the multiphase pump 1210, and therefore may be at or close to the outlet pressure of the pump 1212. However, the skilled person will understand that other external sources of liquid may equally be plausible.

The person skilled in the art realises that disclosure of FIGS. 5 to 8B is not limited to the preferred embodiments described in relation to these Figures. The person skilled in the art further realises that modifications and variations are possible within the scope of the appended clauses. Additionally, variations to the disclosed embodiments can be understood and effected by the skilled person in practicing the disclosure, from a study of the drawings, the disclosure, and the following set of clauses. Some examples and aspects will now be described in the following numbered, non-limiting, clauses:

CLAUSE A1. A multiphase pump 1010, comprising:
- a housing 1012 comprising a flow inlet 1030 and a flow outlet 1036 fluidly connected by a flowpath;
- a rotor 1014 located in the flow path of the housing 1012, configured to propel a fluid from the flow inlet 1030 to the flow outlet 1036 via the flow path, the rotor 1014 comprising a longitudinal axis 1022 extending the length of the rotor 1014 and a multiphase impeller arrangement 1018;
- at least one leak path 1046 located in the multiphase pump 1010, permitting reverse flow of a fluid from the flow outlet 1036 to the flow inlet 1030; and
- at least one channel 1044 defined within the housing 1012, and configured to direct a liquid from a liquid source to one of the at least one leak paths 1046 in the multiphase pump 1010.

CLAUSE A2. The multiphase pump 1010 according to clause A1, wherein the rotor 1014 comprises a drive shaft 1016 and the multiphase impeller arrangement 1018 is coupled to the drive shaft 1016.

CLAUSE A3. The multiphase pump 1010 according to clause A2, wherein the housing 1012 radially supports the drive shaft 1016 of the rotor 1014 via a bushing 1026 at an at least one engagement location, the bushing 1026 being located between the rotor 1014 and the housing 1012.

CLAUSE A4. The multiphase pump 1010 according to clause A3, wherein one of the at least one leak paths 1046 is located between the drive shaft 1016 and the housing 1012 at the at least one radial support location.

CLAUSE A5. The multiphase pump 1010 according to any preceding clause, comprising a wear ring 1048 located between the multiphase impeller arrangement 1018 and the housing 1012, and wherein one of the at least one leak paths 1046 is located between the wear ring 1048 and the multiphase impeller arrangement 1018.

CLAUSE A6. The multiphase pump 1010 according to any preceding clause, comprising a plurality of leak paths 1046 and a plurality of channels 1044 connecting a liquid source to the plurality of leak paths 1046 in the multiphase pump 1010.

CLAUSE A7. The multiphase pump 1010 according to any preceding clause, wherein the flow path comprises a higher-density zone located in a radially outer region of the flow path, and a lower-density zone located in a radially inner region of the flow path.

CLAUSE A8. The multiphase pump 1010 according to clause A7, wherein the fluid source is at least partially defined by the higher-density zone of the flow path.

CLAUSE A9. The multiphase pump 1010 according to clause A8, wherein the channel 1044 comprises an inlet 1030 located adjacent the higher-density zone so as to be in fluid communication therewith.

CLAUSE A10. The multiphase pump 1010 according to any of clauses A7 to A9, wherein the housing 1012 comprises at least one location of reduced diameter, and wherein the housing 1012 engages the rotor 1014 at the at least one location of reduced diameter, and the engagement between the housing 1012 and the rotor 1014 is located in the radially inner lower-density zone of the flow path.

CLAUSE A11. The multiphase pump 1010 according to clause A10, wherein the channel comprises an outlet 1036 at the location of engagement between the housing 1012 and the rotor 1014 and one of the at least one leak paths is located at the location of engagement between the housing 1012 and the rotor 1014, such that the channel 1044 directs a liquid from the higher-density zone to the location of engagement between the housing 1012 and the rotor 1014.

CLAUSE A12. The multiphase pump 1010 according to any preceding clause, wherein the fluid source is at least partially defined by a source of liquid external to the multiphase pump 1010, and the channel 1044 comprises an external inlet located on an external surface of the multiphase pump 1010.

CLAUSE A13. The multiphase pump 1010 according to any preceding clause, wherein the flow inlet 1030 and the flow outlet 1036 are defined by the housing 1012, and the flow outlet 1036 is located at a midpoint along the longitudinal axis 1022 of the rotor 1014.

CLAUSE A14. The multiphase pump 1010 according to any preceding clause, wherein the rotor 1014 comprises at least two multiphase impeller arrangements, each of the multiphase impeller arrangements having opposite orientations, such that a first impeller arrangement is configured to impart a velocity to a fluid in a first direction parallel to the longitudinal axis 1022, and a second impeller arrangement is configured to impart a velocity to a fluid in a second opposite direction parallel to the longitudinal axis 1022.

CLAUSE A15. The multiphase pump 1010 according to clause A14, wherein the housing 1012 comprises at least one location of reduced diameter, and wherein the housing 1012 engages the rotor 1014 at the at least one location of reduced diameter, and wherein the first impeller arrangement is located on a first axial side of the engagement between the housing 1012 and the rotor 1014, and the second impeller arrangement is located on a second axial side of the engagement between the housing 1012 and the rotor 1014.

CLAUSE A16. The multiphase pump 1010 according to clause A14 or A15, wherein the flow inlet 1030 comprises a direct fluid connection to an inlet of the first impeller arrangement, the flow outlet 1036 comprises a direct fluid connection to an outlet 1036 of the second impeller arrangement, and an outlet of the first impeller arrangement and an inlet of the second impeller arrangement are in direct fluid connection via a connection conduit, the connection conduit being optionally defined by the housing.

CLAUSE A17. The multiphase pump 1010 according to any one of clauses A14 to A16, wherein the first impeller arrangement is configured to pressurise a fluid from an inlet pressure to a mid-pressure, and the second impeller arrangement is configured to pressurise a fluid from the mid-pressure to an outlet pressure.

CLAUSE A18. A method of pumping a multiphase fluid, comprising:

- providing a multiphase pump 1010, the multiphase pump 1010 defining at least one channel 1044 therein configured to direct fluid from a liquid source to a leak path in the multiphase pump 1010;
- operating the multiphase pump 1010 to pump a multiphase fluid from a flow inlet 1030 of the multiphase pump 1010 to a flow outlet 1036 of the multiphase pump 1010; directing fluid from a liquid source to a leak path in the multiphase pump 1010 via a channel defined in the multiphase pump 1010.

A Subsea Pump and Method for Determining Motion of the Rotor

Now referring to FIGS. 9 to 11C, there is provided an improved subsea pump. According to an example embodiment there is provided a subsea pump, comprising: a housing; a rotor located inside the housing, a bearing arrangement being located between the rotor and the housing to facilitate rotation of the rotor therein, and the rotor comprising a motion indicator; a motion sensing arrangement comprising a pressure sealed housing and at least one sensor, the motion sensing arrangement being located inside the housing and in communication with the motion indicator, and the motion sensing arrangement being configured to detect movement of the motion indicator.

The subsea pump may be used in a subsea location, which may be a downhole location, while the motion sensing arrangement and motion indicator may be able to provide the user with information regarding the operation of the pump. As will be described, the motion sensing arrangement may be configured to measure rotational, axial and radial movement of the rotor and may provide this information to a user to allow assessment of the performance of the subsea pump. In some examples, the motion sensing arrangement enable a user to measure the axial and/or rotational vibration of the rotor of the subsea pump, which may also be an indicator of the performance of the subsea pump.

Figure 9:
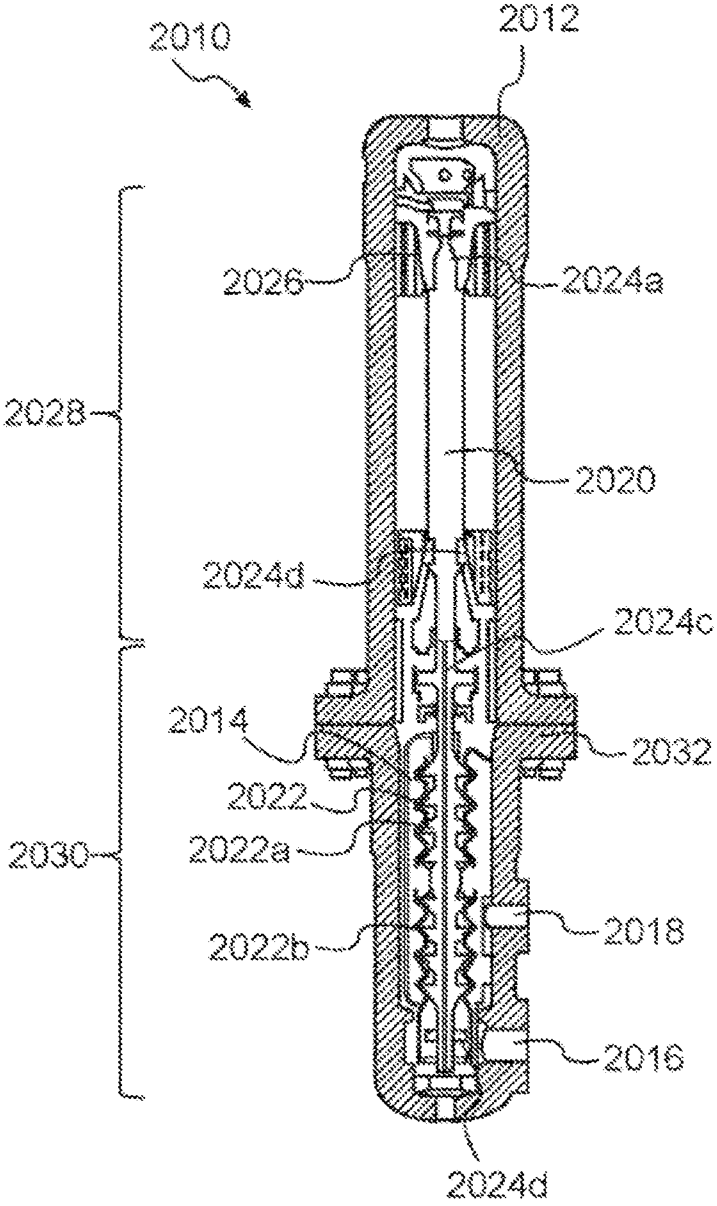
FIG. 9 shows a sectional view of an example of a subsea pump.

FIG. 9 illustrates a cross-sectional view of an exemplary subsea pump 2010. In this example, the subsea pump 2010 is a multiphase pump such as a helico-mixed flow pump, or possibly a helico-axial pump. However, with regard to the description herein, the skilled person will appreciate that many of the described features and examples may be applicable to other types of subsea pumps, which may not be multiphase pumps, for example axial and/or centrifugal pumps and axial and/or centrifugal compressors.

In this example, the subsea pump 2010 comprises an outer housing 2012, and an inner housing 2014. The outer housing 2012 of this example is comprised of two parts, which are connected together at a connection interface 2032 by a bolted flange arrangement, although the skilled reader will understand that other forms of connection arrangement may be possible such as a threaded connection, or a chemically bonded connection. While the outer housing contains a pump inlet 2016 and outlet 2018 and defines a flow path extending outside of the inner housing 2014, the inner housing 2014 supports and contains moving components of the subsea pump 2010. For example, as shown in FIG. 9, the inner housing 2014 may support a drive shaft 2020, having an impeller arrangement 2022 coupled thereto, and a drive arrangement 2026 which may be in the form of a motor such as an electrical motor. The configuration of the inner housing 2014 may be such that the drive shaft 2020 extends the entire length of the inner housing 2014, or substantially the entire length of the inner housing 2014, while the impeller arrangement 2022 may be confined to one axial side of the drive shaft 2020, and the drive arrangement 2026 may be confined to an opposite side of the drive shaft 2020, as is the case in this example. As such, the inner housing 2014 may be able to be divided into a drive section 2028 and a pumping section 2030. Here, the inner housing 2014 contains a plurality of bearing arrangements 2024—in this case four bearing arrangements 2024*a-d*—which are located between the inner housing 2014 and the drive shaft 2020. The bearing arrangements 2024*a-d* enable engagement between the inner housing 2014 and the drive shaft 2020, and facilitate rotation of the drive shaft 2020 in the inner housing 2014.

Of the four bearing arrangements 2024*a-d*, two are located in the drive section 2028 of the inner housing 2014, while another two are located in the pumping section 2030 of the inner housing 2014. Together, the bearing arrangements 2024*a-d* support the entire drive shaft along its length and facilitate rotation thereof relative to the inner housing 2014. The bearing arrangement may be or comprise any suitable type of bearing, for example a rotary bearing such as a thrust bearing.

In this example, the inner housing 2014 is secured to the outer housing 2012 at a plurality of locations, such that the inner housing 2014 remains static relative to the outer housing 2012 during operation of the subsea pump 2010.

It can additionally be seen, in this example, that the impeller arrangement is divided into two sets 2022*a*, 2022*b*. The orientation of the impellers in the first set 2022*a* is opposite to the orientation of the impellers in the second set 2022*b*, such that the impellers are arranged in a back-to-back configuration. In doing so, some or all of the axial thrust caused by the first set 2022*a* is cancelled or offset by an oppositely directed thrust from the second set 2022*b* of impellers, thereby reducing the magnitude of any unbalanced axial force acting on the drive shaft 2020 as a result of the impellers 2022.

Figure 10A:
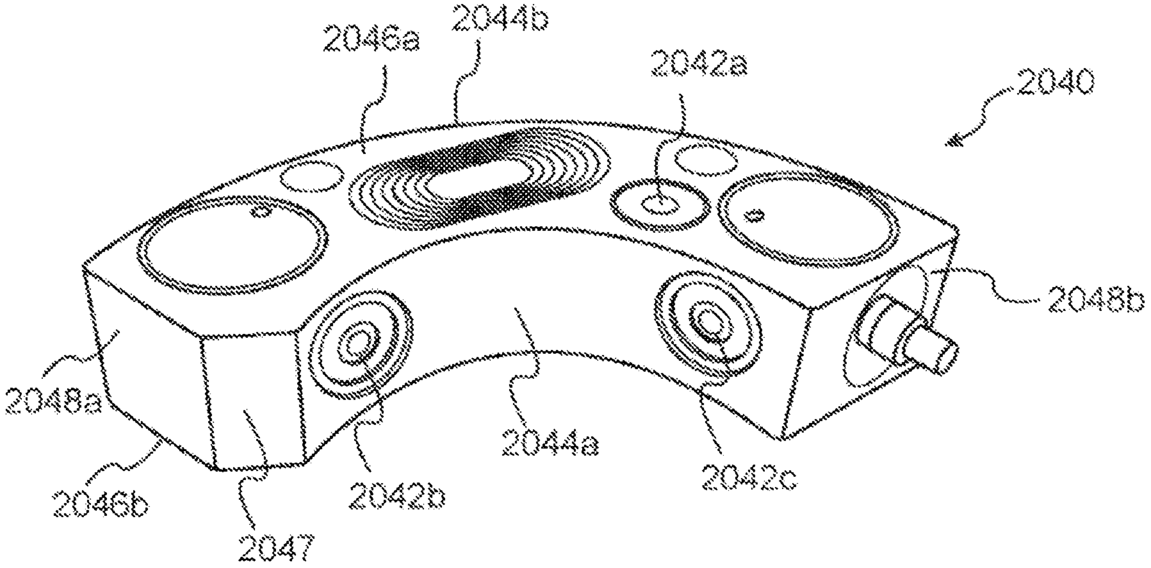
FIG. 10A is an isometric view of an example of a motion sensing arrangement.

FIG. 10A illustrates an example of a motion sensing arrangement 2040 that may be used to detect motion in the subsea pump 2010, such as motion of the drive shaft 2020 relative to the inner housing 2014. The motion sensing arrangement 2040 as illustrated may be attached (e.g. fastened, bonded or coupled) to the inner housing 2014, and located in proximity to the drive shaft 2020 such that the motion sensing arrangement 2040 is able to detect motion of the drive shaft 2020. The motion sensing arrangement 2040 may be used to detect one, or more than one, aspect of motion of the drive shaft 2020. For example, the motion sensing arrangement 2040 may be used to detect at least one, or all, of rotational, radial and axial movement of the drive shaft 2020. The motion sensing arrangement 2040 may be used to detect vibration of the drive shaft 2020, for example radial and/or axial vibration. The motion sensing arrangement may additionally be configured to detect an indicator used for vibration analysis, for example a once-per-revolution indicator for vibration analysis.

The housing 2012 may contain a motor located therein, or may comprise a motor coupled thereto. The motor may comprise a drive arrangement for turning the drive shaft 2020, and in some examples a motion sensing arrangement 2040 may be positioned so as to detect motion of the drive arrangement of the motor. In this way, the motion sensing arrangement 2040 may additionally or alternatively be used to detect motion of a motor.

Figure 10B:
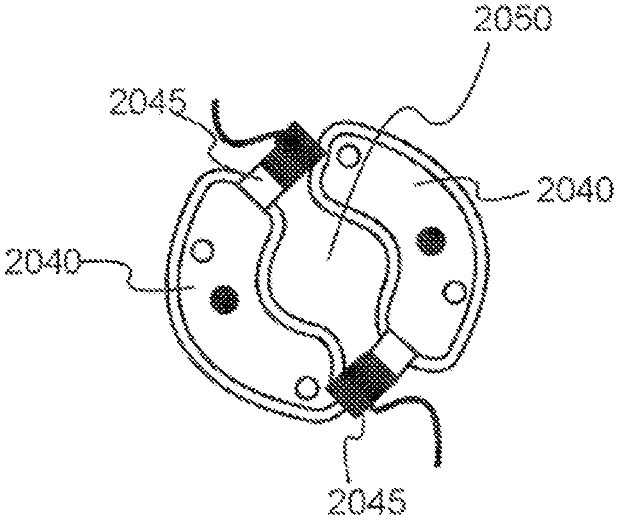
FIG. 10B shows an example configuration of two motion sensing arrangements.

As illustrated in FIGS. 10A-B, the motion sensing arrangement 2040 has the shape of a partial annulus. Here, the motion sensing arrangement 2040 has a shape between a quarter-annulus and a semi-annulus. The motion sensing arrangement 2040 may extend circumferentially anywhere from between 90 degrees and 180 degrees through an annulus. For example, anywhere from between 100 degrees to 170 degrees, between 110 degrees and 160 degrees, between 120 degrees and 150 degrees, between 130 degrees and 140 degrees, or the like. For example, the motion sensing arrangement 2040 may extend circumferentially 135 degrees through an annulus. In this example, the motion sensing arrangement 2040 may be shaped so as to fit around the drive shaft 2020, and as such may comprise a radially inner and radially outer surface 2044*a*, 2044*b*, two axial surfaces 2046*a*, 2046*b* and two circumferential surfaces 2048*a*, 2048*b*. This shape of motion sensing arrangement 2040 may be particularly beneficial as it may fit easily into a cylindrical or annular recess within the inner housing 2014. In particular, having an annular or partial annular shape of motion sensing arrangement 2040 may permit the motion sensing arrangement 2040 to fit easily in an annulus defined between the drive shaft 2020 and the inner housing 2014, while also permitting a large surface area of the drive shaft 2020 to be monitored. The skilled person will appreciate that other shapes of motion sensing arrangement 2040 may be possible, such as a cubic or cuboid shape, or a cylindrical shape.

The shape of the motion sensing arrangement 2040 may be defined by a sensor housing 2047. The sensor housing 2047 may be coupled (e.g. attached, affixed, bonded, or the like) to the inner housing 2014 (see FIG. 9) using bolts, chemical bonding, snapfits, or any other appropriate means. The sensor housing 2047 may be precisely fitted on the inner housing 2014 so as to permit the motion sensing arrangement 2040 to be installed in the subsea pump 2010 in a precise location relative to the drive shaft 2020. As such, the distance between the motion sensing arrangement 2040 may be known, and therefore reconfiguration of sensors in the motion sensing arrangement 2040 after having been fitted to the inner housing 2014 may not be necessary. The sensor housing 2047 may contain electronic components of the motion sensing arrangement as well as at least partially, or fully, housing sensors of the motion sensing arrangement. The sensor housing 2047 may be sealed to both pressure and water. The sensor housing 2047 may contain sensors such as temperature sensors, and the temperature sensors may be considered to be part of the motion sensing arrangement. The temperature sensors may be located inside the sensor housing 2047, and may be in the form of an integrated temperature measurement system within the housing. The integrated temperature measurement system may be used for signal correction purposes, as well as general condition monitoring of the sensing arrangement 2040. The housing may additionally be sufficiently strong to withstand high pressures associated with subsea and/or downhole locations. For example, the housing 2047 may have a minimum thickness so as to be able to withstand the high pressure of subsea/downhole environments. In some examples, the subsea pump 2010 may be exposed to pressures in the range of 2300 to 1000 bar. In cases where the pump 2010 is shut-in, then the pressure may be particularly high (e.g. 1000 bar or higher) and as such the thickness of the housing 2047 may be selected based on this requirement. Additionally, any sealing involved in the housing may be selected based on this requirement.

The motion sensing arrangement 2040 may comprise one, or a number, of sensors for detecting motion (e.g. a motion sensor or motion sensors such as an eddy-current sensor, capacitive sensor and/or an optical sensor). In FIG. 10, the motion sensing arrangement comprises three sensors 2042*a*, 2042*b*, 2042*c*. One sensor, hereinafter referred to as an axial sensor 2042*a*, is located on one of the axial surfaces 2046*a* of the motion sensing arrangement 2040, while two sensors 2042*b*, 2042*cc* (hereinafter referred to as radial sensors) are located on the inner radial surface 2044*a* of the motion sensing arrangement 2040. Each of the sensors 2042*a-c* may be of the same type, or at least one or all of the sensors 2042*a-c* may be of differing types. In some examples, the sensors may also transmit a signal, the transmitted signal being used to detect motion. For example, in this example, the sensors 2042*a-c* may transmit an electromagnetic field or a beam of electromagnetic radiation, and may then sense an electromagnetic return signal, with changes in the electromagnetic return signal indicating motion of an object. In one example, at least one or all of the sensors 2042*a-c* may be motion sensors such as optical sensors, eddy-current sensors and/or capacitive sensors. In one example, at least one or all of the sensors may be in the form of proximity probes. In another example, some sensors may be proximity probes, while other sensors may be capacity probes.

The sensor 2042*a* located on the axial surface 2046*a* of the motion sensing arrangement 2040 may be considered to be an axial sensor 2042*a*. When the motion sensing arrangement 2040 is positioned in proximity to the drive shaft 2020, the axial sensor 2042 may be able to be used to sense at least one of axial and rotational movement of the drive shaft 2020. The sensors 2042*b*, 2042*c* that are located on the radially inner surface 2044*a* of the motion sensing arrangement 2040 may be considered to be radial sensors 2042*b*, 2042*c*. The radial sensors may be able to be used to sense rotational movement of the drive shaft 2020. In this example, the radial sensors 2042*b*, 2042*c* may be offset by an angle, and positioned on the inner axial surface 2044*a*. In this example, the angle of offset is approximately 90 degrees, which may be a preferable configuration for sensing radial movement of the drive shaft 2020, as it may provide information of radial movement of the drive shaft 2020 in two directions (e.g. in the direction of an x-axis and in the direction of a y-axis). However, the skilled person will understand that other angles of offset may be possible if desired.

In this example, each of the sensors 2042*a-c* are used to sense or detect movement of a motion indicator. The motion indicator may simply be a surface of the drive shaft 2020. In some examples, the motion indicator may comprise a surface feature such as a depression and/or a protrusion, or may comprise a plurality of surface features such as a plurality of depressions and/or protrusions. The surface feature or features may be located on the drive shaft, in some examples.

Although not shown in the Figures, the rotor may comprise a radially extending protrusion therefrom, for example a radially extending protrusion from the drive shaft 2020. The radially extending protrusion may be in the form of a disc, or a partial disc, extending from the drive shaft 2020, and the disc may be axially aligned with the drive shaft 2020. The radially extending protrusion may be or form part of the motion indicator. For example, the motion indicator may be formed by the combination of the drive shaft (or a portion thereof) as well as the radially extending protrusion.

The motion sensing arrangement 2040 may be positioned in the inner housing 2014 radially outwardly of the drive shaft 2020. Where the motion sensing arrangement 2040 has an annular or partially annular shape, then the axis of the motion sensing arrangement 2040 may be aligned with the axis of the drive shaft 2020, such that the radial surfaces 2044*a*, 2044*b* run generally parallel to the outer surface of the drive shaft 2020. Each of the sensors may be positioned adjacent and/or in close proximity to a surface of the motion indictor. For instance, a sensing surface of each of the sensors 2042*a-c* may be positioned parallel to a surface of the motion indicator. Each of the radial sensors 2042*b,c* may be positioned parallel to a surface of motion indicator on the drive shaft, while the axial sensor 2042*a* may be positioned parallel to a surface of the motion indicated on the radially extending protrusion. In some examples, the axial sensor 2042*a* may be able to measure the axial movement of the rotor (e.g. relating to the axial position of the rotor, or to axial vibration of the rotor) by sensing a change in the distance between the sensor 2042*a*, which may be coupled to the inner housing 2014 via the motion sensing arrangement 2040. The axial sensor 2042*a* may also be able to sense rotational movement of the rotor by sensing rotational movement of the radially extending protrusion, which may be in the form of a disc. The radially extending protrusion may comprise a surface feature, or a plurality of surface features thereon. The surface features may be in the form of one or more protrusions such as ribs, nipples and/or grooves, and/or may be in the form of one or more recesses, which may be of varying depth, height and/or width. In such an example, the radially extending protrusion may be considered to be a coded target disc, the rotation of which may be detected by the axial sensor 2042*a*. As the rotor rotates, so too will the radially extending protrusion, and the axial sensor 2042*a* is able to sense movement of the radially extending protrusion. Where there are surface features comprised on or defined by the radially extending protrusion, the axial sensor 2042*a* may be able to detect differences in the geometry of each of these surfaces as they move, which may provide additional detail to a user regarding the nature of the rotational and/or axial movement of the rotor. For example, the axial sensor 2042*a* may be able to provide information on the direction of rotation of the rotor (e.g. clockwise or anti-clockwise rotation of the rotor), thereby enabling the user to react quickly, for example, in a situation in which the rotor was rotating in the wrong direction.

The radial sensors 2042*b*, 2042*c* may be configured to detect rotational movement of the rotor by detecting rotational movement of the drive shaft 2020. The drive shaft may comprise one or a plurality of surface features (e.g. one or a plurality of protrusions thereof and/or one or a plurality of recesses) thereon, and the radial sensors 2042*b*, 2042*c* may be able to detect movement of the surface features on the drive shaft 2020. The surface features may comprise protrusions and or recesses of different sizes (e.g. width, height or depth). As the drive shaft 2020 rotates, the radial sensors may be able to detect movement, as well as differences in the sizes of each of the surface features, which may provide additional detail to a user regarding the nature of the rotation of the drive shaft 2020, and therefore the rotor. In some examples, the radial sensors 2042*b*. 2042*c* may be able to provide information on the direction of rotation of the rotor (e.g. clockwise or anti-clockwise rotation of the rotor), as previously mentioned enabling the user to react quickly, for example, in a situation in which the rotor was rotating in the wrong direction.

In addition, the radial sensors 2042*b*, 2042*c* may be able to detect radial movement (e.g. radial vibration) of the rotor by detecting radial movement of the drive shaft 2020. Similar to as previously described, the surface features may assist the radial sensors 2042*b*, 2042*c* to provide information relating to the radial movement of the drive shaft relative to the interior housing 2014 as a result of differing geometry of the surface features.

In use, there may be several motion sensors 2042*a, b, c* (e.g in the form of a or several motion sensing arrangement/s) located inside the interior housing and providing information regarding the movement of the rotor in at least one, more than one, or all of rotational, axial and radial movement. In one example, there may be a sensing arrangement 2040 located at or adjacent each of the bearing arrangements 2024*a-d* (see FIG. 9). The sensors may then be used to provide a user with information regarding the motion of the rotor in the subsea pump 2010, and therefore provide an indication on the functioning of the subsea pump without the need for a physical inspection of the pump 2010. In particular, the motion sensing arrangement or arrangements 2040 may provide a user with information on the direction of rotation of the rotor. Such information may be highly critical for safe operation of a subsea pump 2010. In having at least one motion sensing arrangement 2040, a user may be able to have direct information regarding the direction of rotation of the rotor, for example, without having to deduce such information from calculations. As such, the sensing arrangement or arrangements 2040 may provide an inherently safe means of monitoring the behaviour of the rotor.

Although not explicitly shown in FIG. 10A, the motion sensing arrangement 2040 may comprise at least one pressure and/or temperature sensor, each of which may be located on an external surface thereof. The pressure and temperature sensor or sensors may provide a user with information regarding the pressure and temperature surrounding the motion sensing arrangement 2040, which may be indicative of the pressure inside the subsea pump 2010, thereby providing information on the operating condition of the subsea pump.

In addition to the sensors 2042*a-c*, the motion sensing arrangement 2040 may comprise a connection means 2045 (e.g. a connection point) for the physical and/or wireless connection of cabling for power and/or communications purposes. For example, the connection point 2045 may be used to provide electrical, and optionally fibre optic, cabling for the purposes of providing power to the motion sensing arrangement, as well as permitting input and output signals to be relayed to and from the motion sensing arrangement 2040 (e.g for communicating with the motion sensing arrangement 2040) and may be used to relay signals from the sensors 2042*a-c* to a location external to the motion sensing arrangement 2040, e.g. to be sent to a user via cabling, or via wireless communication.

In some examples, the motion sensing arrangement may comprise a signal amplifier, for example located inside the sensor housing 2047. The motion sensing arrangement 2040 may comprise an integrated signal electronic conditioning system comprising amplifiers located inside the sensor housing 2047. Having amplifiers within the motion sensing arrangement 2040 may permit the output signals being relayed to the connection means 2045 of the motion sensing arrangement 2040 to be very robust, and may be less affected by electric and magnetic noise, such as that from a motor. Having a sealed sensor housing 2047 (e.g. a pressure sealed housing) may enable a user to have such a system inside the sensor housing 2047 without experiencing damage during operation.

It may be necessary for the sensor housing 2047 to comprise an aperture, or a number of apertures therein. For example, the connection point 2045 may require the housing to have an aperture therein, as may each of the sensors 2042*a-c*. The sensor housing 2047 may comprise a sealing arrangement configured to prevent ingress of fluid (e.g. water or hydrocarbons) therein. In each the case of each aperture in the sensor housing 2047, there may be a seal, or a plurality of seals. In some examples the housing may be hermetically sealed. The housing may be hermetically sealed by being hermetically welded. As such, production of the motion sensing arrangement 2040 (and the sensor housing 2047 thereof) may involve a step of hermetically sealing the housing by a hermetic welding process. In some examples, each aperture may comprise at least one O-ring style static seal extending around the periphery thereof to prevent ingress of fluid therethrough. Such sealing of the sensor housing 2047, in this example by hermetic welding means, may provide an extremely robust solution with minimal risk of leakage, thereby enabling components of preferable quality and lifespan to be used inside the sensor housing 2047. In contrast, known methods of sealing a sensor housing 2047 may rely on long, pressure-tight conduits and connections, which may be complex to manufacture, and provide an inferior seal, thereby also having an impact on the components that may be used inside the sensor housing 2047.

Illustrated in FIG. 10B is a side view of two motion sensing arrangements 2040. As can be seen, each of the two motion sensing arrangements 2040 are arranged to form a central void 2050. The rotor (e.g. the drive shaft of the rotor) may extend through the central void 2050, such that each of the motion sensing arrangement 2040 are situated adjacent to the drive shaft of the rotor. In this arrangement, the inner radial surface 2044*a* is located closer to the drive shaft than the outer radial surface 2044*b*, and the surface of the inner radial surface 2044*a* may extend substantially parallel to an outer surface of the drive shaft of the rotor. In addition, a cable is connected to each of the connection points 2045 each motion sensing arrangement 2040. In this example, both of the motion sensing arrangements 2040 is located in a plane extending perpendicularly to the central axis of a drive shaft extending through the void 2050, such that both of the motion sensing arrangements 2040 have the same axial location relative to the axis of the drive shaft of the rotor. However, the skilled person will realise that other arrangement may be possible. For example each of the two motion sensing arrangements 2040 may be located at different axial locations along the length of the drive shaft of the rotor.

The arrangement of FIG. 10B may be used to provide a degree of redundancy of instrumentation in the subsea pump 2010. For example, two motion sensing arrangements 2040 may be placed adjacent each bearing arrangement 2024*a-d*, with the intention of using one of each pairs of motion sensing arrangements 2040. In the situation that one of the motion sensing arrangements is damaged or inoperable, then the other of the motion sensing arrangements may be used. In such a scenario, then having a motion sensing arrangement 2040 that has a partial annulus shape may be beneficial, as it may allow multiple motion sensing arrangements 2040 to be placed at a single axial location relative to the drive shaft of the rotor, as is shown in FIG. 10B. As can be seen the motion sensing arrangements 2040 extend at an angle of between 90 and 180 degrees in an annulus external to a drive shaft.

Figure 11A:
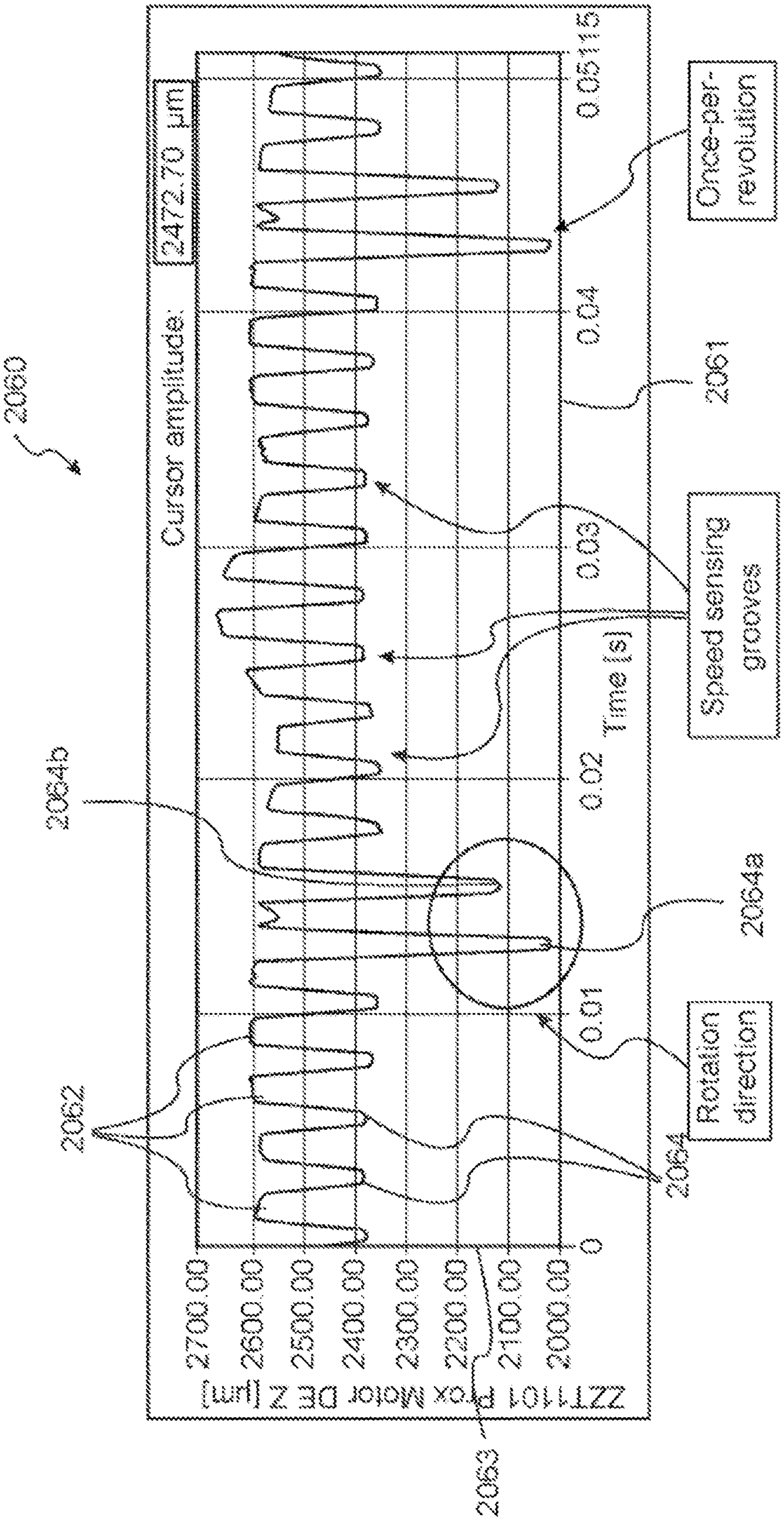
FIGS. 11A-C illustrate various readings that may be provided by a motion sensing arrangement.
Figure 11B:
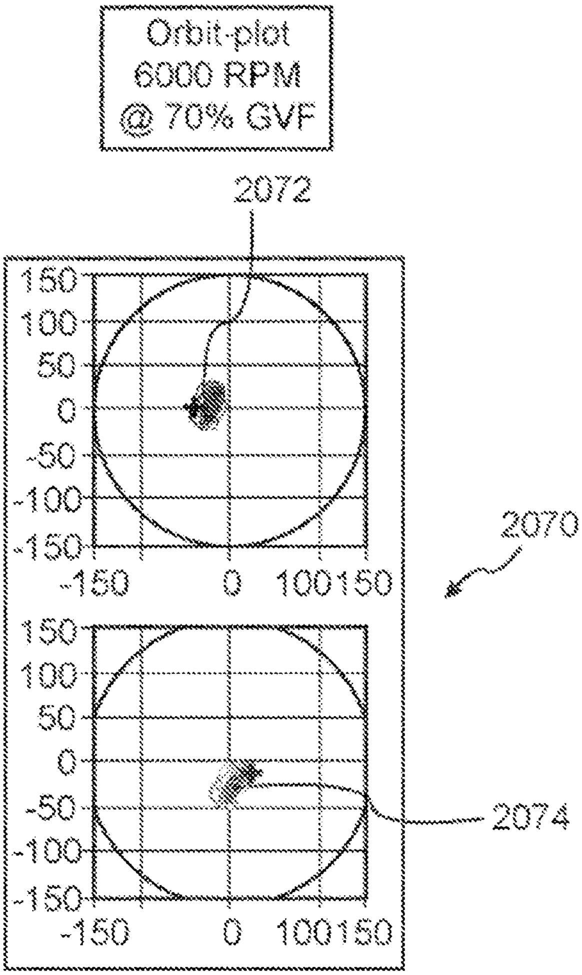
Figure 11C:
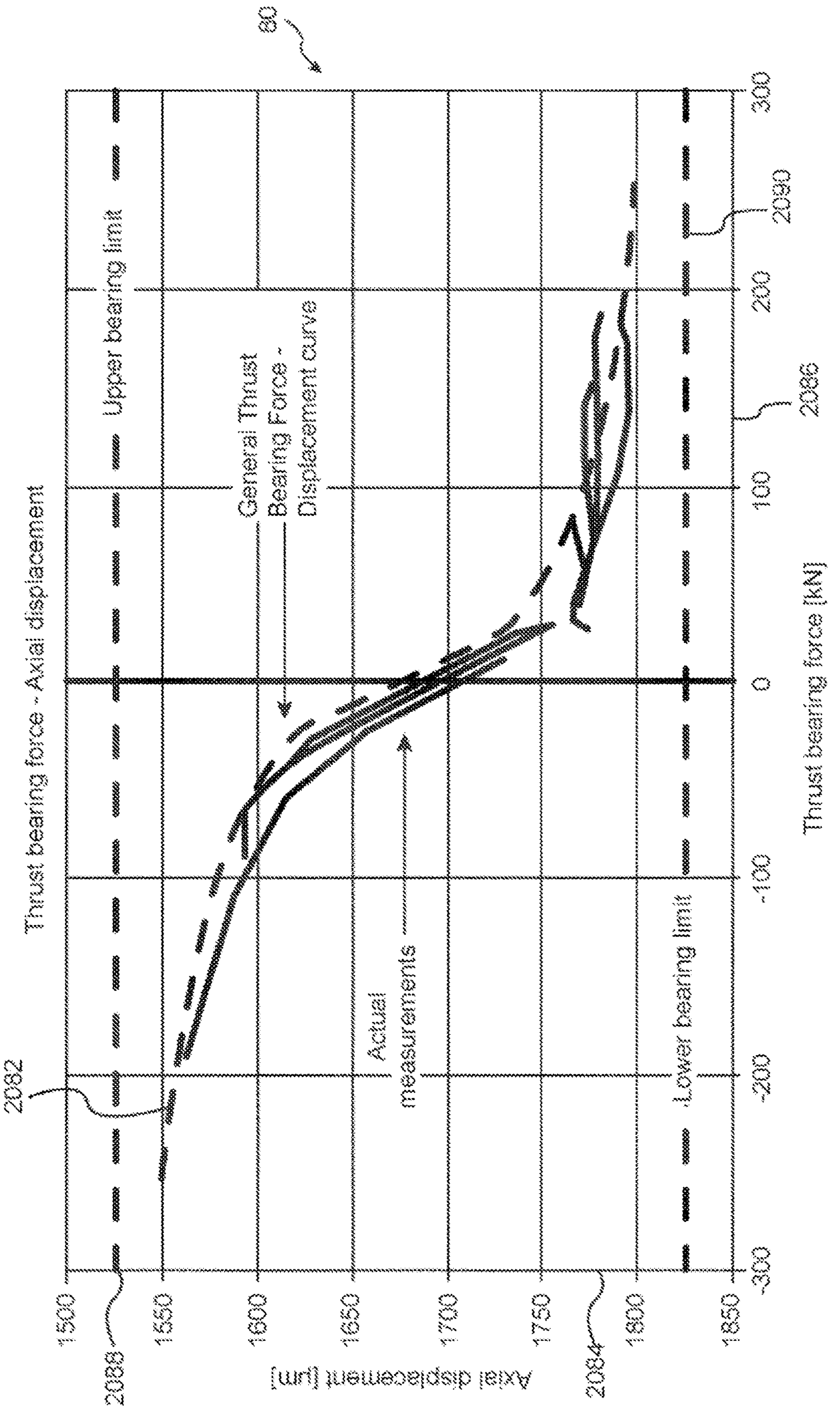

FIGS. 11A-C illustrate various readings that may be obtained from the motion sensing arrangements 2040. FIG. 11A illustrates a graph 2060 showing the proximity of a motion indicator to a motion sensing arrangement 2040 (e.g. to a sensor of a motion sensing arrangement). The X-axis 2061 indicates time in seconds, while the Y-axis 2063 indicates the proximity of the motion indicator to the motion sensing arrangement. As previously described, the motion indicator may comprise a surface feature, or a number of surface features thereon. In this example, the surface features cause the proximity of the motion indicator relative to the motion sensing arrangement 2040 to vary as the rotor is rotated, resulting in a predictable oscillation of the proximity of the motion indicator to the motion sensing arrangement 2040 and a number of peaks 2062 and troughs 2064 appearing on the graph 2060. This feature may be useful, as it may indicated to a reader of the graph 2060 that the rotor is turning. In addition, when the proximity of the motion sensing arrangement is measured relative to time, then the rotational velocity of the rotor may be ascertained by measuring the frequency of the oscillations on the graph 2060, and comparing this to an expected number of oscillations for one revolution of the rotor, based on the number of surface features that are present on the motion indicator.

In this example, the motion indicator comprises two surface features that are greater in magnitude compared to the other surface features. In addition, of these two surface features, a first 2064*a* is larger than a second 2064*b*, resulting in there being two larger oscillations on the graph 2060 for every rotation of the drive shaft. The surface features on the motion indicator may be in the form of either depressions or protrusions, resulting in a greater increase or reduction in the distance between the motion indicator and the motion sensing arrangement 2040. A user, knowing the configuration of the surface features on the motion indicator, will then be able to identify whether the rotor is turning in the correct direction based on the position of the first larger oscillation 2064*a* and the second smaller oscillation 2064*b*. For example, if it is expected that the first larger oscillation 2064*a* should appear first, followed by the second smaller oscillation 2064*b* when the rotor is turning in the correct direction, then the user will be able to easily identify this on the graph 2060, and identify that the rotor is turning in the correct direction. Should the user see a result that is unexpected, then this allows action to be taken before any damage is caused to the pump, or to any other components. The action may be in the form of action by a user—e.g. a manual reduction in the operating speed of the rotor—or automatic action taken by a control system that is configured to trigger a reduction or arrest of rotational speed of the rotor in the event of an unexpected result. In the case of this example, such rotational movement may be measured by the axial and/or radial sensors of the motion sensing arrangement 2040.

FIG. 11B illustrates a further graph 2070 that may be obtained based on the readings of the motion sensing arrangement 2060. In this example, radial movement of the rotor is measured, and the change in radial position as the shaft rotates may be plotted as a line 2072, 2074 on the upper and lower graphs. The different graphs may relate to the radial movement of at different axial locations along the drive shaft. As such, a large difference between the readings on each graph may indicate to a user that the drive shaft is bending during use, which may be detrimental to its function. In addition, the graph 2070 may be used to measure the radial vibration of the drive shaft. In cases where there is a large degree of radial movement of the drive shaft, then the user may be able to identify a large degree of radial vibration of the drive shaft, which may be detrimental to the functioning of the drive shaft, or may indicate that a repair of the drive shaft is necessary—for example it may indicate that a bearing has broken, seized or worn, or that a rotor or drive shaft has become bent or fractured. Worn, broken or seized bearings, and bend or fractured drive shafts, may occur as a result of rotordynamic vibration issues, which may be identified by taking measurements of radial movement/vibration of the drive shaft. Such measurements may be produced by the radial sensors 2024*b-c* of the motion sensing arrangement 2040.

The graph 2080 of FIG. 11C illustrates axial movement of the drive shaft in the interior housing 2014 against force on a thrust bearing in the internal housing 2014. Axial movement of the drive shaft of the rotor may be caused by an unbalanced axial force acting on the rotor as a result of rotation thereof, for example as a result of rotation of an impeller attached thereto. In the graph illustrated, a broken line 2082 is illustrated that shows a general thrust bearing force—displacement curve. This curve illustrates the force produced on a thrust bearing caused by an axial displacement and axial force acting on the rotor, for example the drive shaft of the rotor. Also illustrated are measurements which may be taken from a subsea pump of axial displacement plotted against a thrust bearing force on a thrust bearing. A motion sensing arrangement 2040 as previously described may be used to detect at least the axial displacement of the rotor for the plotting of graph 2080. In this graph the Y-axis 2084 describes the axial displacement of the thrust bearing inn micrometres, while the X-axis describes the thrust bearing force in kilo-Newtons. An upper bearing limit 2088 and lower bearing limit 2090 are also illustrated in broken outline. These limits indicate the maximum displacement of the rotor before damage would likely be caused to the thrust bearing due to excessive force acting thereon. A user may then be able to use the value of axial displacement of the rotor provided by the motion sensing arrangement 2040 to check whether the subsea pump is operating in an acceptable condition, or whether operation of the subsea pump is likely to be causing damage to components thereof. Additionally or alternatively, the value of axial displacement provided in the graph of FIG. 11C may be used to evaluate dynamic axial motion of the rotor (e.g. motion of the rotor over time). In some cases, dynamic axial movement of the rotor may be in the form of resonant axial movements or vibrations, which may be detrimental to the operation of the pump, and therefore may be useful to identify for a user. Such motion may be identified on the graph of FIG. 11C.

The person skilled in the art realises that disclosure of FIGS. 9 to 11C is not limited to the preferred embodiments described in relation to these Figures. The person skilled in the art further realises that modifications and variations are possible within the scope of the appended clauses. Additionally, variations to the disclosed embodiments can be understood and effected by the skilled person in practicing the disclosure, from a study of the drawings, the disclosure, and the following set of clauses. Some examples and aspects will now be described in the following numbered, non-limiting, clauses:

CLAUSE B1. A subsea pump, comprising:

a housing;

a rotor located inside the housing, a bearing arrangement being located between the rotor and the housing to facilitate rotation of the rotor therein, and the rotor comprising a motion indicator;

a motion sensing arrangement comprising a pressure sealed housing and at least one sensor, the motion sensing arrangement being located inside the housing and in communication with the motion indicator, and the motion sensing arrangement being configured to detect movement of the motion indicator.

CLAUSE B2. The subsea pump of clause B1, wherein the pressure sealed housing is hermetically sealed.

CLAUSE B3. The subsea pump of clause B1 or B2, wherein the motion sensing arrangement is configured to detect the direction of rotational movement of the rotor.

CLAUSE B4. The subsea pump of any preceding clause, wherein the motion indicator is in the form of a radially extending protrusion from the rotor.

CLAUSE B5. The subsea pump of any preceding clause, wherein the motion indicator is or comprises the drive shaft of the rotor.

CLAUSE B6. The subsea pump of any preceding clause, wherein the motion sensing arrangement is configured to detect at least one of rotational, axial and radial movement of the rotor.

CLAUSE B7. The subsea pump of any preceding clause, wherein the motion sensing arrangement is configured to detect vibration of the rotor.

CLAUSE B8. The subsea pump of any preceding clause, wherein the at least one sensor is an optical sensor, a capacitive sensor or an eddy-current sensor.

CLAUSE B9. The subsea pump of any preceding clause, wherein the motion sensing arrangement comprises at least one axially oriented motion sensor, and at least two radially oriented motion sensors.

CLAUSE B10. The subsea pump of clause B9, wherein the at least two radially oriented motion sensors are offset by 90 degrees.

CLAUSE B11. The subsea pump of any preceding clause, wherein the motion indicator is in the form of a disc extending from the rotor and axially aligned with the rotor.

CLAUSE B12. The subsea pump of clause B11, wherein the disc is a coded target disc and comprises at least two surface features on an axial surface thereof, and wherein the motion sensing arrangement is configured to detect rotational movement of the at least two surface features as a result of rotation of the rotor.

CLAUSE B13. The subsea pump of clause B12, wherein a first of the at least two surface features has a different geometry to a second of the at least two surface features, and the motion sensing arrangement is configured to detect the circumferential direction of rotation of the at least two surface features.

CLAUSE B14. The subsea pump of any preceding clause, wherein the motion sensing arrangement is configured to detect at least one of axial movement of the rotor, rotational velocity of the rotor, and a once-per-revolution indicator of vibration analysis.

CLAUSE B15. The subsea pump of any preceding clause, wherein the pressure-sealed housing of the motion sensing arrangement is has a partial annulus shape.

CLAUSE B16. The subsea pump of clause B15, wherein the partial annulus shape has a circumferential extension of between 120 degrees and 150 degrees.

CLAUSE B17. The subsea pump of clause B13, wherein the motion sensing arrangement comprises at least three sensors, and wherein two sensors are located on a radially inner surface of the partial-annulus pressure sealed housing, and one sensor is located on an axial surface of the partial-annulus pressure sealed housing.

CLAUSE B18. The subsea pump of any preceding clause, wherein the pressure sealed housing of the motion sensing arrangement is coupled to the housing at a predetermined distance from the motion indicator.

CLAUSE B19. The subsea pump of any preceding clause, comprising a motor for turning the rotor, the motor additionally comprising a motion indicator, and the motion of the rotor being detectable by the motion sensing arrangement.

CLAUSE B20. The subsea pump of any preceding clause, wherein the motion sensing arrangement comprises an integrated temperature measurement system located within the pressure sealed housing, the integrated temperature measurement system comprising at least one temperature sensor.

CLAUSE B21. The subsea pump of any preceding clause, wherein the motion sensing arrangement comprises connection means for at least one of physical and wireless connection thereto for communications purposes, and the motion sensing arrangement comprises an integrated signal electronic conditioning system comprising signal amplifiers located inside the sensor housing, the integrated signal electronic conditioning system being in communication with the connection means to provide an output signal from the motion sensing arrangement.

CLAUSE B22. A method for determining motion of a rotor in a subsea pump, comprising:

providing a subsea pump in a subsea location, the subsea pump comprising a pressure-sealed motion sensing arrangement, and a motor comprising a motion indicator;

operating the subsea pump to effect rotation of the rotor therein; using the motion sensing arrangement to detect movement of the rotor.

CLAUSE B23. The method of clause B22, comprising determining the direction of rotation of the rotor by detecting the motion of a first surface feature and a second surface feature located on the motion indicator, the first surface feature having a different geometry to the second surface feature.

CLAUSE B24. The method according to clause B22 or B23, comprising locating the pressure-sealed motion sensing arrangement in an annulus surrounding the rotor, the pressure-sealed motion sensing arrangement having a partial annulus shape.

CLAUSE B25. The method according to clause B24, comprising detecting at least one of rotational movement and axial movement of the rotor via a motion sensor located on an axial surface of the pressure-sealed motion sensing arrangement.

CLAUSE B26. The method according to clause B24 or B25, comprising detecting at radial movement of the rotor via at least two motion sensors located on an inner radial surface of the pressure-sealed motion sensing arrangement.

CLAUSE B27. The method according to any of clauses B22 to B26, comprising installing the pressure sealed motion sensing arrangement at a predetermined distance from the motion indicator, without the requirement for readjusting said predetermined distance before operation of the pump.

CLAUSE B28. A subsea pump, comprising:

a housing;

a rotor located inside the housing, a bearing arrangement being located between the rotor and the housing to facilitate rotation of the rotor therein, and the rotor comprising a motion indicator;

a motion sensing arrangement comprising a hermetically sealed pressure sealed housing and at least one sensor, the motion sensing arrangement being located inside the housing and in communication with the motion indicator, and the motion sensing arrangement being configured to detect movement of the motion indicator.

A Cooling and Lubrication System and Associated Method

Figure 12:
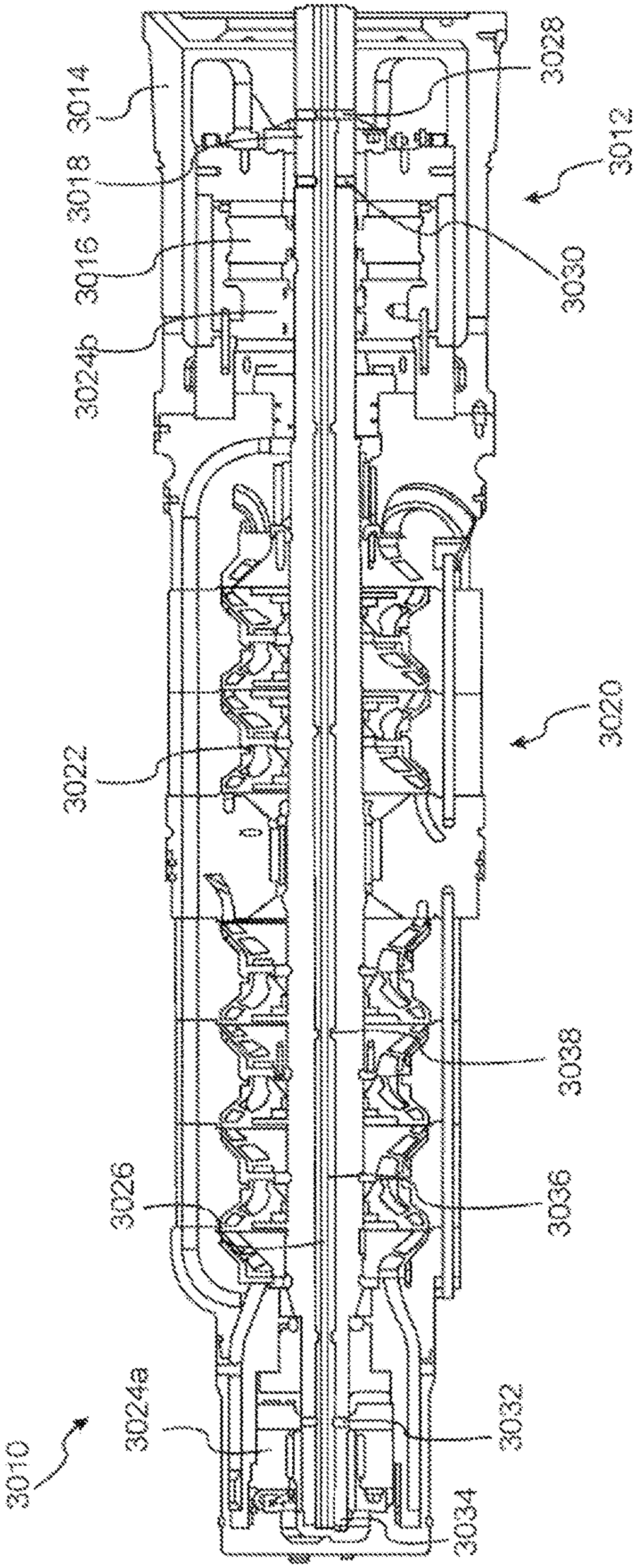
FIG. 12 shows a sectional view of an example of a pump and motor assembly.
Figure 13:
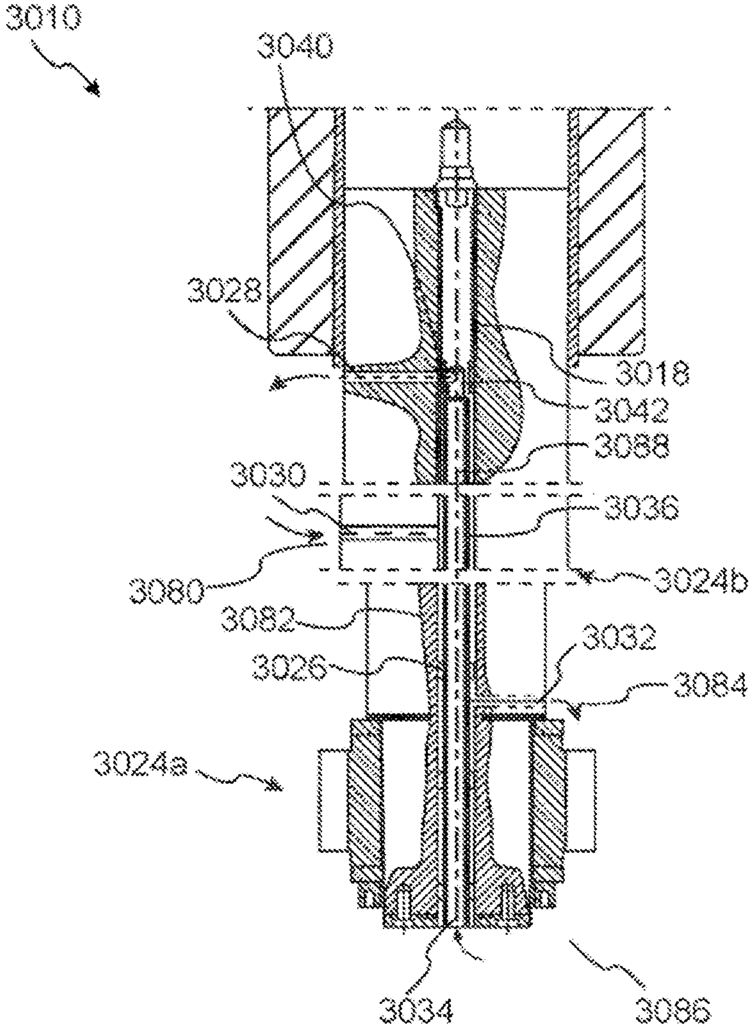
FIG. 13 shows a simplified sectional view of an example of a drive shaft of a motor.
Figure 14:
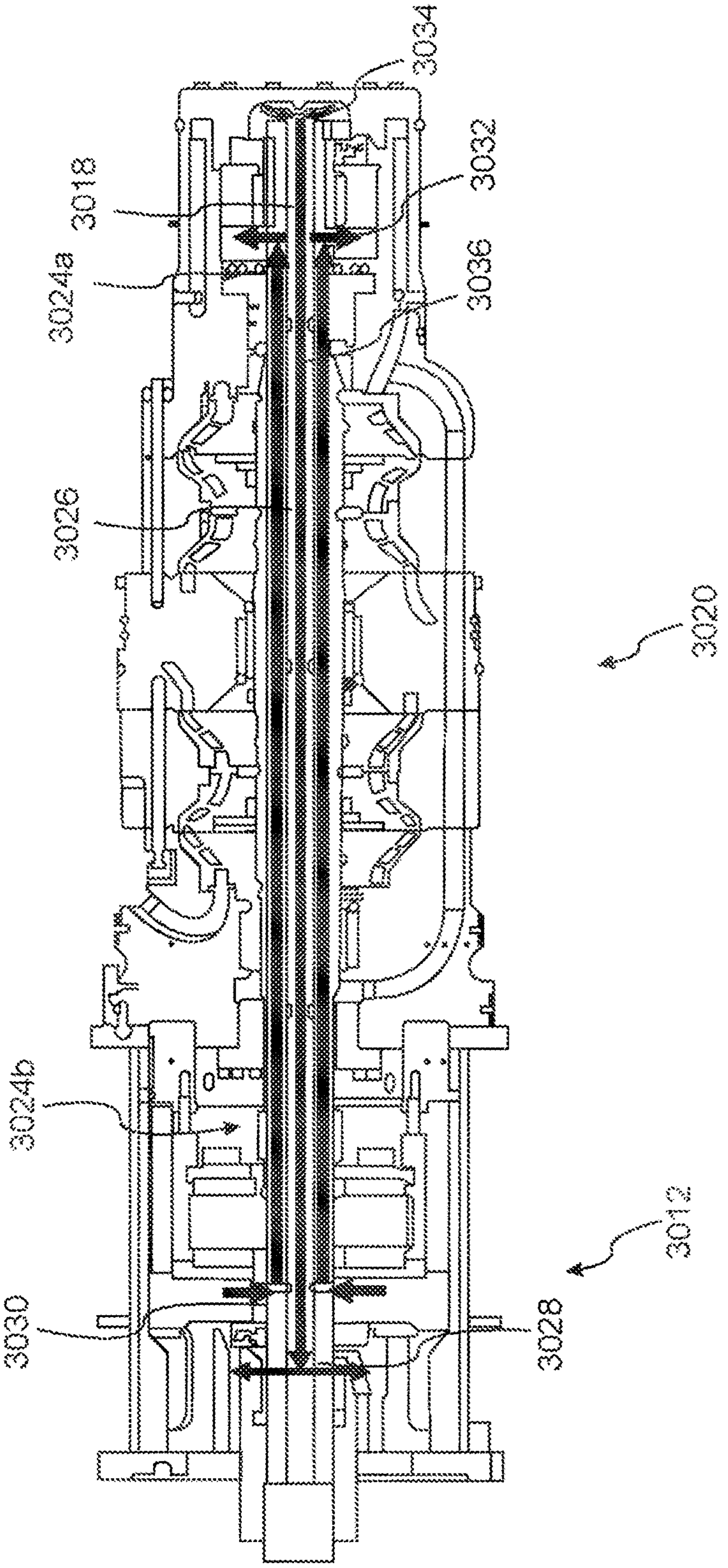
FIG. 14 illustrates a further sectional view of a pump showing detail of fluid flow.

Now turning to the disclosure of FIGS. 12 to 14, the first aspect of this disclosure shows a cooling system for a subsea pump, comprising:

a drive shaft, the drive shaft comprising a coolant/lubricant delivery flow path and a coolant/lubricant return flowpath extending therethrough;

a fluid delivery inflow port and a fluid delivery outflow port, each located on a circumferential surface of the drive shaft, the fluid delivery inflow port being configurable to permit fluid flow from a coolant/lubricant source to the coolant/lubricant delivery flow path, and the fluid delivery outflow port being configurable to permit flow from the coolant/lubricant delivery flow path to a target location;

a fluid return inflow port and a fluid return outflow port, the fluid return inflow port located on an axial end of the drive shaft, and the fluid return outflow port located on a circumferential surface of the drive shaft, the fluid return inflow port being configurable to permit fluid flow from the target location to the coolant/lubricant return flowpath, and the fluid return outflow port configurable to permit fluid flow from the coolant/lubricant return flowpath to a coolant/lubricant sink;

wherein the turning of the drive shaft drives fluid flow through the coolant/lubricant delivery flowpath and the coolant/lubricant return flow path.

FIG. 12 shows a sectional view of a pump and partial motor assembly 3010, with the motor 3010 removed for simplicity. The pump and motor section comprises three main portions. Illustrated on the right-hand side of the Figure is a motor compartment 3012. The motor compartment 3012 comprises a housing 3014, which may house a motor (illustrated is thrust bearing 3016, with the motor removed for clarity) therein, or which may have a motor affixed to an external surface thereof, and may optionally house a part of the motor. The motor is coupled to a drive shaft 3018, which is able to be rotated by the motor in order to provide drive to operate a secondary device, for example.

Here, the pump and motor assembly 3010 comprises a pump module 3020, which is driven by the motor via the drive shaft 3018. The pump module 3020 comprises a plurality of impellers 3022, which are also coupled to the drive shaft 3018, and are used to pump a fluid through the pump. In this example, the impellers 3022 are multiphase impellers, meaning that they can be used to pump a multiphase fluid (i.e. one that may comprise both a liquid and a gas fraction) through the pump and motor assembly 3010, although similar setup wherein the multiphase impellers are replaced by single-phase liquid impellers and/or single-phase gas impellers may also be possible.

The drive shaft 3018 is supported at either end in the pump and motor assembly 3010 by a set of bearings 3024*a*, 3024*b* (see FIG. 14). One of the sets of bearings 3024*a* is located at the Non-Drive End (NDE) of the drive shaft 3018, while the other of the sets of bearings 3024*b* is located at the Drive End (DE) of the drive shaft 3018. Together, the bearings both support the drive shaft 3018, while permit rotation of the drive shaft 3018 about its axis.

As will be described in further detail later, the drive shaft 3018 comprises a central bore 3026 that extends therethrough. The central bore 3026, in this example, provides fluid communication between the NDE bearings 3024*a*, and the motor 3016. To enable this fluid communication, the drive shaft 3018 additionally comprises three radial fluid ports 3028, 3030, 3032, and one axial fluid port 3034. Each of the bore 3026 and the radial fluid ports 3028, 3030, 3032 may be drilled into the shaft, for example. One of the radial flow ports 3030 may be considered a fluid inflow port, while two of the radial flow ports 3028, 3032 may be considered fluid outflow ports. The axial inflow port 3034 may also be considered a fluid inflow port. In this case, the fluid inflow port 3034 takes a fluid from the motor compartment 3012 and delivers this fluid to the NDE bearings 3024*a* via the central bore 3026 and the outflow port 3032. Axial outflow port 3034 delivers fluid from the NDE bearings back 3024*a* to the motor compartment 3012 via the central bore 3026, in particular via a flow tube 3036. Inserted in the central bore 3026 is the flow tube 3036 (which may be considered to be a conduit), which may divide the central bore, such that it is able to comprise multiple flow paths, as will be described in further detail later. Having this configuration (e.g. where there is a central bore defined in the drive shaft) may permit a flow and distribution of a fluid throughout the pump and motor assembly 3010 without the requirement for external pipework or tubing, thereby reducing the complexity of the assembly, and providing fewer opportunities for a leakage of fluid.

Referring now to FIG. 13, a simplified schematic illustration of the pump and motor assembly 3010 is shown. In this example, flow paths of fluid are illustrated with arrows, as will be described.

In common with the FIG. 12, there is illustrated a drive shaft 3018, having one end supported by NDE bearings 3024*a*, and a second end supported by DE bearings 3024*b*. The drive shaft comprises central bore 3026, as well as three radial fluid ports 3028, 3030, 3032 and one axial flow port 3034. Although, in this example, a single of each fluid port has been illustrated, having multiple of each fluid port may also be possible. For example, for the radial fluid ports 3028, 3030, 3032, there may be a radial array of fluid ports, each radial array comprising several fluid ports. In such an example, having a radial array may permit a larger flow of fluid therethrough, or may provide protection against blocking of a single fluid port, thereby providing an element of redundancy. Further, a user may be able to have some control over the flow rate, by being able to decide the number of each type of fluid port. Where there is an array of each type of fluid port, each array may comprise the same number of fluid ports, or a different number of fluid ports.

The fluid ports 3028, 3030, 3032, 3034 permit fluid flow through the central bore 3026 in the shaft (illustrated by arrows, as will be further described) and define a cooling system for the pump and motor assembly 3010. In particular, the fluid ports 3028, 3030, 3032, 3034 define a cooling system for the NDE bearings 3024*a* of the pump and motor assembly 3010 by permitting fluid to flow from the motor compartment (shown in FIG. 12), to the NDE bearings 3024*a*, and back to the motor compartment. As in FIG. 12, a flow tube 3036 is located in the central bore 3026 of the drive shaft 3018. The flow tube 3036 may permit two flow paths to be defined in the central bore 3026—one inside the flow tube 3036, and one in the annulus between the flow tube 3036 and the central bore 3026. This thereby enables one single bore to be made in the drive shaft 3018, which can accommodate two separate fluid flowpaths, thereby facilitating manufacture of the cooling system by requiring the manufacture of a single bore, for example as opposed to requiring several bores, which may be complex.

In this example, there may be a reservoir of fluid in the motor compartment. The fluid may be, for example, barrier fluid, such as an oil or other lubricating fluid. The fluid may have coolant properties, and may therefore be considered a coolant. The fluid may additionally have lubricant properties. In some examples, the fluid may function principally as a coolant. The fluid may be a water/glycol mix (e.g. a mix of 60% water and 40% glycol), or may be pure water or oil. The radial fluid port 3030, which may be an inflow fluid port, may be in communication with the coolant reservoir. Fluid communication between the fluid port 3030 and the coolant reservoir may be continuous, or it may be intermittent. For example, as inflow fluid port 3030 is located on the drive shaft 3018, this fluid port 3030 will rotate with the drive shaft 3018. As the drive shaft 3018 rotates, its position relative to the coolant reservoir may change. In some examples, the coolant reservoir may entirely surround the drive shaft 3018 (e.g. may entirely circumferentially surround the drive shaft 3018). In such examples, rotation of the drive shaft 3018 may result in the inflow fluid port 3030 being constantly held within the coolant reservoir. As such, in these examples, the inflow fluid port 3030 may be in continuous fluid communication with the fluid reservoir. In other examples, the coolant reservoir may discontinuously surround the drive shaft 3018 (e.g. discontinuously circumferentially surround the drive shaft 3018). In these examples, the coolant reservoir may circumferentially surround 90 degrees of the drive shaft, 180 degrees, 270 degrees, etc. In some examples the coolant reservoir may surround the drive shaft 3018 at various points, and the flow port 3028 may come into contact with the coolant reservoir at various points during a single 360 degree rotation thereof.

In this example, the coolant fluid may flow from the coolant reservoir and through the radial port 3030 into the central bore 3026, in the direction of arrow 3080, which may correspond to a coolant delivery flow path. As a result of the flow tube 3036 being located in the central bore 3026, the coolant fluid may flow into the annulus between the central bore 3026 and the flow tube 3036. Once in the annulus, the coolant fluid may flow in the direction of arrows 3082 along the annulus in the central bore 3026, and towards the radial flow port 3032, also corresponding to the fluid delivery flow path. Once at the radial flow port 3032, the fluid may flow out of the annulus and through the radial flow port 3032 in the direction of arrow 3084. The radial flow port 3032 may be in fluid communication with a target location—which is in this example the NDE bearing (see, for example, FIG. 12), where the coolant fluid may be used to cool and/or lubricate the NDE bearing, and may also provide lubrication and cooling to the NDE mechanical shaft seal. As more coolant fluid flows into the NDE bearing, the coolant fluid may flow through the NDE bearing, and towards axial flow port 3034, in the direction of arrow 3086. In this example, the axial flow port is defined by an aperture in the end of the flow tube 3036. Adjacent the axial flow port 3034, located between the flow tube 3036 and the walls of the central bore 3026, may be a seal (such as an O-ring type seal). The seal may prevent coolant fluid from flowing from the NDE bearing and into the annulus between the flow tube 3036 and the central bore 3026, thus directing all fluid flow through axial port 3034 in the flow tube 3036, and in the direction of arrow 3088, which may correspond to a fluid return flow path. The seal may additionally provide support for the flow tube 3036, to ensure that it is located as desired in the central bore 3026 (e.g. to ensure that it is located centrally in the central bore 3026). As such, the flow tube 3036 may be concentric with the central bore 3026.

Finally, the flow of coolant fluid may reach the radial flow port 3028. The radial flow port 3028 may be in fluid communication with the flow tube 3036 such that fluid flow exits the flow tube 3036, through the radial flow port 3028 and into a coolant sink. In this example, the coolant sink and the coolant source may be the same reservoir of coolant fluid. However, the skilled reader will recognise that it would also be possible to have a separate coolant source and coolant sink.

It will be noted that the coolant delivery flow path is located in the annulus between the fluid bore 3026 and the flow tube 3036, while the coolant return flow path is located inside the flow tube 3036. This may facilitate fluid entry from the target location (e.g. the NDE bearing) to the coolant return flow path through the axial flow port 3034, for example by permitting for a larger size of port 3034, or by permitting fluid to flow into a rotating circular shaped port, as opposed to an annular shaped port. Further, the cylindrical coolant return flow path may be (at its widest point) wider than the annular coolant delivery flow path, which may reduce the likelihood of a blockage from debris that the coolant fluid may pick up at the target location (e.g. the NDE bearings).

As can be observed in FIG. 13, the central bore 3026 comprises a narrower section 3042 at one end thereof. In this example, there is a stepped transition between a wider and a narrower section 3042 of the central bore 3026, forming a shoulder 3040 in the central bore 3026. In this example, the flow tube 3036 is supported axially by the shoulder, and the radial flow port 3028 for fluid flow from the NDE bearings to the fluid sink is in fluid communication with the narrower section 3042 of the central bore 3026. In this way, fluid is permitted to flow from the flow tube 3036 and out of the central bore 3026 via the narrower section 3028 thereof. The inner diameter of the flow tube 3036 and the diameter of the narrower section 3042 of the central bore 3026 may be the same, or similar.

FIG. 14 illustrates the pump and motor assembly 3010 in further detail, with the flowpaths illustrated by arrows. In this view, it is possible once again to see the motor compartment 3012 and the pump module 3020, with the drive shaft 3018 extending therethrough. As previously, the flow tube 3036 is held inside the central bore 3026. In this Figure, it is possible to see that the flow tube 3036 is held inside the central bore 3026 by a plurality of tube supports 3038, which may be in the form of spring-like elements. In this example, the tube supports 3038 are in the form of spring clips, although any appropriate member that provides support to the flow tube 3036, while permitting fluid flow therethrough would be possible.

The fluid is driven through the pump and motor assembly 3010 by the turning of the drive shaft 3018. In particular, the centrifugal force generated by the turning of the drive shaft 3018 assists to encourage the flow of fluid through the central bore 3026 and radial flow ports 3028, 3030, 3032 of the drive shaft, and may be of sufficient magnitude that it is the only required force to drive the flow of fluid through the central bore (e.g. no external pumping or suction force may be necessary). In use, turning of the drive shaft creates a force acting away from the axis of rotation of the drive shaft 3018. As the coolant source, coolant sink and NDE bearings are all located exterior to the drive shaft 3018 and away from its axis of rotation, the turning of the drive shaft creates a force driving coolant fluid outwards from the axis of rotation and towards these locations. As the axial flow port 3034 may be located on the axis of rotation of the drive shaft 3018 (e.g. the axial flow port 3034 may be concentric with the axis of rotation of the drive shaft), then rotation of the drive shaft 3018 has no significant effect regarding a force acting to drive a fluid through the axial flow port 3034.

Referring to FIGS. 13 and 14, which contain arrows showing the direction of fluid flow of the coolant fluid it will be noted that, while the centrifugal force caused by rotation of the shaft 3018 causes fluid flow in a desirable direction in the case of fluid ports 3028 and 3032 (e.g. towards the NDE bearings and towards the coolant sink), the centrifugal force causes a force on the coolant fluid in a direction opposite to the desired direction in the case of fluid port 3030 (e.g. towards the coolant source). However, despite this undesirable directional force, rotation of the drive shaft 3018 causes fluid to flow in the desired direction (e.g. from the coolant source to the NDE bearing and to the coolant sink) because the forces acting on the fluid through ports 3030 and 3032 are generally equal and opposite, thereby the effect of the force on the fluid through port 3030 is effectively cancelled by the equivalent force acting on the fluid through port 3032. In contrast, the flow of fluid through port 3028 is not cancelled out, due to the fluid port 3034 being located concentrically with, or close to, the axis of rotation of the shaft 3018. As such, coolant fluid is able to flow through port 3028. As the coolant fluid may a liquid, and can be assumed to be incompressible, the flow of coolant fluid through port 3028 creates a suction effect in the through bore 3026 and flow tube 3036, which effectively drives coolant fluid into port 3030 (against the direction of the centrifugal force) and towards the NDE bearings for cooling purposes.

The described cooling system can therefore be used to provide cooling to bearings in a pump, without the requirement for external propulsion of fluid (e.g. through use of a secondary pump), and without the use of further pipes or tubes for the transfer of a coolant fluid.

The second aspect of this disclosure shows a method for providing cooling in a subsea pump, comprising: providing a driveshaft for a subsea pump comprising a coolant delivery flowpath and a coolant return flowpath therein; flowing a fluid through the coolant delivery flowpath, from a coolant source to a target location to cool the target location; flowing a fluid through the coolant return flowpath, from the target location to a coolant sink; driving fluid flow through the coolant delivery flowpath to the coolant return flowpath by turning the drive shaft.

The method may also comprise connecting the coolant delivery flowpath to a coolant source, and connecting the coolant return flow path to a coolant sink. As previously described, the coolant return flow path and the coolant sink may be the same reservoir of fluid. The coolant return flow path and/or the coolant sink may be located in a motor. The coolant fluid may be barrier fluid.

The method may comprise driving fluid flow through the coolant delivery flowpath to the coolant return flow by using centrifugal force generated by turning the drive shaft to drive the fluid through the relevant flow paths.

The person skilled in the art realises that the disclosure of FIGS. 12 to 14 is not limited to the preferred embodiments described above. The person skilled in the art further realises that modifications and variations are possible within the scope of the appended clauses. Additionally, variations to the disclosed embodiments can be understood and effected by the skilled person in practicing the claimed disclosure, from a study of the drawings, the disclosure, and the appended clauses. Some examples and aspects will now be described in the following numbered, non-limiting, clauses:

CLAUSE C1. A cooling and lubricating system for a subsea pump 3010, comprising:

- a drive shaft 3018, the drive shaft 3018 comprising a coolant/lubricant delivery flow path and a coolant/lubricant return flowpath extending therethrough and being powered by a motor;
- a fluid delivery inflow port 3030 and a fluid delivery outflow port 3032, each located on a circumferential surface of the drive shaft 3018, the fluid delivery inflow port 3030 being configurable to permit fluid flow from a coolant/lubricant source to the coolant delivery flow path, and the fluid delivery outflow port 3032 being configurable to permit flow from the coolant/lubricant delivery flow path to a target location; and
- a fluid return inflow port 3034 and a fluid return outflow port 3028, the fluid return inflow port 3034 located on an axial end of the drive shaft 3018, and the fluid return outflow port 3028 located on a circumferential surface of the drive shaft 3018, the fluid return inflow port 3034 being configurable to permit fluid flow from the target location to the coolant/lubricant return flowpath, and the fluid return outflow port 3028 configurable to permit fluid flow from the coolant/lubricant return flowpath to a coolant sink, the coolant sink being a reservoir of barrier fluid from the motor that powers the drive shaft 3018;
- wherein the turning of the drive shaft 3018 drives fluid flow through the coolant/lubricant delivery flowpath and the coolant/lubricant return flow path.

CLAUSE C2. The cooling and lubricating system according to clause C1, wherein the drive shaft 3018 comprises a central bore 3026 extending along the axis thereof, the central bore 3026 at least partially defining the coolant/lubricant delivery flow path.

CLAUSE C3. The cooling and lubricating system according to clause C2, wherein the central bore 3026 at least partially defines the coolant return flow path.

CLAUSE C4. The cooling and lubricating system according to any preceding clause, wherein the drive shaft 3018 comprises a central bore 3026 extending along the axis thereof, the central bore 3026 at least partially defining both of the coolant delivery flow path and the coolant return flow path.

CLAUSE C5. The cooling and lubricating system according to any preceding clause, wherein the drive shaft 3018 comprises a central bore 3026 extending along the axis thereof, with a conduit 3036 located in the central bore 3026, the conduit 3036 separating the coolant delivery flow path from the coolant return flow path.

CLAUSE C6. The cooling and lubricating system according to clause C5, wherein the return inflow port 3034 is defined by at least one of the central bore 3026 and the conduit 3036.

CLAUSE C7. The cooling and lubricating system according to clause C5 or C6, wherein at least a part of the coolant delivery flow path is defined by a region radially outwards of the conduit 3036, and at least part of the coolant return flow path is defined by a region radially inwards of the conduit 36.

CLAUSE C8. The cooling and lubricating system according to any of clauses C5 to C7, wherein the conduit 3036 is held in place by a radial support means 3038 such as a spring clip located between the central bore 3026 and the conduit 3036.

CLAUSE C9. The cooling and lubricating system according to any preceding clause, wherein at least part of the coolant delivery flow path and the coolant return flow path are concentric.

CLAUSE C10. The cooling and lubricating system according to any preceding clause, comprising a plurality of fluid delivery inflow ports 3030.

CLAUSE C11. The cooling and lubricating system according to any preceding clause, comprising a plurality of fluid delivery outflow ports 3032.

CLAUSE C12. The cooling and lubricating system according to clauses C10 and C11, wherein the number of fluid delivery inflow ports 3030 and the number of fluid delivery outflow ports 3032 are the same.

CLAUSE C13. The cooling and lubricating system according to clause C10, wherein the plurality of fluid delivery inflow ports 3030 are arranged on the drive shaft 3018 in a circumferential array.

CLAUSE C14. The cooling and lubricating system according to clause C11, wherein the plurality of fluid delivery outflow ports 3032 are arranged on the drive shaft 3018 in a circumferential array.

CLAUSE C16. The cooling and lubricating system according to clause C15, wherein the coolant source is a reservoir of barrier fluid from the motor.

CLAUSE C18. The cooling and lubricating system according to any preceding clause, wherein the target location is a pump bearing.

CLAUSE C19. The cooling and lubricating system according to any preceding clause, wherein the cooling system is for cooling bearings of a subsea pump.

CLAUSE C20. The cooling and lubricating system according to any preceding clause, wherein the coolant and lubricant are the same fluid.

CLAUSE C21. A method for providing cooling and lubrication in a subsea pump, comprising:

- providing a drive shaft 3018 for a subsea pump 3010 comprising a coolant delivery flowpath and a coolant/lubricant return flowpath therein, the drive shaft being powered by a motor;
- flowing a fluid through the coolant/lubricant delivery flowpath, from a coolant/lubricant source to a target location to cool said target location;
- flowing a fluid through the coolant/lubricant return flowpath, from the target location to a coolant/lubricant sink, the coolant sink being a reservoir of barrier fluid from the motor that powers the drive shaft 3018;
- driving fluid flow through the coolant/lubricant delivery flowpath to the coolant/lubricant return flowpath by turning the drive shaft.

CLAUSE C22. The method according to clause C20 or C21, comprising connecting the coolant/lubricant delivery flowpath to a coolant source, and connecting the coolant/lubricant return flow path to a coolant/lubricant sink.

A Method for Providing a Visual Indication of the State of Operation of a Subsea Pump Looking now at FIGS. 15 to 18, there is provided an improved method for providing visual indication of the state of operation of subsea pump. According to one aspect there is a method for providing a visual indication of the state of operation of a subsea pump, comprising:

- normalising an operating parameter;
- setting a desired operational range for the normalised parameter;

setting an acceptable operational range for the normalised parameter;

providing a first visual indicator for indicating that the normalised parameter is inside the desired operational range, providing a second visual indicator for indicating that an operating parameter is outside of the desired operational range and inside the acceptable operational range, and providing a third visual indicator for indicting that the operating parameter is outside the acceptable operational range;

providing a numerical scale for assigning an operation number to the normalised parameter based on its operation;

selectively displaying one of the first, the second and the third visual indicators, and the operation number on the numerical scale to a user.

The use of pumps is common across various applications, ranging from the drilling of wells to the supply of water. Depending on the intended use for a pump, it may be required to have different capabilities. For example, pumps must be able to produce sufficient head to deliver a required volume of fluid per unit of time to a desired location, and may additionally be required to operate with a range of working fluids, from incompressible to compressible, and often multiphase fluids. The wider the application range for the pump is, the more difficult the operating conditions of the pump may be to monitor accurately, for example whether the pump is operating within its operational range, whether it is operating in an unfavourable pump condition etc., some of which may reduce the lifespan of a pump or may severely harm a pump. Since pumps and rotary machines are often installed in harsh environments, e.g. on the sea floor, routine inspection can become a cost intensive and/or complicated venture if required to be done physically. As such there is a demand for a pump monitoring system which gives a pump operator (human or computer) a detailed, easy to understand and quickly generated indication of the operational state of the pump.

In some cases, it may be difficult to identify unfavourable pump conditions as the pump operating parameters are measured. For example, this may be due to identification of the pump conditions being dependent on multiple factors, for example the positioning and operation of the pump, which may have an effect on the measurement of parameters and therefore detailed analysis may be required in order to identify the unfavourable pump operating conditions. One way of preventing unfavourable pump conditions from damaging a subsea pump may be to set acceptable ranges for each measured operating parameter of the pump by choosing individual accepted maxima and minima for any of the measured pump operating parameters. This approach may permit a user to ascertain whether a pump is running in an acceptable manner or not, but may not give a detailed insight into pump conditions. In instances when the pump is in operation but not in its desired operational range, the pump may be degrading and/or at higher risk of failure due to high stress on pump parts, although this may be difficult to identify simply by setting acceptable ranges for each operating parameter.

As unfavourable pump conditions may have an effect on measurement of multiple pump operating parameters, it can be difficult to identify the exact nature and/or cause of the unfavourable pump condition, which may be possible only by correlating pump operating parameters, which can be a complex and time consuming operation. Additionally, the pump operating parameters may be within their permissible operational range, but may be far from their normal or desired value. Furthermore, the pump operating parameters may be open to misinterpretation, and an unfavourable pump condition may be misidentified as one that is acceptable, or vice versa, using this method.

This disclosure seeks to provide a system for recognition of unfavourable pump operation conditions by providing a more understandable analysis and indication of unfavourable pump operation conditions based on normalised pump operating parameters, which may be read individually, and without the requirement of the context or dependency of other pump operating parameters. This approach may therefore provide a detailed insight into how each pump parameter changes over time, allowing identification of the operational state of the pump with greater precision. A condition number may be attributed to each operating parameter to provide an indication of the acceptability of each performance parameter, and which may be combined with other performance values into a single value to provide an overall indication of the operational state of a pump.

Figure 15:
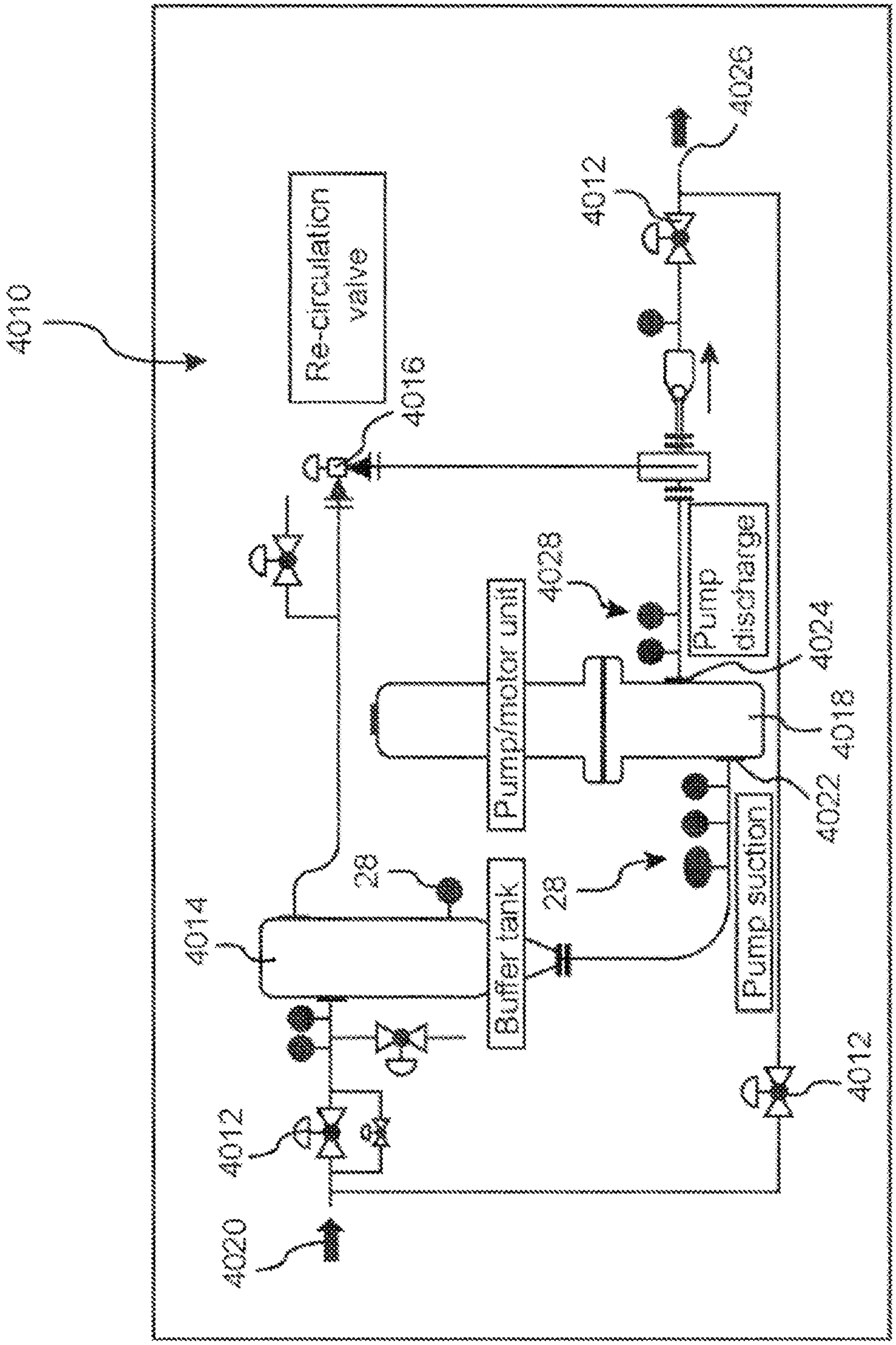
FIG. 15 shows a schematic view of a piping system.

FIG. 15 is a schematic illustration of a piping system 4010, in which the described system may be applicable. The piping system 4010 has a number of components, including various valves 4012, a buffer tank 4014, a recirculation valve 4016, and a pump unit 4018. In use, fluid may flow from a system inlet 4020 and into the buffer tank 4014. In this example the fluid may be a multiphase fluid, although a fluid flowing in a single phase would also be possible. The pump 4018 induces the fluid to flow from the buffer tank 4014 to the pump 4018 at pump inlet 4022, and exits the pump at the pump outlet 4024.

Thereafter, the fluid may be circulated back to the buffer tank via the recirculation valve 4016, or may flow out of the illustrated piping system at the outlet 4026.

A sensor arrangement 4028 is illustrated in FIG. 15, showing a Multiphase Flow Meter (Mpfm), a pressure sensor and a temperature sensor positioned proximate the pump inlet 4022, and a pressure sensor and a temperature sensor positioned proximate the pump outlet 4024. In this example, the sensor arrangement also comprises a fluid level sensor positioned inside the buffer tank 4014. Although not visible in FIG. 15, the sensor arrangement 4028 may additionally comprise sensors located inside the pump 4018.

The skilled reader will understand that, while only Mpfm, pressure, temperature and fluid level sensors are illustrated in FIG. 15, the sensor arrangement may equally comprise other sensor types, for example the sensor arrangement 4028 may sense at least one of the pump speed, pump flow rate, fluid density, fluid viscosity, or the like.

Although not illustrated in FIG. 15, the sensor arrangement 4028 may be able to provide information to a user based on the sensed values. For example, the sensor arrangement 4028 may be in communication with a signal transmitter (e.g. a wireless signal transmitter) to transmit signals indicating each of the sensed values to a user with a receiver. Once the user has received this information, then this information may be able to be provided on a display for ease of understanding of the user.

Figure 16:
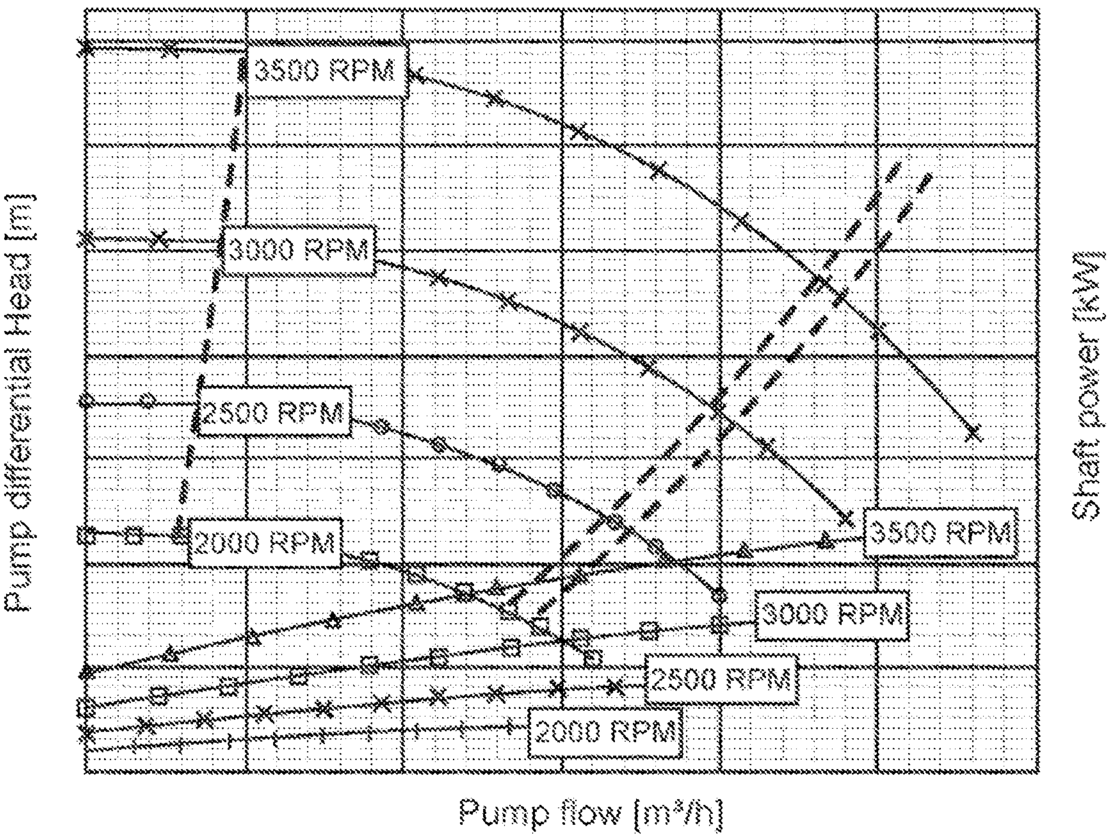
FIG. 16 shows a graph showing changing parameters with flow rate in a pump.

FIG. 16 shows an exemplary graph of the shaft power and the differential head of a pump in dependency of the volume flow through the pump and the rotational speed of the pump, which are values that may be calculated and/or measured through use of the sensor arrangement 4028 of FIG. 15. As can be seen in FIG. 16, both the shaft power and the differential head of the pump depend on the volume flow rate through the pump and the rotational speed of the pump. Such interdependency between measurable parameters may present difficulties when observing the operational state of the pump.

Observation of the pump operational state may comprise measuring at least one pump operating parameter, e.g. pump speed, pump flow, pump head, pump shaft power, cooler differential pressure, mechanical seal differential pressure, thrust bearing friction loss, cooler heat transfer coefficient, barrier fluid consumption, temperature, casing vibration, shaft vibration, shaft torque, motor slip or other measurable pump operation properties. In one example, pump shaft power, pump speed and pump flow may be measured to ensure an acceptable pump operational state e.g. an acceptable operational state of the pump shaft. Unfavourable or deteriorating pump operating conditions, e.g. the degradation of parts and/or increased friction in the pump, may have an effect on any of the various pump operating parameters. Other changes to operating conditions, e.g. changes in the density or compressibility of the working fluid, may result in similar effects on the various pump operating parameters making it difficult to identify events such as degradation of the operation of the pump, or even whether the current pump operation is within safe margins.

It is therefore desirable to be able to monitor the operation of a pump such that adverse effects or conditions affecting operation of the pump can be easily identified. In particular, it may be desirable to be able to monitor the operation of a pump over a period of time to identify adverse effects or conditions, while simultaneously taking into account the effect of the present operating conditions on the pump itself.

One possible method for monitoring the operation of a subsea pump to easily identify adverse effects or conditions on operation may be to measure and subsequently normalise a first operating parameter relative to a measurable second operating parameter of the pump. The normalisation of a first operating parameter may involve modifying the operating parameter such that it is no longer dependent on operating conditions, for example the pump speed, motor power, pump flow, differential pressure, or the like. The normalisation of a first operating parameter may involve the comparison of a measured parameter against an expected value for that parameter. For example, where the first parameter is pump flow rate, then the normalisation of pump flow rate may comprise the comparison of the measured pump flow rate at a measured pump speed (e.g. the rpm of the pump) with the expected value of the pump flow rate at the measured pump speed. In some examples, the measured operating parameter may be extrapolated before being compared to a known value of the operating parameter to produce the normalised parameter. For example, where the expected pump flow rate is only known at selected pump speeds, then the value of the measured pump flow rate at a measured speed may be extrapolated to that at a pump speed where an expected value is known, and the extrapolated value compared to the expected value to produce the normalised value.

The expected values may be taken from the operation of a pump in test conditions, for example in optimal test conditions. Operation of the pump in optimal test conditions may provide test data of the expected optimal operation of the subsea pump, and a corresponding range of expected values of test parameters. The expected value may additionally or alternatively be taken from the operation of a pump in a non-used state, e.g. a brand new pump that had not before been used in operation. The expected values may be taken from the operation of a pump in non-optimal test conditions, and then extrapolated or processed in order to receive optimal test data. For example, the data received or measured in the non-optimal test conditions may be multiplied by a normalisation factor. The normalisation factor may be based upon, for example, the ratio or comparison of a real-time second operating parameter (e.g. speed of rotation of the pump motor) and a nominal second operating parameter (e.g. speed of rotation of the pump motor) which may have been measured in an optimal test environment, or for which there may be a rated or known value, and may therefore provide data permitting the user to extrapolate a measured or real-time value to provide an expected value. The second operating parameter may be selected based on availability of data, and/or based on the ease by which the operating parameter may be obtained.

Once normalised, the first operating parameter may be compared against an expected value of the first operating parameter, where the expected value of the first operating parameter may be measured (or extrapolated based on measured data, as described above). The expected value may be generated or obtained based on operation of the subsea pump in a test environment and in a known working condition (e.g. in an as-new, non-used condition). In one example, where the nominal second operating parameter is speed of rotation of the pump motor, then the expected value of the first operating parameter may be generated or obtained based on operation of the subsea pump at the nominal speed of rotation of the pump motor. In this case, where operation of the subsea pump is exactly as expected, the ratio between the normalised parameter and the expected value may be 1, and deviation from the expected operation of the subsea pump may result in a ratio of less than one, or more than one. The ratio may be considered to be a parameter ratio, and may be based on the comparison of the measured parameter and expected parameter. In some cases, all or some parameter ratios may be measured at the start of operation of the pump, so as to provide a baseline parameter ratio. Such a baseline parameter ratio may permit a user to compare real-time operation of the pump with the initial operation of that particular pump, which may provide useful information for identifying factors that cause inhibition of the functioning of the pump.

In some cases, the parameter ratio may be mapped to pump condition parameters that describe the pump performance for the various pump operating parameters. These mappings may set a value between e.g. 0 and 1, or a percentage value of between 0 and 100 percent, for each ratio previously calculated, describing how well the pump is performing for each pump operating parameter. The mappings may be different for all the various pump operating parameters and may differ for various pumps or differing pump applications.

Figure 17:
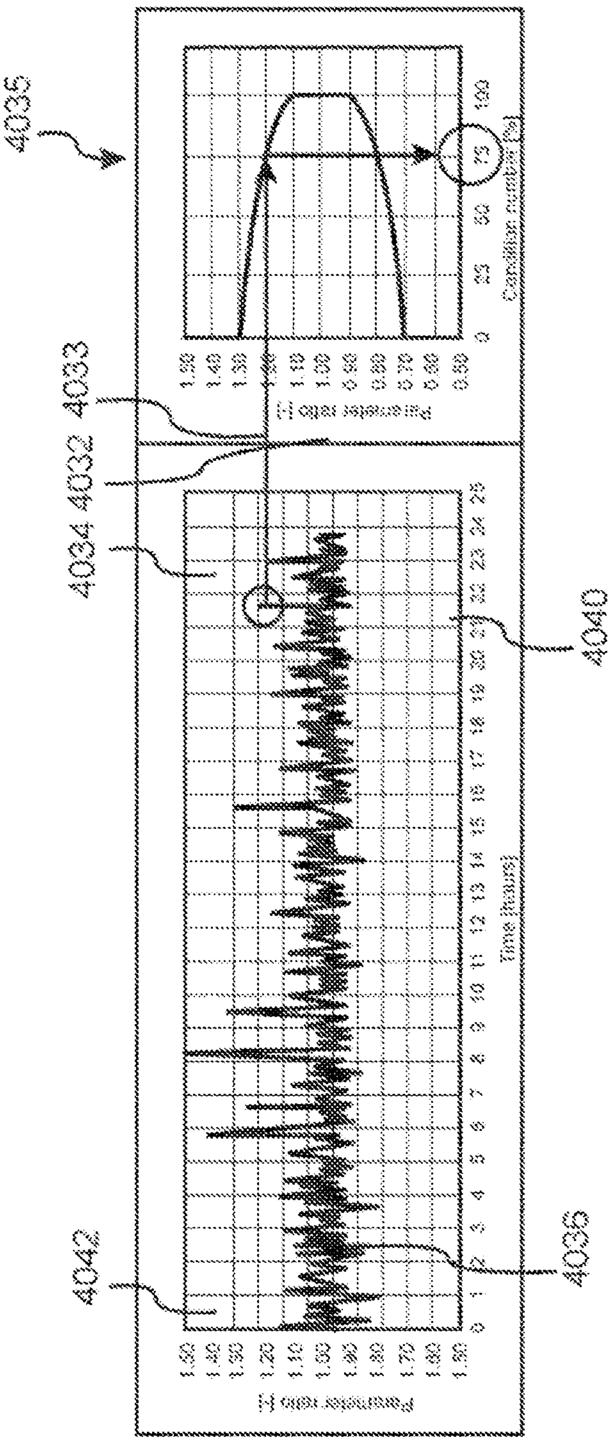
FIG. 17 shows a graphical illustration of a changing parameter ratio against time.

FIG. 17 is a graphical representation of a parameter ratio along the Y-axis 4042 (e.g. the ratio of a pump operating parameter and an expected value for said parameter as previously described—herein the parameter is the pump shaft power 4042 measured against time 4040 in hours) against time on the X-axis 4040. As can be seen, the pump shaft power deviates from its expected value (which may be considered to be its value as would be expected during operation in an as-new state in identical conditions) which is denoted as parameter ratio 1 and is marked on FIG. 17 with a broken line 4036. Between the values of 1.1 and 0.9 on the parameter ratio scale is defined a desired operational range 4032, although it should be noted that the desired operational range may be between other values, such as between 0.8 and 1.15, 0.95 and 1.3, etc., and may vary depending on the parameter on which the parameter ratio is calculated e.g.

pump flow rate, differential pressure etc.). As can be seen in FIG. 17, the majority of the time the parameter ratio of the pump falls within a desired operational range 4032. Between the parameter ratio values of 1.3 and 0.7 (although not including the range from 1.1 to 0.9) is an acceptable operational range 4033. The acceptable operational range may be a range in which operation of the pump is possible, although may be suboptimal, or may be likely to cause damage to the pump if operated within this range for an extended period of time. As with the desired operational range, the acceptable operational range may deviate from the values shown in FIG. 17. The subsea pump operating in this range may indicate that operation of the pump has dropped to a level that requires some degree of investigation by a user, which may be direct intervention by a user (e.g. by increasing or lowering the pump speed) or may indicate that the subsea pump requires more careful monitoring. As can be seen in FIG. 17, the parameter ratio of the pump frequently enters the acceptable operational range 4033. Although this may bear risks when operating the pump in this operation range for too long, in the case illustrated the vast majority of the time of operation of the pump is in the desired operational range 4032, and therefore operation as illustrated in FIG. 17 may not require any intervention by the user. In some cases, the value of the parameter ratio may be outside of both the desired operational range and the acceptable operational range. Such an operational range may be termed a hazardous operational range 4034, in which failure of the pump may be imminent. Due to the dangers posed by operation outside of both the desired and acceptable operational ranges, operation of the pump may be ceased and the pump shut down to prevent damage thereto. In FIG. 17, there are very few instances in which operation of the pump is in the hazardous operational range 4034. As can be seen from FIG. 17, every time the parameter ratio enters the hazardous operational range, it is quickly returned to either the acceptable or desired operational range. This may be due to user intervention (such as shut down or modification of pump operation) or it may be due to a brief anomaly occurring within the pump. Once the pump has been identified as operating in the hazardous operational range (e.g. outside both the desired and acceptable operational ranges) then any problem may be quickly addressed and running of the pump may continue. In all cases, there may be a minimum time period in which the parameter ratio should remain in either the acceptable operational range 4033 or the hazardous operational range 4034 before action is required on behalf of the user. For example, some operation of the pump in the acceptable operational range 4033 may be acceptable, or even expected, for several minutes or more, whereas any operation in the hazardous operational range may be considered to be unacceptable and may therefore require immediate intervention by a user.

Illustrated on the right side of FIG. 17, a mapping 4035 for the parameter ratio to a condition number is provided. According to this mapping 4035, the condition number is equal to 100 when the parameter ratio is in the desired operation range 4032, the pump condition number is equal to 0 in the hazardous operation range 4034 and the pump condition parameter to a number in between 0 and 100 for the acceptable operation range 4033. The mapping 4035 illustrates that, while the value of the parameter ratio is in the acceptable operational range, the corresponding condition number may vary between 0 and 100 in this example. Here, inside the desired operational range as well as at the boundary between the desired operational range and the acceptable operational range, the condition number is 100 (e.g. the maximum value of the condition number), while inside the hazardous operational range as well as at the boundary between the acceptable operational range and the hazardous operational range, the condition number is 0 (e.g. the minimum value of the condition number). When the parameter ratio is in the acceptable operational range, the condition number may be an intermediate value of between maximum value and the minimum value, which are 100 and 0 in this case. In the example of FIG. 17, there is a non-linear relationship between the variation of the parameter ratio in the acceptable range and the condition number, although in some examples, there may be a linear relationship. As illustrated in FIG. 16, the non-linear relationship is such that an initial change in the parameter ratio from the boundary of the desired operational range towards the hazardous operational range has initially only a small effect on the mapped condition number, while as the parameter ratio moves towards the hazardous range, the relative change in the condition number becomes greater. The non-linear relationship may result in, for example, a quadratic or exponential variation (or other polynomial variation) in the condition number with a change in the parameter ratio, or in fact any arbitrary curve that best correlates with the experience and knowledge of the pump vendor.

In use, the user may be able to see a graph as is indicated in FIG. 17, or alternatively the skilled person may simply be given the parameter ratio and/or the condition number for a single reading, or for a number of readings. Such information may be provided on a display. The user may then be able to quickly identify whether the reading is acceptable, or whether action must be taken, based on whether the value falls into acceptable ranges that may be indicated by differing colours, as in FIG. 17. The ranges (e.g. desired, acceptable and hazardous) for the parameter ratio and/or the condition number may be the same for different operating parameters. As such, the described method may permit the user to more quickly and accurately understand whether action must be taken, thereby reducing the likelihood and severity of any accidents that may occur. In other cases, the threshold values for the desired, acceptable and hazardous ranges may differ, in which case having a display that illustrates the ranges, for example with boundary lines and/or colour coding, may assist a user to understand very quickly the significance of the parameter ratio for different parameter.

In some examples and as previously indicated applies to FIG. 17, the parameter ratio and/or the condition number may be provided (e.g. displayed) in or with a colour. For example, each value may be provided in or with (e.g. in a coloured area, when the value is displayed graphically, or with a coloured number, when the value is displayed numerically) a green colour when in the desired operation range, a yellow colour when in the acceptable operational range, and a red colour when in the hazardous operational range. As such, with only a quick glance, and without even a need to register the value of the parameter ratio and/or condition number, the user may be able to identify whether action must be taken to preserve the life of the pump and/or to avert an accident.

In some examples, a plurality of operating parameters may be measured, each may be normalised and a separate normalisation factor may be calculated for each of the operating parameters, and individual desired, acceptable and hazardous operational ranges may be set for each of the operating parameters. In such examples, the user may be provided with multiple parameter ratios and/or condition numbers, one corresponding to each of the measured operating parameters. In some examples, it may be possible to combine parameter ratios and/or condition numbers, to provide a global parameter ratio and/or condition number, which may be indicative of the overall health of the pump operation. Such values (which may be considered to be global values) may be provided by averaging, using weighted calculations, multiplying the values, or the like. Such a value may provide an operator a quick and easy way to assess the overall health of the pump operation.

In some examples, at least one of the operating parameters, parameter ratio and condition number may be provided to a computerised system, which may itself be able to automatically take action without direct intervention by a user. For example, where a parameter ratio is identified as being in the hazardous range, the pump may be automatically stopped, or the speed reduced, without the user having to take action. This may enable the pump to be operated so as to avoid, or significantly reduce, the chance of failure of the pump in operation.

The described method may facilitate a user to operate multiple pumps as only one value per pump, or per operating parameter, has to be checked and a quicker analysis may be carried out on any of the pump condition parameters, the parameter ratio or the calculated condition numbers, for example in the case that the pump is not operating within its desired range. It is easier for a person to check one value compared to multiple parameters, therefore, when displaying the statuses of multiple pumps on a screen in some examples it may be advantageous to display only one global parameter ratio/condition number per pump as this may enable a display of the condition of more pumps on the screen compared to displaying multiple parameters per pump on the same screen.

Any or all of the pump operating parameters, the normalized pump operating parameters, the parameter ratio and the pump condition number may be displayed on a pump operation display to provide a pump operator with a visual indication of the pump's operational state. Most advantageously, any or all of the pump operating parameters, the normalized pump operating parameters, the pump parameter ratios and the pump condition number may be displayed on a gauge, for example with a needle display, and optionally the gauge may comprise colour segments corresponding to the ideal, intermediate and hazardous operation conditions to facilitate understanding of multiple pump operation statuses simultaneously. The display type may be chosen as another type which may suit the user or may facilitate understanding.

The pump may advantageously be a pump wherein the early detection of unfavourable operational states yields a significant economical, technical or safety benefits, e.g. by not having to replace a pump in harsh conditions, for example a subsea pump.

Figure 18:
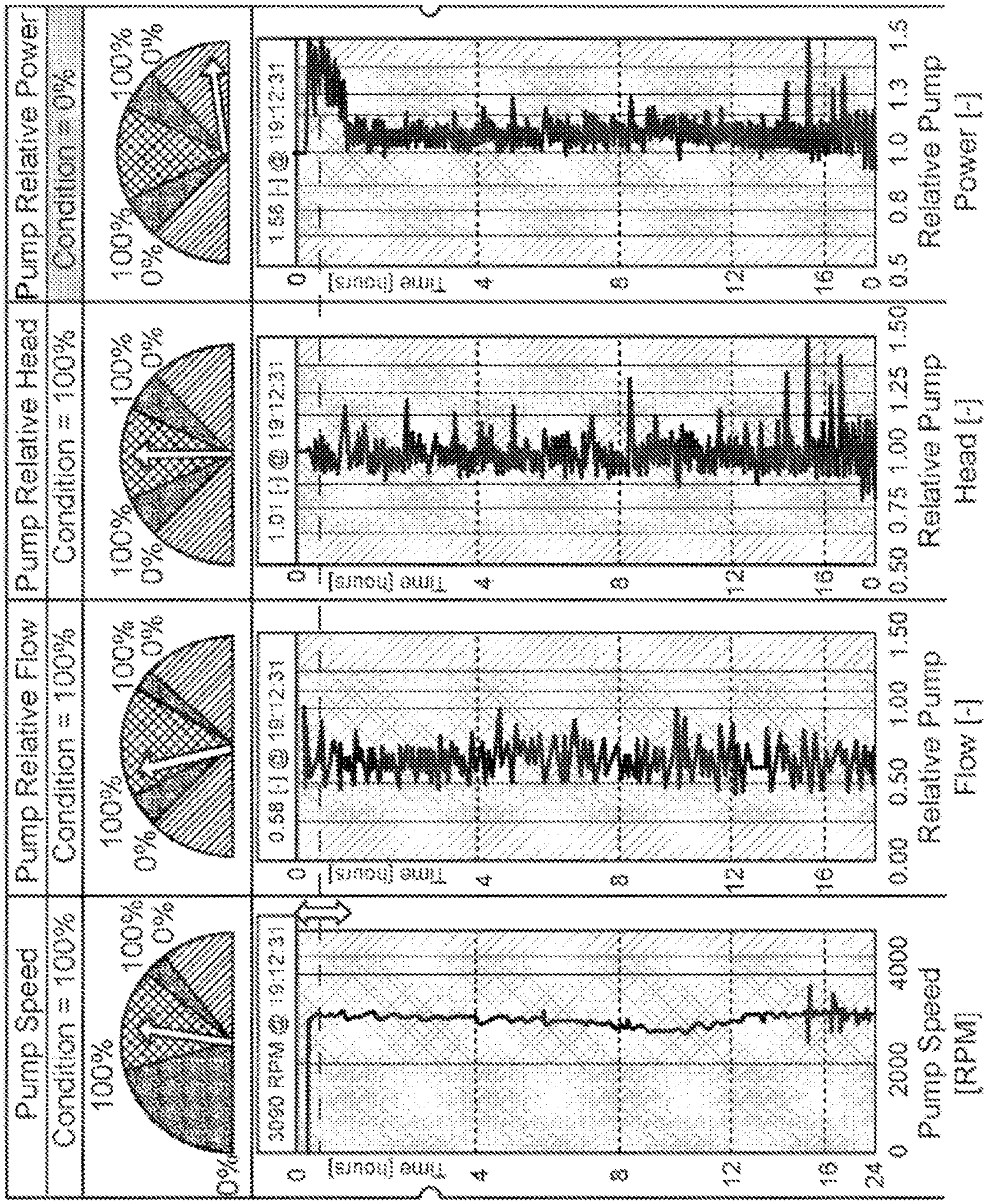
FIG. 18 is a number of graphs and dials illustrating the variation of a performance parameter, or parameter ratio, over time, with corresponding condition numbers.

The example in FIG. 18 shows the measurement data of multiple pump operating parameters and multiple normalized pump operating parameters at the failure of the pump thrust bearing. In particular is illustrated a graph of the pump speed against time 4050 as well as parameter ratios for the pump relative flow rate against time 4052, pump relative head against time 4054, and power relative power against time 4056. As can be seen from the time axis 4060 (the Y-axis) of each of the illustrated graphs, each parameter is shown as measured over a 4024 hour period, with the Y-axis 4060 relating to time elapsed, and the most recent event being shown at the top of the graph in FIG. 18. Since the more time that has passed since an event, the less significant the event becomes, the time indicated on the Y-axis 4060 is gradually compressed from 0 to 24 hours.

Indicated by a broken line 4062 is the time point on the Y-axis 4060 that corresponds with the data that is being shown on dials or gauges 4070, 4072, 4074, 4076, as indicated by the needle on the dials/gauges. While the graphs 4050, 4052, 4054, 4056 illustrate data over time, the dials may illustrate real-time data, or may illustrate data with a lag compared to real-time. However, rather than displaying the parameter ratio, the dials illustrate the condition number of the displayed data. In this example, the condition number is shown as a percentage value of between 0 and 100 percent. The exact condition number is additionally shown as a figure located in a bar 4090, located above each of the graphs, thereby providing the user with a more exact indication of the performance of the pump.

Illustrated on both the graphs and the dials are coloured sections, which correspond to the desired operational range (4078, illustrated in green), the acceptable operational range (4080, illustrated in yellow) and the hazardous operational range (4082, illustrated in red), thereby making it easy for a user to see and rapidly evaluate in which operational range the pump is operating. The coloured sections may serve as visual indicators to a user of the operational range of each parameter or parameter ration that is being measured. In the example illustrated, the dials 4070, 4072, 4074 show that for the speed parameter, and the pump relative flow and pump relative head parameter ratios, the pump is in a desired operational range and the condition number is equal to 100%. In contrast, the parameter ratio for the pump relative power is in the hazardous operational range (e.g. outside of both the desired and the acceptable operational ranges) and equal to 0%, therefore indicating to a user that action must be taken in order to avoid failure. In addition to displaying a condition number, the bar 4090 is also able to display the condition number in a colour that corresponds to operational range of the parameter or parameter ratio of the pump, thereby serving as a visual indicator to a user.

Above the dials 4070, 4072, 4074, 4076 is illustrated an indication of the global or overall state of the pump operation 4092. Here, an overall condition number is displayed, that a user may be able to view to assess whether intervention to the operation of the pump is needed or not. The overall condition number may be generated, for example, by multiplying together (or alternatively averaging) each of the condition numbers of the parameters and/or parameter ratios that are being measured. In this case, since three of the condition numbers are equal to 100, and one of the condition numbers is equal to 0, and therefore the overall condition number is calculated to be 0, again indicating that user intervention may be required. Having an overall condition number may be particularly useful to a user in cases where many parameters and/or parameter ratios are being measured in the acceptable operational range (e.g. with a condition number of between 0 and 100 percent). In such cases, having one parameter or parameter ratio being measured in the acceptable operational range may not seem too detrimental to the overall operation of the pump, where there are many parameters or parameter ratios being measured in this range, the cumulative effect may begin to be detrimental to the pump operation. Having an overall condition number may assist to quickly illustrate to a user the cumulative effect of each parameter in such a situation. In addition, it may be possible to give each measured parameter or parameter ratio a weighting, when calculating the overall condition number, thereby placing more importance on having some operation parameters or parameter ratios in the desirable operational range, than others.

Were this information to be displayed in a different format, for example one that illustrated the pump relative power as a parameter, it may be difficult for a user to ascertain whether the value of power displayed was acceptable or not, particularly as pump power may be influenced by other parameters, which would then need to be assessed by a user, taking time and therefore increasing the likelihood of pump failure. Therefore, analysing the pump operational state with the normalized pump operating parameters may facilitate the detection of unfavourable pump operational states.

Illustrated in FIG. 19 is a cause and effect matrix 4095, which details a selection of causes 4096 of failure, or of inhibition of the operation of a pump, and corresponds each of these causes 4096 with an effect 4097, or a number of possible effects. Although not illustrated in the matrix 4095, the cause and effect matrix may additionally provide an indication of the probability of each of the causes, thereby guiding a user to the most effective way to intervene in the operation of the pump. Such a matrix 4095 may be used in combination with the information provided on the display of FIG. 18. For example, a user may be able to identify an effect 4096 in the matrix 4095 based on the condition numbers and operational ranges of parameters and parameter ratios that are available to them, and thereby be provided with a possible cause, or a range of causes, 4097.

The person skilled in the art realises that the disclosure of FIGS. 15 to 18 is not limited to the preferred embodiments described above. The person skilled in the art further realises that modifications and variations are possible within the scope of the appended clauses. Additionally, variations to the disclosed embodiments can be understood and effected by the skilled person in practicing the claimed disclosure, from a study of the drawings, the disclosure, and the appended clauses. Some examples and aspects will now be described in the following numbered, non-limiting, clauses:

CLAUSE D1. A method for providing a visual indication of the state of operation of a subsea pump, comprising:

- normalising an operating parameter to provide a parameter ratio;
- setting a desired operational range for the parameter ratio;
- setting an acceptable operational range for the parameter ratio;
- providing a first visual indicator for indicating that the parameter ratio is inside the desired operational range, providing a second visual indicator for indicating that the parameter ratio is outside of the desired operational range and inside the acceptable operational range, and providing a third visual indicator for indicting that the parameter ratio is outside both the acceptable operational range and the desired operational range;
- providing a numerical scale for assigning a condition number to the parameter ratio based on the operational range of the parameter ratio;
- selectively displaying one of the first, the second and the third visual indicators, and the condition number on the numerical scale to a user.

CLAUSE D2. The method according to clause D1, comprising normalising an operating parameter based on a known value of the operating parameter and an expected value of the operating parameter.

CLAUSE D3. The method according to clause D1 or D2, wherein normalising the operating parameter comprises comparing an operating parameter against an expected value for the operating parameter.

CLAUSE D4. The method according to clause D2 or D3, wherein the expected value of the normalised operating parameter is based upon operation of the subsea pump in test conditions, and in a non-used state.

CLAUSE D5. The method according to any preceding clause, wherein the parameter ratio is assigned a maximum condition number on the numerical scale when within the desired operational range, a minimum condition number on the numerical scale when outside both the acceptable operational range and the desired operational range, and an intermediate condition number on the numerical scale when outside the desired operational range and inside the acceptable operational range.

CLAUSE D6. The method according to clause D5, wherein the intermediate condition number assigned to the parameter ratio varies linearly with change in the value of the parameter ratio between the desired operational range and the acceptable operational range.

CLAUSE D7. The method according to clause D5, wherein the intermediate condition number assigned to the parameter ratio has a quadratic, exponential, or other polynomial variation with change in the value of the parameter ratio between the desired operational range and the acceptable operational range.

CLAUSE D8. The method according to any of clauses D5 to D7, wherein the maximum condition number is a percentage value between 0 and 100.

CLAUSE D9. The method according to any preceding clause, wherein one of the first, second and third visual indicators are selected to be displayed depending on whether the parameter ratio is inside the desired operational range, outside the desired operational range and inside the acceptable operational range, and outside the acceptable operational range and the desired operational range.

CLAUSE D10. The method according to any preceding clause, wherein the first visual indicator is the colour green, the second visual indicator is the colour yellow, and the third visual indicator is the colour red.

CLAUSE D11. The method according to any preceding clause, comprising plotting the value of the parameter ratio on a graph over time and displaying the graph to a user.

CLAUSE D12. The method according to clause D11, comprising providing the visual indicators on the graph.

CLAUSE D13. The method according to any preceding clause, comprising displaying the visual indicators and indicating the operation number on a gauge with a needle.

CLAUSE D14. The method according to any preceding clause, comprising normalising a plurality of operating parameters to provide a plurality of parameter ratios, and:

- setting a desired operational range for each of the plurality of parameter ratios;
- setting an acceptable operational range for each of the plurality of parameter ratios;
- assigning a condition number to each of the plurality of parameters based on the operation of each thereof;
- selectively displaying each of the first, the second, and the third visual indicators, and each condition number on a display for each of the plurality of operating parameters.

CLAUSE D15. The method according to clause D14, comprising averaging the condition number for each of the plurality of operation numbers to provide an overall condition number.

CLAUSE D16. The method according to any preceding clause, wherein providing a parameter ratio comprises the steps of:

- obtaining test data by operating the subsea pump under optimal test conditions to provide test data of the expected optimal operation of the subsea pump;

comparing the value of an operating parameter of the pump in operation with the expected value for that operating parameter based on the test data;

providing a parameter ratio of the operating parameter based on the comparison.

CLAUSE D17. The method according to clause D16 or D17, wherein optimal test data is obtained via non-optimal conditions and then extrapolating/processing to achieve the optimal test data.

CLAUSE D18. The method according to any preceding clause, comprising providing a sensor arrangement in the subsea pump for measuring the operating parameter.

CLAUSE D19. The method according to any preceding clause, wherein the operating parameter is one of: pump speed, pump flow rate, fluid density and fluid viscosity.

CLAUSE D20. The method according to any preceding clause, comprising changing operation of the subsea pump based on the value of the parameter ratio, wherein changing the operation of the subsea pump comprises at least one of ceasing operation of the subsea pump and changing the pump speed of the subsea pump.

CLAUSE D21. The method according to clause D20, comprising automatically changing the operation of the subsea pump.

The invention claimed is:

1. A multiphase pump comprising:

a housing comprising a flow inlet and a flow outlet which are fluidly connected to each other via a flow path;

a rotor arranged in the flow path of the housing, the rotor being configured to propel a fluid from the flow inlet to the flow outlet via the flow path, the rotor comprising a longitudinal axis which extends for a length of the rotor and a multiphase impeller arrangement;

at least one leak path which is configured to permit a reverse flow of the fluid from the flow outlet to the flow inlet; and at least one channel which is arranged within the housing, the at least one channel being configured to direct a liquid from a liquid source to one of the at least one leak path in the multiphase pump.

2. The multiphase pump as recited in claim 1, wherein, the flow path comprises a higher-density zone located in a radially outer region of the flow path, and a lower-density zone located in a radially inner region of the flow path, and the at least one channel comprises an outlet located adjacent to the lower-density zone so as to be in a fluid communication therewith.

3. The multiphase pump as recited in claim 1, wherein, the flow path comprises a higher-density zone located in a radially outer region of the flow path, and a lower-density zone located in a radially inner region of the flow path, and the liquid source is at least partially defined by the higher-density zone so as to be in a fluid communication therewith.

4. The multiphase pump as recited in claim 3, wherein the at least one channel comprises an inlet located adjacent to the higher-density zone so as to be in a fluid communication therewith.

5. The multiphase pump as recited in claim 1, wherein, the flow path comprises a higher-density zone located in a radially outer region of the flow path, and a lower-density zone located in a radially inner region of the flow path, the housing further comprises at least one location of reduced diameter, the housing is configured to engage the rotor at the at least one location of reduced diameter, and a location of engagement between the housing and the rotor is in the radially inner lower-density zone of the flow path.

6. The multiphase pump as recited in claim 5, wherein, the at least one channel comprises an outlet at the location of engagement between the housing and the rotor, and the one of the at least one leak path is located at the location of engagement between the housing and the rotor so that the at least one channel is further configured direct a liquid to the location of engagement between the housing and the rotor.

7. The multiphase pump as recited in claim 1, wherein, the flow path comprises a higher-density zone located in a radially outer region of the flow path, and a lower-density zone located in a radially inner region of the flow path, the rotor further comprises a drive shaft which is coupled to the multiphase impeller arrangement, the housing is configured to radially support the drive shaft of the rotor at an at least one radial support location which is in the lower-density zone of the flow path, and the one of the at least one leak path is located between the drive shaft and the housing at the at least one radial support location so that the at least one channel directs a liquid to the at least one radial support location.

8. The multiphase pump as recited in claim 1, further comprising:

a wear ring which is located between the multiphase impeller arrangement and the housing, wherein, the one of the at least one leak path is located between the wear ring and the multiphase impeller arrangement.

9. The multiphase pump as recited in claim 1, wherein, the fluid source is at least partially defined by a source of liquid which is external to the multiphase pump, and the at least one channel comprises an external inlet located on an external surface of the multiphase pump.

10. The multiphase pump as recited in claim 1, wherein, the flow inlet and the flow outlet are defined by the housing, and the flow outlet is located at a midpoint along the longitudinal axis of the rotor.

11. The multiphase pump as recited in claim 1, wherein the rotor further comprises a further multiphase impeller arrangement which has an opposite orientation to the multiphase impeller arrangement, the multiphase impeller arrangement is configured to impart a velocity to a fluid in a first direction which is parallel to the longitudinal axis, and the further multiphase impeller arrangement is configured to impart a velocity to a fluid in a second opposite direction which is parallel to the longitudinal axis.

12. The multiphase pump as recited in claim 11, wherein, the housing further comprises at least one location of reduced diameter, the housing is configured to engage the rotor at the at least one location of reduced diameter, the multiphase impeller arrangement is located on a first axial side of the engagement between the housing and the rotor, and the further multiphase impeller arrangement is located on a second axial side of the engagement between the housing and the rotor.

13. The multiphase pump as recited in claim 11, further comprising:

a connection conduit, wherein, the flow inlet comprises a direct fluid connection to an inlet of the multiphase impeller arrangement, the flow outlet comprises a direct fluid connection to an outlet of the further multiphase impeller arrangement, and the connection conduit is configured to directly fluidically connect an outlet of the multiphase impeller arrangement and an inlet of the further multiphase impeller arrangement so that the flow path extends from the inlet to the outlet via the multiphase impeller arrangement, the connection conduit, and the further multiphase impeller arrangement.

14. The multiphase pump as recited in claim 13, wherein one of the at least one leak path extends from the outlet of the further multiphase impeller arrangement to the outlet of the multiphase impeller arrangement.

15. The multiphase pump as recited in claim 11, wherein, the multiphase impeller arrangement is configured to pressurize a fluid from an inlet pressure to a mid-pressure, and the further multiphase impeller arrangement is configured to pressurize a fluid from the mid-pressure to an outlet pressure.

16. A method of pumping a multiphase fluid, the method comprising:

providing a multiphase pump, the multiphase pump defining at least one channel which is configured to direct a fluid from a liquid source to a leak path in the multiphase pump;

operating the multiphase pump to pump a multiphase fluid along a flow path within the multiphase pump from a flow inlet of the multiphase pump to a flow outlet of the multiphase pump and to cause the fluid to leak along the leak path in a reverse direction from the flow outlet towards the flow inlet; and directing the fluid from the liquid source to the leak path via the at least one channel.

17. The method as recited in claim 16, wherein, the flow path comprises a higher-density zone located in a radially outer region of the flow path, and a lower-density zone located in a radially inner region of the flow path, and the method further comprises:

directing the fluid from the liquid source to the leak path via an outlet of the at least one channel which is located adjacent to the lower-density zone of the flow path.

18. The method as recited in claim 16, wherein, the flow path comprises a higher-density zone located in a radially outer region of the flow path, and a lower-density zone located in a radially inner region of the flow path, and the method further comprises:

directing the fluid from the higher-density zone to the leak path via the channel.

19. The method as recited in claim 16, wherein the liquid source is external to the multiphase pump.

20. The method as recited in claim 16, wherein the flow path comprises a higher-density zone located in a radially outer region of the flow path, and a lower-density zone located in a radially inner region of the flow path, and the leak path extends from the lower-density zone so that, in an absence of an injected fluid from the at least one channel, the fluid leaking along the leak path primarily comprises gas.

* * * * *